(12) United States Patent
Yanase

(10) Patent No.: US 8,818,930 B2
(45) Date of Patent: Aug. 26, 2014

(54) KNOWLEDGE BASE SYSTEM, LOGIC OPERATION METHOD, PROGRAM, AND RECORDING MEDIUM

(76) Inventor: Takatoshi Yanase, Hyogo (JP)

( * ) Notice: Subject to any disclaimer, the term of this patent is extended or adjusted under 35 U.S.C. 154(b) by 247 days.

(21) Appl. No.: 13/320,801

(22) PCT Filed: May 18, 2010

(86) PCT No.: PCT/JP2010/003327
§ 371 (c)(1),
(2), (4) Date: Nov. 16, 2011

(87) PCT Pub. No.: WO2010/134319
PCT Pub. Date: Nov. 25, 2010

(65) Prior Publication Data
US 2012/0072387 A1    Mar. 22, 2012

(30) Foreign Application Priority Data

May 18, 2009 (JP) ................................. 2009-119693
Sep. 14, 2009 (JP) ................................. 2009-211424
Dec. 1, 2009 (JP) ................................. 2009-273583
Jan. 20, 2010 (JP) ................................. 2010-009960

(51) Int. Cl.
*G06N 5/02* (2006.01)
*G06F 17/30* (2006.01)

(52) U.S. Cl.
USPC ........................................................ 706/50

(58) Field of Classification Search
None
See application file for complete search history.

(56) References Cited

U.S. PATENT DOCUMENTS 5,355,445 A * 10/1994 Shibao et al. .................. 706/50
5,546,526 A *  8/1996 Li et al. ........................ 715/837
5,701,400 A * 12/1997 Amado ......................... 706/45
5,748,850 A *  5/1998 Sakurai ........................ 706/50

(Continued)

FOREIGN PATENT DOCUMENTS

JP     2-076033    3/1990
JP     5-094478    4/1993

(Continued)

OTHER PUBLICATIONS

Hirotomi, et al., "Self-explanatorycomponents: a basis for new communicators," Journal of Visual Languages and Computing, 14 (2003) 215-232.*
International Search Report issued Aug. 10, 2010 in International (PCT) Application No. PCT/JP2010/003327.
Mizoguchi, "Ontological Engineering," Jan. 20, 2005, $1^{st}$ Edition, Ohmsha, pp. 3-7 (with partial English translation).

*Primary Examiner* — Kakali Chaki
*Assistant Examiner* — Fuming Wu
(74) *Attorney, Agent, or Firm* — Wenderoth, Lind & Ponack, L.L.P.

(57) ABSTRACT

A knowledge base system (1000) includes: a storage unit storing a knowledge base; and an operation unit (1070) performing a logic operation on the stored knowledge base. The knowledge base includes an entity identifier identifying an entity and one or more attributes of the entity associated with the entity identifier of the entity. Each attribute includes: an attribute identifier identifying the attribute; and at least one of feature data that is one or more pieces of data representing the attribute and is associated with the attribute identifier, and identification data that is data associated with a word representing the attribute and is associated with the attribute identifier. The entity identifier is not a word representing the entity, and is made of a symbol having no meaning per se. The attribute identifier is not the word representing the attribute, and is made of a symbol having no meaning per se.

24 Claims, 50 Drawing Sheets

(56) References Cited

U.S. PATENT DOCUMENTS

| | | | |
|---|---|---|---|
| 5,812,994 A * | 9/1998 | Imlah | 706/45 |
| 6,353,813 B1 * | 3/2002 | Breese et al. | 706/12 |
| 6,493,697 B1 * | 12/2002 | Stier et al. | 706/50 |
| 6,499,024 B1 * | 12/2002 | Stier et al. | 706/50 |
| 6,557,016 B2 * | 4/2003 | Tanigawa et al. | 715/246 |
| 6,560,589 B1 * | 5/2003 | Stier et al. | 706/50 |
| 6,591,258 B1 * | 7/2003 | Stier et al. | 706/50 |
| 6,763,341 B2 * | 7/2004 | Okude | 706/45 |
| 8,495,070 B2 * | 7/2013 | Yanase | 707/749 |
| 2002/0169779 A1 * | 11/2002 | Tseng et al. | 707/100 |
| 2003/0105880 A1 * | 6/2003 | Jasinschi | 709/247 |
| 2003/0220890 A1 * | 11/2003 | Okude | 706/50 |
| 2004/0122705 A1 * | 6/2004 | Sabol et al. | 705/2 |
| 2005/0154535 A1 * | 7/2005 | Sun et al. | 702/19 |
| 2007/0055656 A1 * | 3/2007 | Tunstall-Pedoe | 707/3 |
| 2012/0072387 A1 * | 3/2012 | Yanase | 706/50 |

FOREIGN PATENT DOCUMENTS

| | | |
|---|---|---|
| JP | 8-305708 | 11/1996 |
| JP | 10-275085 | 10/1998 |
| JP | 11-066085 | 3/1999 |
| JP | 2001-229382 | 8/2001 |
| JP | 2002-197114 | 7/2002 |
| JP | 2005-050315 | 2/2005 |
| JP | 2005-196382 | 7/2005 |
| JP | 2007-188469 | 7/2007 |
| JP | 2009-075714 | 4/2009 |
| WO | 2005/122014 | 12/2005 |
| WO | 2007/000893 | 1/2007 |

* cited by examiner

FIG. 9

| Attribute identifier | Feature data identifier |
|---|---|
| 1001 | 0x0001 |
| 1001 | 0x0010 |
| 1002 | 0x1234 |
| 1003 | 0x5678 |
| 1004 | 0x0010 |
| ⋮ | ⋮ |

FIG. 10

| Entity identifier | Attribute identifier |
|---|---|
| 3001 | 1001 |
| 3001 | 1002 |
| 3002 | 1003 |
| 3003 | 1002 |
| 3003 | 1004 |
| ⋮ | ⋮ |

FIG. 17A

| Attribute source data list ||||
|---|---|---|---|
| Entity name | Attribute | True-false value | Actual data |
| Taro | Tall | True | 185 |
| Taro | Male | True | |
| Taro | ... | ... | |

FIG. 17B

| Entity name / entity identifier correspondence table |||
|---|---|---|
| Entity name | Entity identifier | Pointer to feature data |
| Taro | 3098 | |
| Car | 5471 | |
| Apple | 2290 | |

FIG. 18

Attribute / attribute identifier correspondence table

| Attribute | | Attribute identifier | | Condition | Pointer to feature data |
|---|---|---|---|---|---|
| Primary attribute | Secondary attribute | Primary identifier | Secondary identifier | | |
| Tall(Female) | | 14 | 1 | Equal to or more than 170 | |
| Short(Female) | | 14 | 2 | Equal to or less than 150 | |
| Tall(Male) | | 14 | 5 | Equal to or more than 180 | |
| Short(Male) | | 14 | 6 | Equal to or less than 160 | |
| Male | | 300 | 1 | | |
| Female | | 300 | 2 | | |
| Primary attribute | Secondary attribute | Primary identifier | Secondary identifier | | |
| Sweet | Very | 800 | 39 | | |
| Sweet | Slightly | 800 | 30 | | |

FIG. 19

| Entity identifier | Attribute identifier | | True-false value |
| --- | --- | --- | --- |
| | Primary identifier | Secondary identifier | |
| 3098 | 14 | 0 | True |
| 3098 | ... | ... | |
| 3098 | ... | ... | |

FIG. 20A

| Entity / primary attribute / secondary attribute correspondence table | | |
|---|---|---|
| Entity | Primary attribute | Secondary attribute |
| | | |
| | | |
| | | |

FIG. 20B

| Primary attribute / secondary attribute correspondence table | |
|---|---|
| Attribute identifier of primary attribute | Attribute identifier of secondary attribute |
| | |
| | |
| | |

FIG. 28A
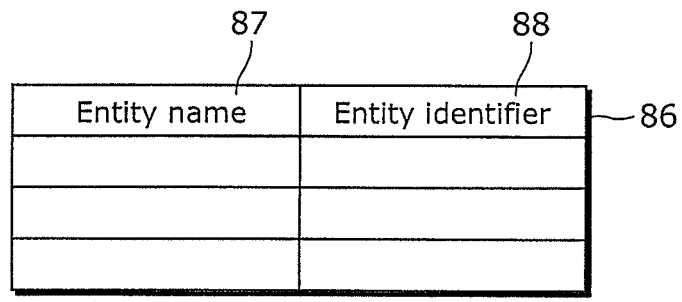
FIG. 28C
FIG. 28B
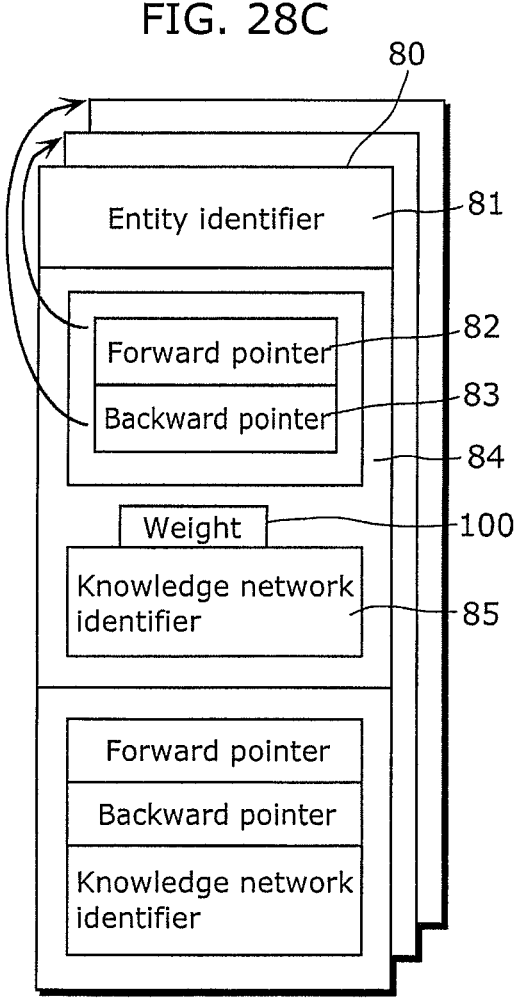

FIG. 56

| Feature data identifier | Attribute identifier | Ancillary information |
|---|---|---|
| 10001 | 14 | 1 |
| 45000 | 14 | 2 |
| 10501 | 107 | 1 |
| 20011 | 0 | 3 |
| 20889 | 9 | 5 |
| 20889 | 3457 | 1 |

FIG. 57

| Feature data identifier | Attribute identifier | Ancillary information |
|---|---|---|
| 10001 | 14 | 1 |

| Feature data identifier | Attribute identifier | Ancillary information |
|---|---|---|
| 45000 | 14 | 2 |

| Feature data identifier | Attribute identifier | Ancillary information |
|---|---|---|
| 10501 | 107 | 1 |

| Feature data identifier | Attribute identifier | Ancillary information |
|---|---|---|
| 20011 | 0 | 3 |

| Feature data identifier | Attribute identifier | Ancillary information |
|---|---|---|
| 20889 | 9 | 5 |
| 20889 | 3457 | 1 |

FIG. 58

| Feature data identifier | Attribute identifier | Ancillary information |
|---|---|---|
| 10001 | 14 | 1 |
| 45000 | 14 | 2 |

| Feature data identifier | Attribute identifier | Ancillary information |
|---|---|---|
| 10501 | 107 | 1 |

| Feature data identifier | Attribute identifier | Ancillary information |
|---|---|---|
| 20011 | 0 | 3 |

| Feature data identifier | Attribute identifier | Ancillary information |
|---|---|---|
| 20889 | 9 | 5 |

| Feature data identifier | Attribute identifier | Ancillary information |
|---|---|---|
| 20889 | 3457 | 1 |

KNOWLEDGE BASE SYSTEM, LOGIC OPERATION METHOD, PROGRAM, AND RECORDING MEDIUM

TECHNICAL FIELD

The present invention relates to a knowledge base system.

BACKGROUND ART

There are instances where an organism, even unicellular, shows a specific reaction to a certain stimulus when stimulated from the outside world. The organism outputs information to show a predetermined reaction, according to input information from the outside world and an internal state. This suggests that there is a mechanism of information processing incorporated permanently in a living organism beforehand. Such information processing is referred to as first information processing in this Description.

It is also clear that there is a mechanism of adjusting output information corresponding to input information from the outside world to find optimal output information, and storing the adjusted information. Such information processing is referred to as second information processing in this Description. This is widely known as one function of a neural network.

A human performs more sophisticated information processing using words written in letters. Such information processing is referred to as third information processing in this Description.

Many of current researches on artificial intelligence deal with the third information processing. However, a system that imitates information processing performed by humans everyday cannot be established in this method. Since words written in letters are used, information can be described precisely and the precisely described information can be subjected to logic operations. Such preciseness, however, hampers development of a method of accumulating information as knowledge and a method of effectively using information recorded as knowledge.

An entity can be represented by a word. In a language such as English or Japanese, an entity can be represented by a term, i.e. a word. An entity has at least one attribute which is a predetermined property. This attribute is represented by a word, too. A word can be expressed by a letter string which is a group of letters. Hence, a word representing an entity has an attribute, where the entity and its attribute can be represented by a letter string, i.e. a word. The use of letters enables information to be held and recorded for a long time. It is also possible to express a word by using, as a language, a means other than letters, such as sounds or gestures. A characteristic feature lies in that a word itself represents a meaning of the word.

Entities include not only concrete entities such as stones and the sun, but also abstract entities such as warmth, concepts, images, sounds, and web pages. An unknown entity may not have an attribute. An attribute represents a property of an entity, such as "red-colored" or "sweet-tasting".

A machine such as a computer can be used to compare two letter strings to determine whether or not the two letter strings are the same, and generate a true value in the case where the two letter strings are the same and a false value in the case where the two letter strings are different. That is, the computer is capable of determining whether or not words expressed in letters are the same, and generating a true-false value.

Thus, it is possible to compare two words, and generate a true value in the case where the two words are the same and a false value in the case where the two words are different. This method enables determination of whether or not entities or attributes are the same or different. The same can be done using a symbol associated with a word. A symbol associated with a word represents a meaning of the corresponding word. The symbol in this case represents the meaning. When translating "symbol" into "identifier", the following can be stated. An identifier associated with and representing a word represents a meaning of the corresponding word. Therefore, an identifier associated with a word and representing a meaning of the word is also a word. Suppose a word "dog" and an identifier "ABC" are associated with each other. Then, the identifier "ABC" is a word that represents a meaning "dog".

A word can be generated not only from a combination of letters but also from a combination of sounds or figures. A word generated from a combination of sounds or figures can substitute for a word generated from letters. Accordingly, which means is used to generate a word is not an essential matter, except for ease of recording.

A relay-based calculator has been used in early days. The relay-based calculator realizes a mechanism of performing three operations that are AND, OR, and NOT, by use of relays. A current computer follows the same principle as the relay-based calculator, though its components are semiconductor devices instead of relays.

The current computer holds a logic operation procedure not as a combination of machine components but as information called a program. Changing the information called the program allows a different logic operation procedure to be performed in the same apparatus.

A program directly executable by a computer is a combination of two values "0" and "1". It is a hard work for humans to produce such a program. This leads to development of a method for translating a program made up of a combination of alphanumeric characters that humans can understand, to a program made up of a combination of "0" and "1" that can be directly handled by a computer. A program is used to cause the computer to perform such translation. For example, COBOL is a language of a program that humans can understand. A language such as COBOL is called a programming language. Meanwhile, a language of a program that can be directly handled by a computer which is a machine is called a machine language. A program named a compiler translates a program written in a programming language to a program written in a machine language.

An entity typically has several attributes. One word representing an entity has zero or more attributes.

There is a programming language named PROLOG. To represent an attribute, this conventional technique employs a word representing the attribute. The use of such a programming language to realize artificial intelligence, though experimented, has its limits.

"Socrates is a person" is written as (man Socrates) in the programming language PROLOG. Thus, two words "man" and "Socrates" are arranged to represent a property of an entity, i.e. an attribute of the entity. The entity and the attribute which is the property are held in a computer as words. A criterion for determining whether or not "man" is "man" is whether or not the words are the same. A word itself represents a meaning. A word is interpreted as an entity, an attribute, or a relationship, depending on its position in word order.

"Ieyasu is Nobuyasu's father" is written as (Father Ieyasu Nobuyasu) in PROLOG. This represents a relationship between two entities. That is, three words are arranged to represent a relationship between two entities. The first word represents the relationship, and the second and third words represent the entities. In this example, the second word represents "father", and the third word represents "child". Changing the order of the second and third words as (Father Nobuyasu Ieyasu) yields a different meaning "Nobuyasu is Ieyasu's father". The second and third entities can differ in meaning depending on the relationship.

The relationship and the two entities are held in the computer as a sequence of three words. Different order of the words has a different meaning. That is, the order of the words contains a meaning. The number of words and the word order are used to represent a meaning. According to this method, a two-level relationship, i.e. a relationship between two entities, can be represented, but a relationship of three or more levels, such as child→father→grandfather, cannot be directly represented.

Suppose there are two word sequences (Father A B) and (Father B C). B is a common word to the two word sequences. This leads to the understanding that A is the father of C's father, i.e. A is C's grandfather. Though there is no direct description of the relationship between A and C, it is possible to know the indirectly-represented relationship between the entities through the common word.

This technique allows entities, attributes, and relationships to be held as a database, but merely word sequences representing entities, attributes, and relationships are held here. An attribute which is a property of an entity is represented by a word sequence, and also a relationship is represented by a word sequence. Both an attribute and a relationship are represented by the same method of using a word sequence. Provided that knowledge is systematized information, a plurality of word sequences in each of which words representing information are arranged are held as knowledge. Information directly representing a relationship of three or more levels between entities is not held according to this method. One word is compared with another word to find a matching word, thereby relating word sequences to each other. In each search for a matching word, relatedness between information expressed in word sequences is checked.

The Specification of Japanese Patent Application No. 2006-514606 (PTL 1) discloses the following technique. An apparatus disclosed in PTL 1 evaluates information of nodes within a space which is a collection of nodes, where each node denotes information such as a document file or a web page that is stored in a web server on the Internet and can be viewed by software called a browser running on a personal computer and the like. Information connected to a node is referred to as a property. Implementation of a property (attribute) is not defined at all, and completely left to a program implementer. PTL 1 does not disclose that an entity has an attribute, and also does not disclose an attribute evaluation method.

There is a knowledge base constructed by connecting words in a language such as English or Japanese. In the conventional knowledge base, words in the language are directly connected to each other. Thus, the conventional knowledge base is included within the language.

In one field of artificial intelligence, inference is performed using a Bayesian network which is a probability model having a graph structure. Based on an assumption that, when one event occurs, another event occurs with a certain probability, a chain in which one event causes another event is represented by a graph structure. A probability that one event causes another event is held without exception. By starting from one event and following a graph held beforehand, an event having a highest occurrence probability can be found. Such processing achieves inference. In this method, entities, attributes, and relationships are not distinguished from each other, and are all represented as events. An event is represented by a word in a language, and events are directly connected to each other. The Bayesian network is included within the language.

CITATION LIST

Patent Literature

[PTL 1]
Specification of Japanese Patent Application No. 2006-514606

SUMMARY OF INVENTION

Technical Problem

In the conventional techniques, letters are combined to generate a word having a meaning. A word exists within a language, and directly has a meaning of the word only within the language. Information of an entity or an attribute such as a property, a feature, a meaning, or a concept is represented by a word directly having a meaning. A word sequence made up of a word representing an entity and a word representing an attribute is generated, where a property of an entity or a relationship between entities is represented by a word sequence. A plurality of word sequences are accumulated as knowledge. In this method, knowledge is constructed using only words each of which has a meaning of the word itself.

The present invention is made in view of the problems stated above, and has an object of providing a knowledge base system capable of representing a meaning of an entity or an attribute independently of a language.

Solution to Problem

A knowledge base system according to one aspect of the present invention includes: a storage unit in which a knowledge base is stored; and an operation unit that performs a logic operation on the knowledge base stored in the storage unit, wherein the knowledge base includes an entity identifier for identifying an entity and one or more attributes of the entity, the one or more attributes being associated with the entity identifier of the entity, the one or more attributes each include: an attribute identifier for identifying the attribute; and at least one of feature data and identification data, the feature data being one or more pieces of data representing the attribute and being associated with the attribute identifier for identifying the attribute, and the identification data being data associated with a word representing the attribute and being associated with the attribute identifier, the entity identifier is not a word representing the entity, and is made of a symbol that has no meaning per se, and the attribute identifier is not the word representing the attribute, and is made of a symbol that has no meaning per se.

According to this structure, an entity and an attribute of the entity can be represented by identifiers that do not have meanings of the entity and the attribute, and held and subjected to an operation. Note that "an entity is designated" indicates that an entity identifier for identifying the entity is designated.

Moreover, the feature data may be data representing at least one of a shape, a sound, a smell, a taste, a color, a pressure, a temperature, a length, a coordinate value, and an area of the attribute identified by the attribute identifier associated with the feature data. According to this structure, a concept (meaning) of each attribute is defined by feature data associated with an attribute identifier.

Moreover, the knowledge base system may further include: an input unit that obtains information relating to the attribute;

a feature extraction unit that extracts at least one of the feature data and the identification data, from the information obtained by the input unit; and a data storing unit that stores the at least one of the feature data and the identification data extracted by the feature extraction unit, in the knowledge base in association with the attribute identifier for identifying the attribute. According to this structure, a new relationship between an attribute identifier and feature data and/or identification data can be stored in the knowledge base, based on information obtained from outside.

Moreover, the attribute identifier may include a primary identifier and a secondary identifier, wherein the attribute identifier identifies the attribute by a combination of the primary identifier and the secondary identifier. For example, it is possible to represent a basic property of an attribute by a primary identifier, and a more detailed property such as a degree or a state of the attribute by a secondary identifier.

Moreover, the operation unit may, when one entity is designated as an operation target, perform the logic operation on an attribute of the designated entity.

For example, the operation unit may further perform, when two attribute sets each of which includes one or more attributes are designated, an AND operation of generating a new attribute set by: collecting, in the case where each attribute is associated with a true-false value indicating whether the attribute is true or false, only attributes that have the same attribute identifier and are associated with the same true-false value between the two attribute sets; and collecting, in the case where each attribute is not associated with the true-false value, only attributes that have the same attribute identifier between the two attribute sets.

Alternatively, the operation unit may further perform, when two attribute sets each of which includes one or more attributes are designated, an OR operation of generating a new attribute set by collecting attributes that belong to at least one of the two attribute sets.

Alternatively, each attribute may be associated with a true-false value indicating whether the attribute is true or false, wherein the operation unit further performs, when one attribute set including one or more attributes is designated, a NOT operation of generating a new attribute set with the true-false value being changed, by generating, for each attribute included in the attribute set, an attribute by changing the true-false value to false in the case where the associated true-false value is true and the true-false value to true in the case where the associated true-false value is false.

Alternatively, each attribute may be associated with a true-false value indicating whether the attribute is true or false, wherein the operation unit further performs, when two attribute sets each of which includes one or more attributes are designated, a NAND operation of: generating an attribute set by collecting only attributes that have the same attribute identifier and are associated with the same true-false value between the two attribute sets; and further generating a new attribute set with the true-false value being changed, by generating, for each attribute included in the generated attribute set, an attribute by changing the true-false value to false in the case where the associated true-false value is true and the true-false value to true in the case where the associated true-false value is false.

Alternatively, each attribute may be associated with a true-false value indicating whether the attribute is true or false, wherein the operation unit further performs, when two attribute sets each of which includes one or more attributes are designated, a NOR operation of: generating an attribute set by collecting attributes that belong to at least one of the two attribute sets; and further generating a new attribute set with the true-false value being changed, by generating, for each attribute included in the generated attribute set, an attribute by changing the true-false value to false in the case where the associated true-false value is true and the true-false value to true in the case where the associated true-false value is false.

Alternatively, the operation unit may further, when two attribute sets each of which includes one or more attributes are designated: count, in the case where each attribute is associated with a true-false value indicating whether the attribute is true or false, the number of attributes that are included in both of the two attribute sets and associated with the same true-false value between the two attribute sets, as a degree of commonality; and count, in the case where each attribute is not associated with the true-false value, the number of attributes that are included in both of the two attribute sets, as the degree of commonality.

Alternatively, the operation unit may further, when two attribute sets each of which includes one or more attributes are designated: count, in the case where each attribute is associated with a true-false value indicating whether the attribute is true or false, the number of attributes that are included in both of the two attribute sets and associated with different true-false values between the two attribute sets, as a degree of non-commonality; and count, in the case where each attribute is not associated with the true-false value, the number of attributes that are included in only either of the two attribute sets, as the degree of non-commonality.

Alternatively, the attribute identifier may include a primary identifier and a secondary identifier, and the operation unit may further, when two attribute sets each of which includes one or more attributes are designated: count, in the case where each attribute is associated with a true-false value indicating whether the attribute is true or false, the number of attributes that have the same primary identifier and are associated with the same true-false value between the two attribute sets, as a degree of similarity; and count, in the case where each attribute is not associated with the true-false value, the number of attributes that have the same primary identifier between the two attribute sets, as the degree of similarity.

Alternatively, the attribute identifier may include a primary identifier and a secondary identifier, and the operation unit may further, when two attribute sets each of which includes one or more attributes are designated: count, in the case where each attribute is associated with a true-false value indicating whether the attribute is true or false, the number of attributes that have the same primary identifier and are associated with different true-false values between the two attribute sets, as a degree of non-similarity; and count, in the case where each attribute is not associated with the true-false value, the number of attributes that are included in only either of the two attribute sets, as the degree of non-similarity.

Alternatively, each attribute may be associated with a true-false value indicating whether the attribute is true or false, wherein the operation unit further performs, when two attribute sets each of which includes one or more attributes are designated, an OR operation of generating a new attribute set by excluding, from attributes that belong to at least one of the two attribute sets, attributes that are included in both of the two attribute sets and associated with different true-false values between the two attribute sets.

Alternatively, the operation unit may further perform, when two attribute sets each of which includes one or more attributes are designated, a XOR operation of generating a new attribute set by excluding attributes that belong to both of the two attribute sets.

As described above, the knowledge base system according to one aspect of the present invention can execute various operations on a designated attribute set. The term "attribute set" typically denotes a set of zero or more attribute identifiers associated with an entity identifier, though this is not a limit for the present invention. In addition, "collecting attributes" indicates to collect attribute identifiers that satisfy a condition.

Moreover, the operation unit may, when one or more attributes are designated, generate a knowledge collection having the designated one or more attributes by collecting each entity identifier associated with the designated one or more attributes, and when an entity is designated, determine whether or not an entity identifier of the designated entity belongs to the knowledge collection.

Moreover, the operation unit may further newly generate an abstract entity, by associating an entity identifier for identifying the generated knowledge collection with an attribute identifier for identifying the designated one or more attributes and an attribute identifier of an attribute indicating an abstract entity.

Thus, by grouping entities having a common attribute (i.e. entity identifiers associated with a common attribute identifier) as a knowledge collection beforehand, determination of whether or not an entity (entity identifier) belongs to the group can be easily made.

Moreover, the knowledge base may further include a knowledge network formed by connecting nodes corresponding to entities, wherein each of the nodes includes an entity identifier for the node and knowledge network information about the knowledge network to which the node belongs, and the knowledge network information includes a knowledge network identifier for identifying the knowledge network and a pointer to an other node to which the node is connected in the knowledge network. According to this structure, a relationship between entities can be defined, with it being possible to systematically hold knowledge in the knowledge base.

As an example, the operation unit may specify, in a knowledge network identified by a designated knowledge network identifier, an other entity connected to a designated entity by referencing to an entity identifier and knowledge network information that are included in a node in the knowledge network. As another example, the operation unit may, when an attribute identifier is designated, search for a knowledge network associated with the designated attribute identifier, and obtain a knowledge network identifier of the knowledge network searched for. According to this structure, starting from one entity, another entity having a possibility of being related to the entity can be reached. This process corresponds to "inference".

Moreover, the operation unit may further newly generate an abstract entity, by associating an entity identifier for identifying the knowledge network with the attribute identifier associated with the knowledge network and an attribute identifier of an attribute indicating an abstract entity.

A logic operation method according to one aspect of the present invention includes a step of performing processing by the operation unit, for the knowledge base included in the knowledge base system.

A program according to one aspect of the present invention is a program for a knowledge base system, causing a computer to execute the step included in the logic operation method.

A recording medium according to one aspect of the present invention is a computer-readable recording medium for a knowledge base system, wherein the knowledge base and the program are recorded.

Note that the present invention can be realized not only as a knowledge base system, but also as a program causing a computer to execute functions of the knowledge base system. Such a program can be distributed via a recording medium such as a CD-ROM or a transmission medium such as the Internet.

Advantageous Effects of Invention

According to the present invention, an entity and an attribute of the entity can be represented by identifiers that do not have meanings of the entity and the attribute, and such represented entity and attribute can be held.

BRIEF DESCRIPTION OF DRAWINGS

FIG. 9 is a diagram showing an attribute identifier/feature data correspondence table according to the embodiment.

FIG. 10 is a diagram showing an entity identifier/attribute identifier correspondence table according to the embodiment.

FIG. 17A is a diagram showing an attribute source data list.

FIG. 17B is a diagram showing an entity name/entity identifier correspondence table.

FIG. 18 is a diagram showing an attribute/attribute identifier correspondence table.

FIG. 19 is a diagram showing an entity/attribute list.

FIG. 20A is a diagram showing an entity/primary attribute/secondary attribute correspondence table.

FIG. 20B is a diagram showing a primary attribute/secondary attribute correspondence table.

FIG. 28A is a diagram showing an entity name/entity identifier correspondence table.

FIG. 28B is a diagram showing a knowledge network/ attribute correspondence table.

FIG. 28C is a diagram showing a data structure of a knowledge network.

FIG. 56 is a diagram showing a feature data/attribute correspondence table.

FIG. 57 is a diagram showing a correspondence table between one piece of feature data and each attribute.

FIG. 58 is a diagram showing a correspondence table between one attribute and each piece of feature data.

DESCRIPTION OF EMBODIMENTS

An embodiment of the present invention is described below. Note that the following merely describes an embodiment of the present invention, and does not limit the scope of the present invention.

Figure 1:
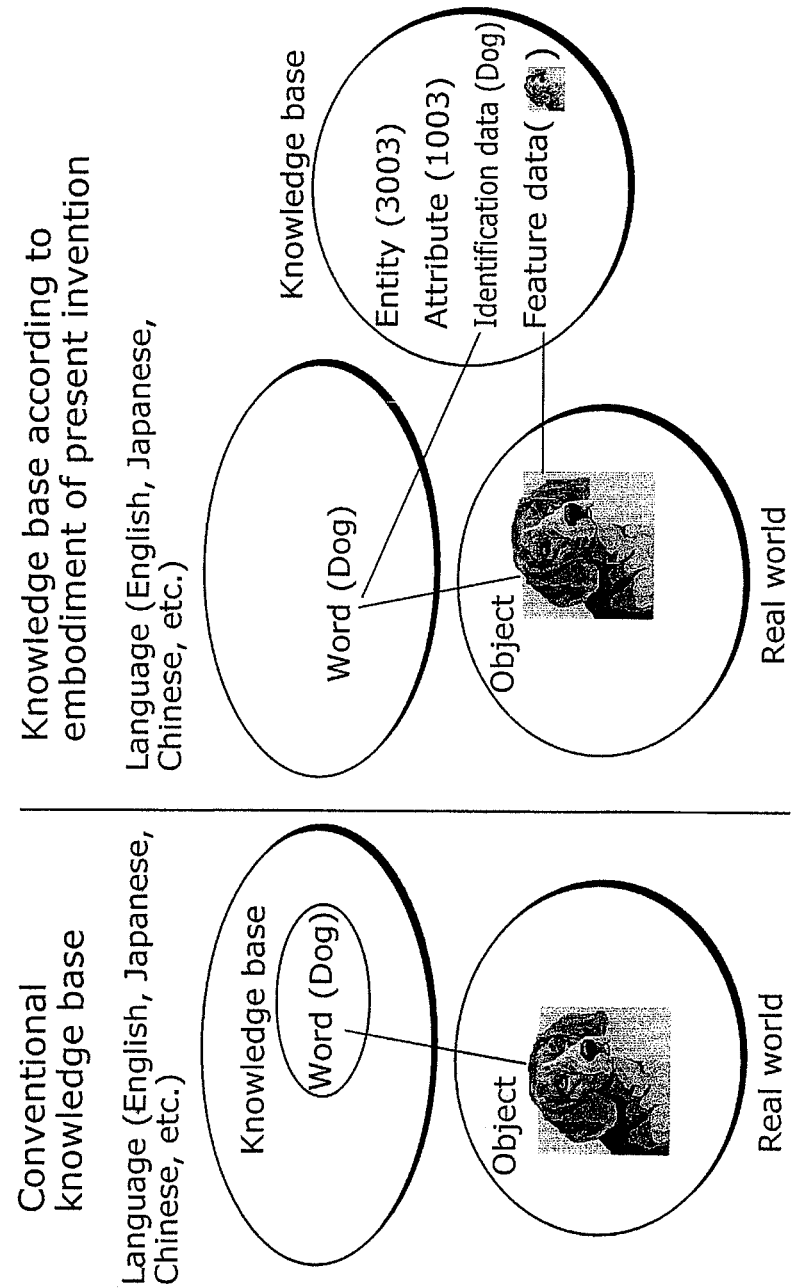
FIG. 1 is a diagram for comparing a conventional knowledge base and a knowledge base according to an embodiment of the present invention.

A conventional knowledge base is shown on the left of FIG. 1. In this drawing, the conventional knowledge base is included within a language such as English, Japanese, or Chinese. The conventional knowledge base holds words in the language, and so there is always a part that overlaps with the language. The conventional knowledge base cannot be constructed outside the language by eliminating the part common with the language.

In the real world, there is an object such as a dog or a snake. Such an object in the real world is directly connected to a word in the language. The object is not a word. The conventional knowledge base is composed of words in the language. That is, the conventional knowledge base is included within the language. In FIG. 1, a word "dog" is directly associated with a dog which is an object in the real world as a source of data.

In the language, the word "dog" not only identifies the dog which is the object, but also directly contains a property, a feature, a meaning, or a concept of the dog which is the object. The feature, the property, the meaning, or the concept of the dog which is the object, such as mammal and four-legged, can be known from the word "dog" alone. The word only exists within the language, and the word itself directly contains the property, the feature, the meaning, or the concept. Therefore, the word in the language directly represents the property, the feature, the meaning, or the concept of the word per se. There is no common part between the real world and the language. The language exists outside the real world. Meanwhile, the object exists only in the real world. The term or the word exists only within the language. The term or the word directly identifies the object or the attribute of the object. The term or the word directly contains the meaning of the term or the word.

A knowledge base according to an embodiment of the present invention is shown on the right of FIG. 1. This knowledge base is not included within the language, and does not have a common part with the language. This knowledge base exists outside the language. Moreover, this knowledge base exists outside the real world, and does not have a common part with the real world. Feature data generated from information, such as an image or a sound, directly emitted from the object itself in the real world is stored in the knowledge base. For example, feature data (image data) generated from an image of a dog as an object not being a word, which is directly emitted and obtained from the dog, is stored in the knowledge base.

Once a word in the language is inputted to a knowledge base system, identification data is generated from the word by a feature extraction unit, and stored in the knowledge base. The identification data is not generated from information directly emitted from an object not being a word, but generated from information obtained from the word in the language. On the other hand, feature data is not generated from the word in the language, but generated from information directly emitted from the object.

Feature data is generated from information such as an image or a sound directly emitted from an object in the real world, and stored in the knowledge base. The object is not a word. Moreover, an attribute is generated in the knowledge base, and connected to the stored feature data. Furthermore, an entity is generated in the knowledge base. The knowledge base system receives the information directly emitted from the object not being a word, generates the input data from the received information, generates the feature data from the input data, connects the generated feature data to the attribute, and connects the attribute to the generated entity. In the knowledge base, the connection between the attribute connected to the feature data and the entity is established by the knowledge base system.

In the knowledge base, feature data are not directly connected to each other. Even when different pieces of feature data connect to the same attribute, each of these pieces of feature data is connected to the attribute, and then connected to the other piece of feature data through the attribute. The same applies to identification data. Identification data are not directly connected to each other. Even when different pieces of identification data connect to the same attribute, each of these pieces of identification data is connected to the attribute, and then connected to the other piece of identification data through the attribute. Feature data and identification data are not directly connected to each other, either. Even when feature data and identification data connect to the same attribute, the feature data is connected to the attribute, and then connected to the identification data through the attribute.

Figure 2A:
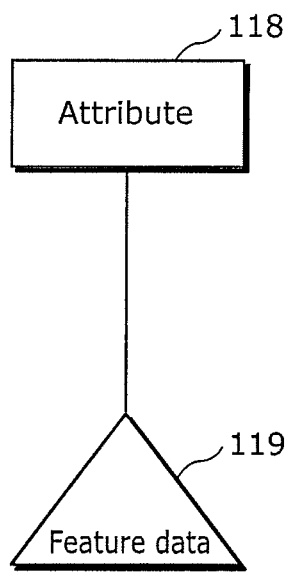
FIG. 2A is a diagram showing a first-level figure representing a relationship between an attribute and feature data.
Figure 3:
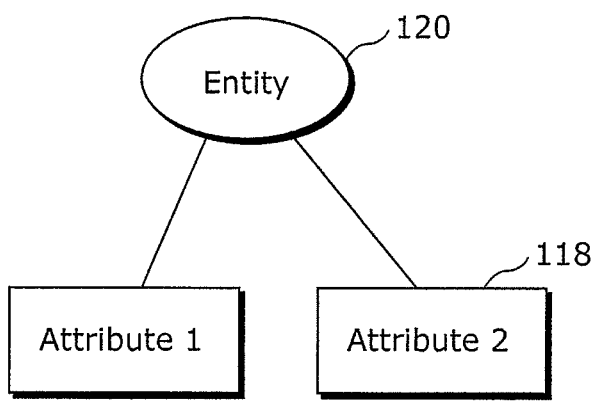
FIG. 3 is a diagram showing a second-level figure representing a relationship between an entity and an attribute.
Figure 4:
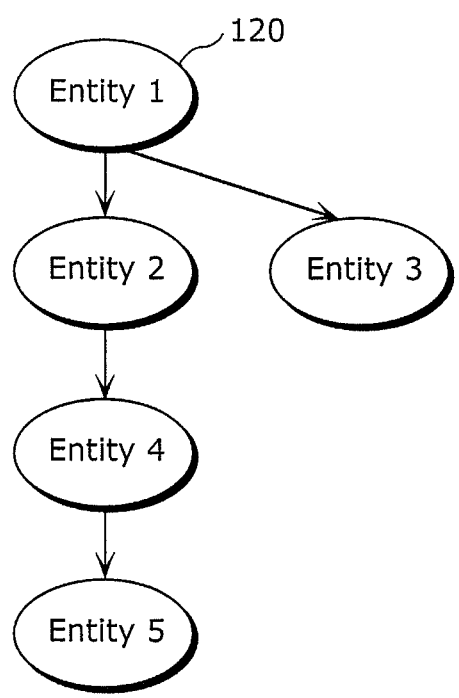
FIG. 4 is a diagram showing a third-level figure representing a relationship between entities.

For an entity, an attribute, and feature data, three types of figures are generated: (1) a figure directly connecting only entities to each other; (2) a figure directly connecting only an entity and an attribute to each other; and (3) a figure directly connecting only an attribute and feature data to each other. These three figures are combined to systematize information as knowledge. An entity or an attribute itself has no meaning. In a first-level figure shown in FIG. 2A, an attribute is directly connected to feature data, and as a result has a meaning. The meaning is also a concept. In a second-level figure shown in FIG. 3, an entity is directly connected to an attribute, as a result of which a property, a feature, a meaning, or a concept of the entity is defined. In a third-level figure shown in FIG. 4, entities are connected to each other, as a result of which a relationship between the entities is represented.

In the first level, an attribute and feature data are connected to each other, without involving any entity, any other attribute, any identification data, or any other feature data therebetween. Such a state of a connection between an attribute and feature data is referred to as a state where an attribute and feature data are directly connected to each other. In the first level, an attribute and identification data are connected to each other, without involving any entity, any other attribute, any other identification data, or any feature data therebetween. Such a state of a connection between an attribute and identification data is referred to as a state where an attribute and identification data are directly connected to each other. Likewise, in the second level, an entity and an attribute are connected to each other, without involving any other entity, any other attribute, any identification data, or any feature data therebetween. Such a state of a connection between an entity and an attribute is referred to as a state where an entity and an attribute are directly connected to each other. Likewise, in the third level, entities are connected to each other, without involving any other entity, any attribute, any identification data, or any feature data therebetween. Such a state of a connection between entities is referred to as a state where entities are directly connected to each other. Moreover, an entity and identification data may be connected to each other, without involving any other entity, any attribute, any other identification data, or any feature data therebetween. Such a state of a connection between an entity and identification data is referred to as a state where an entity and identification data are directly connected to each other. Further, an entity and feature data may be connected to each other, without involving any other entity, any attribute, any identification data, or any other feature data therebetween. Such a state of a connection between an entity and feature data is referred to as a state where an entity and feature data are directly connected to each other.

Figure 2B:
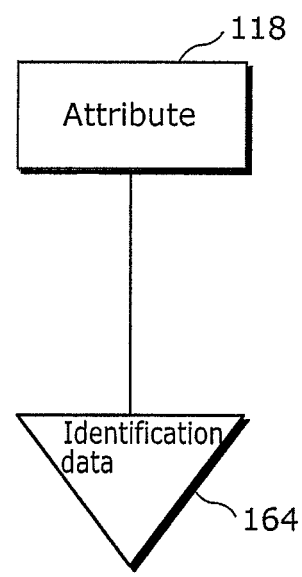
FIG. 2B is a diagram showing a first-level figure representing a relationship between an attribute and identification data.

In a first-level figure shown in FIG. 2B, an attribute is directly connected to identification data, and as a result is identified by the identification data. When an attribute to which only identification data is directly connected is connected to an entity, the attribute to which the identification data is directly connected can be obtained using the identification data, and the entity to which the obtained attribute is directly connected can be obtained. The identification data is used solely for obtaining the attribute directly connected to the identification data and the entity directly connected to the attribute. That is, the identification data is used solely for associating the entity and the attribute within the knowledge base according to the embodiment of the present invention, with the language outside the knowledge base according to the embodiment of the present invention.

An attribute identifier and identification data are alike in that they are both identification information of an attribute and also information for supporting identification by a computer (knowledge base system), but different in that the attribute identifier is information (data) associated with an attribute whereas the identification data is information (data) associated with a term or a word. Feature data and identification data are alike in that they are both a specific example (instance) of an attribute, but different in that the feature data is a substance of an attribute whereas the identification data is data for identifying an attribute by the computer (knowledge base system). A term and a word are information (data) for supporting identification by a human. A conceptual collection of terms and words is "language" or "linguistic world".

The three figures are combined to systematize information as knowledge. A figure directly connecting only an entity and an attribute to each other for association is the second-level figure shown in FIG. 3. In the second level, zero or more attributes are directly associated with one entity. The number of attributes directly associated with one entity is not limited to one. In the second level, entities are not connected to each other. A figure directly connecting only entities to each other for association is the third-level figure shown in FIG. 4. In the third level, an entity and an attribute are not connected to each other. This connection only between entities can be realized in various forms such as a line, a ring, a tree structure, a network structure, and so on.

A figure directly connecting only an attribute and feature data to each other for association is the first-level figure shown in FIG. 2A. The attribute itself directly has no meaning. By directly connecting the attribute and the feature data, the attribute acquires a meaning, or a meaning of the attribute is created. In other words, by directly connecting the attribute and the feature data, a concept is created. For example, feature data generated from an image of an inside-out shirt is directly connected to an attribute, as a result of which a meaning or a concept "inside out" is created.

One attribute may be directly connected to a plurality of pieces of feature data. This allows one meaning or one concept to be created from the plurality of pieces of feature data.

For example, an attribute "Romanesque" is directly connected to a plurality of pieces of feature data generated from images of a plurality of Romanesque buildings. The number of pieces of feature data directly associated with one attribute is not limited to one.

One piece of feature data may be directly connected to a plurality of attributes. The number of attributes directly associated with one piece of feature data is not limited to one. This enables generation of each attribute which is a concept corresponding to a different one of various aspects of one piece of feature data. For example, feature data of an image of a bonfire is directly connected to one attribute, as a result of which a concept "color of bonfire" is created. The feature data of the image of the bonfire is also directly connected to another attribute, as a result of which a concept "warmth of bonfire" is created. This explains why looking at a full-sized image of a bonfire can make one feel warm.

An entity itself has no meaning. A property, a feature, a meaning, or a concept of the entity is defined by an attribute directly connected to and associated with the entity.

Figure 5:
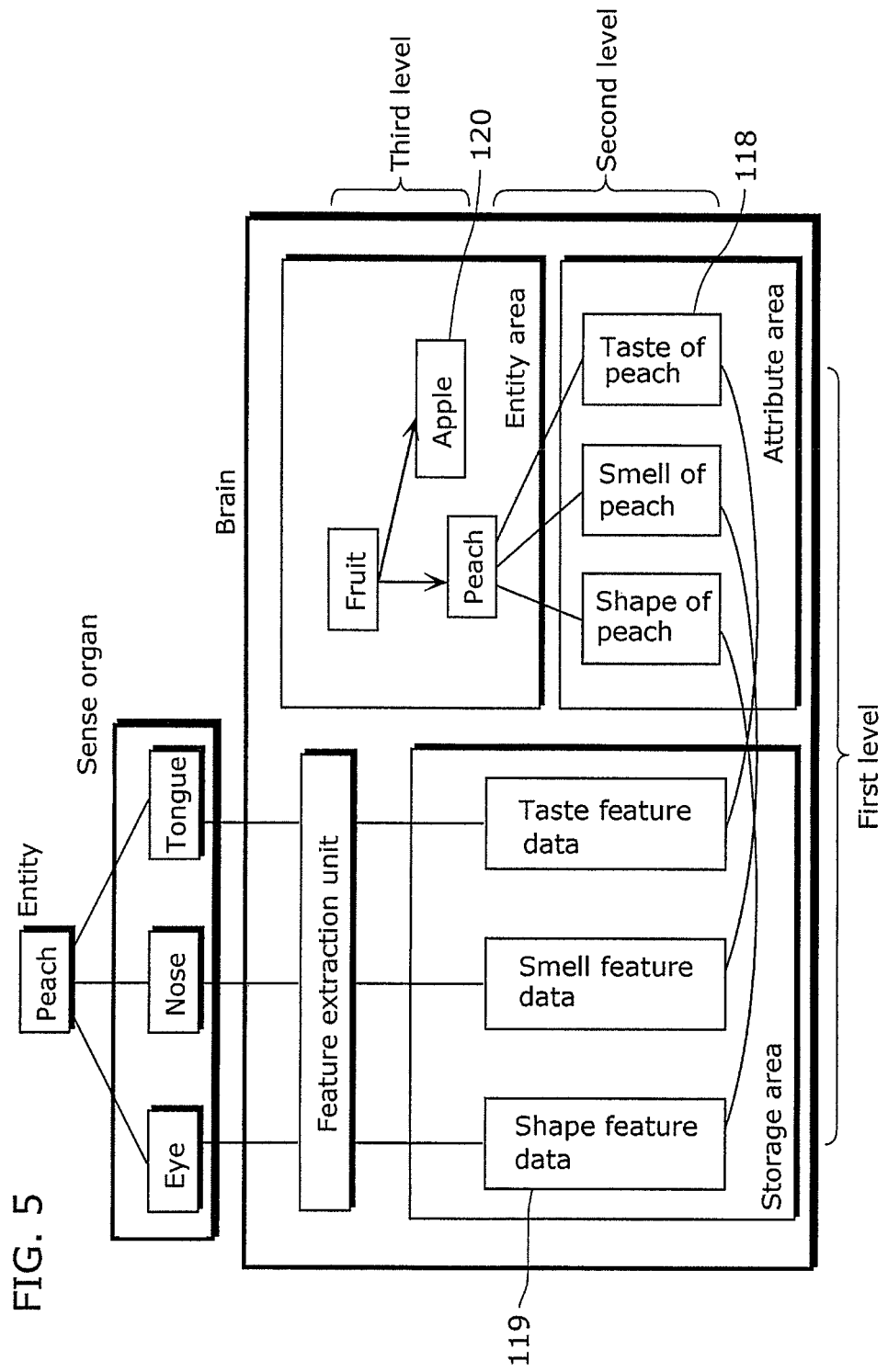
FIG. 5 is a diagram showing a figure that combines the first to third levels.

The second level is located on the first level, and the third level is located on the second level. FIG. 5 shows a combination of the three levels. For example, consider this three-level structure in relation to the human brain, as shown in FIG. 5. One attribute corresponds to one neuron, and one entity corresponds to one neuron. Information directly emitted from an entity which is an object in the real world, such as a shape, a taste, or a smell, is received from a sense organ such as an eye, a tongue, or a nose. A feature extraction unit in the brain extracts a feature from the received information, and stores the extracted feature in a storage area in the brain as feature data. Various features such as a shape, a smell, and a taste are held as feature data. A neuron which is an attribute in an attribute area in the brain is connected to the feature data, as a result of which a meaning or a concept is created. The attribute is connected to a neuron which is an entity in an entity area in the brain, as a result of which a property, a feature, a meaning, or a concept of the entity is defined.

A plurality of concepts may be created from one piece of feature data. Suppose feature data of an image of a fire exists in the knowledge base. This feature data is connected to one attribute, as a result of which a concept "color of fire" is created. The same feature data is also connected to another attribute, as a result of which a concept "warmth" is created. This explains why simply looking at a painting of a fire burning in a fireplace can make one feel warm.

There is also a concept created as a result of connecting one attribute to a plurality of pieces of feature data. Suppose there is an attribute connected to feature data of sourness. Feature data of an image of a lemon is connected to this attribute "sourness", as a result of which a concept "sourness" is created. Feature data of an image of a green apple may also be connected to the attribute "sourness". This explains why simply looking at a lemon can make one feel sour and salivate. Thus, a plurality of different pieces of feature data may be connected to the same attribute to thereby create one concept.

The three-level structure mentioned above allows knowledge to be represented, accumulated, and systematized without using identification data generated from a word. According to this method, even an animal incapable of language use can systematically hold knowledge and perform knowledge processing such as inference.

If capable of language use, it is possible to hold identification data generated from an image of a word expressed in letters, a sound of the word expressed in speech sounds, or the like, and connect the identification data and an attribute to each other for association. When feature data is directly connected to the attribute to which the identification data is directly connected, the word in the language as a source of the identification data and the feature data connected to the attribute are indirectly associated with each other through the identification data and the attribute. When no feature data is directly connected to the attribute to which the identification data is directly connected but an entity is directly connected to the attribute, the word in the language as a source of the identification data and the entity directly connected to the attribute are indirectly associated with each other through the identification data and the attribute. The identification data can also be directly connected to one entity.

However, it is more convenient to represent a plurality of pieces of identification data together by one attribute, by directly connecting identification data generated from an image of letters of the same word and identification data generated from a sound of the same word to the same attribute. When the identification data generated from the image of the letters is directly connected to the attribute to which the identification data generated from the sound is directly connected, the identification data generated from the image of the letters can be promptly obtained without obtaining another attribute. That is, sound-to-letter conversion can be conducted quickly. For example, it is possible to obtain the attribute to which the identification data generated from the sound is directly connected, and then obtain the identification data generated from the image of the letters and connected to the attribute.

Thus, identification data is used to associate a word in the language as a source of the identification data, with an entity or an attribute in the knowledge base. This, however, merely associates the identification data of the word expressed in an image, a sound, or the like with the attribute or the entity. The identification data merely identifies the attribute or the entity in the knowledge base, and does not directly represent or create a property, a feature, a meaning, or a concept.

Feature data of a feature extracted from information that is directly emitted from an object itself and received using a sense organ is a source of a property, a feature, a meaning, or a concept. Identification data generated from a word may also be directly connected to an entity.

In the case where feature data or identification data is directly connected to an entity, the entity is directly identified by the feature data or the identification data. By directly connecting characteristic feature data or identification data to an entity, the entity can be quickly identified by the characteristic feature data or identification data. In this case, the number of pieces of feature data or identification data directly connected to the entity is not limited to one, as a plurality of pieces of feature data or identification data may be directly connected to the entity. The feature data or identification data directly connected to the entity may simultaneously be directly connected to an attribute, with a meaning or a concept being created from the feature data.

Suppose there is feature data generated from an image of a person in a room. Also suppose the feature data is connected to an attribute that is connected to an entity, and the entity is connected to an attribute "person". This attribute is connected to, for example, feature data generated from an image of a person.

The above-mentioned connection between the feature data, the attribute, and the entity indicates that "a person is in a room". An expression "a person is in the universe" does not have a sufficiently clear meaning. This is probably because there is no specific feature data representing "be in the universe" and the attribute is not connected to any feature data. This can also be explained from the fact that a concept "be in the universe" is not created. It is of course possible to provisionally create the concept "be in the universe", by connecting the feature data "a person is in a room" and feature data generated from an image of a starry sky to the attribute. This corresponds to a method of thinking called analogy.

Feature data and an attribute are designated, and a learning unit in the knowledge base system is instructed from outside the knowledge base system to connect the designated feature data and attribute to each other, thereby causing the learning unit to connect the designated feature data and attribute to perform learning.

In the human brain, even when a part of the brain stops working due to internal breeding or the like, another part of the brain may work instead of the part that stops working. This can be explained by a notion that, by reconnecting another neuron to an entity instead of a neuron that stops working, another neuron assumes the same role.

The three-level structure mentioned above can imitate this behavior of the brain. An entity and an attribute each correspond to a neuron. An entity and an attribute themselves have no meaning, and are only identified by a mere identifier having no meaning of the entity or the attribute. Even when reconnecting to another entity or attribute, the same association as before reconnection can be attained.

All entities can be identified by identifiers in a single form. All attributes can be identified by identifiers in a single form. All feature data and identification data can be identified by identifiers in a single form. All entities, all attributes, and all feature data and identification data can be identified by identifiers in a single form. The use of identifiers in two types of forms or the use of identifiers in three types of forms is also possible. Identifiers in four or more types of forms may also be used, though this only leads to a more complex mechanism.

A method whereby two or more neurons are combined as one and associated with one attribute or one entity is also applicable. Normal functioning as a whole can be achieved so long as at least one of a plurality of neurons corresponding to one attribute or one entity is connected.

Both identification data and feature data can be connected to one attribute. Alternatively, two types of attributes, i.e. an attribute connected only to identification data and an attribute connected only to feature data, may be provided.

Suppose an attribute connected only to identification data and an attribute connected only to feature data are connected to one entity. For example, in the case where identification data matching sound identification data generated from a sound of a word heard with ears exists in the knowledge base, an attribute directly connected to the matching identification data is obtained, and an entity directly connected to the attribute is obtained. Further, another attribute directly connected to the entity is obtained, and feature data directly connected to the obtained attribute is obtained. In so doing, a property, a feature, a meaning, or a concept of the entity represented by the word can be detected. This is a function corresponding to association. Moreover, by generating identification data from one word, directly connecting the generated identification data to one attribute, and directly connecting the attribute to several different entities, different entities can be represented by one piece of identification data. This corresponds to polysemy.

It is also possible to directly connect identification data and feature data to the same attribute. In this case, the attribute directly connected to the identification data is obtained, and the feature data directly connected to the obtained attribute is obtained. The obtained feature data represents a property, a feature, a meaning, or a concept directly contained in a word which is a source of the identification data.

When identification data generated from one word is directly connected to a plurality of different attributes, the identification data generated from the word is associated with a plurality of meanings or concepts. This also corresponds to polysemy. If identification data is directly connected to an entity, the entity can be directly selected and identified by the identification data. Since the entity can be obtained without obtaining any attribute, the obtainment of the entity can be accelerated.

An important point is that, by use of the knowledge base system according to the embodiment of the present invention, knowledge can be accumulated and knowledge processing such as recognition and inference can be performed without identification data.

An animal incapable of language use is assumed to have a mechanism of accumulating input information received from the outside world without using identification data generated from a word expressed in letters, speech sounds, or the like, and generating output information based on the accumulated information. This is referred to as fourth information processing in this Description. The fourth information processing is positioned between the second information processing and the third information processing. The knowledge base system according to the embodiment of the present invention is capable of performing the fourth information processing.

It is considered that, though rough, a mechanism of information processing capable of reaching a possible conclusion with a smaller amount of processing than the third information processing is situated between the second information processing and the third information processing. This is referred to as the fourth information processing in this Description. The knowledge base system according to the embodiment of the present invention constructs knowledge represented in the three-level structure, thereby enabling the fourth information processing.

Knowledge accumulation and knowledge processing can be performed using a knowledge base made up of only an entity, an attribute, and identification data. A knowledge base system in this case does not include a property, a feature, a meaning, or a concept. An entity or an attribute is identified only by identification data, with there being no processing for feature data. This provides salient features such as faster processing and a smaller processing load. Even when the knowledge base includes feature data, it is still possible to perform knowledge processing such as inference by using only an entity, an attribute, and identification data.

For example, crows feeding in central Tokyo tear open garbage bags put out in the midnight or early in the morning and scavenge for food. Garbage is scattered from the bags, marring the city's appearance. Peoples take measures such as changing a color of the bags so that crows cannot see inside and adding an ingredient disliked by crows to the bags. However, crows keep scavenging through garbage in the bags, despite the measures taken by people. It appears that crows are learning and fighting a battle of wits with people. The learning as seen in the example of crows is unlikely to be performed by the third information processing. It is more natural to consider that the learning is performed by a method simpler than the third information processing. This is referred to as the fourth information processing in this Description. The fourth information processing can be realized by constructing knowledge represented in the three-level structure mentioned above.

The hypothesis about the fourth information processing has been described above. The following describes a method of performing this hypothesized information processing using a computer system.

A more specific example of the embodiment of the present invention using a computer system is described below, with reference to drawings.

Figure 6:
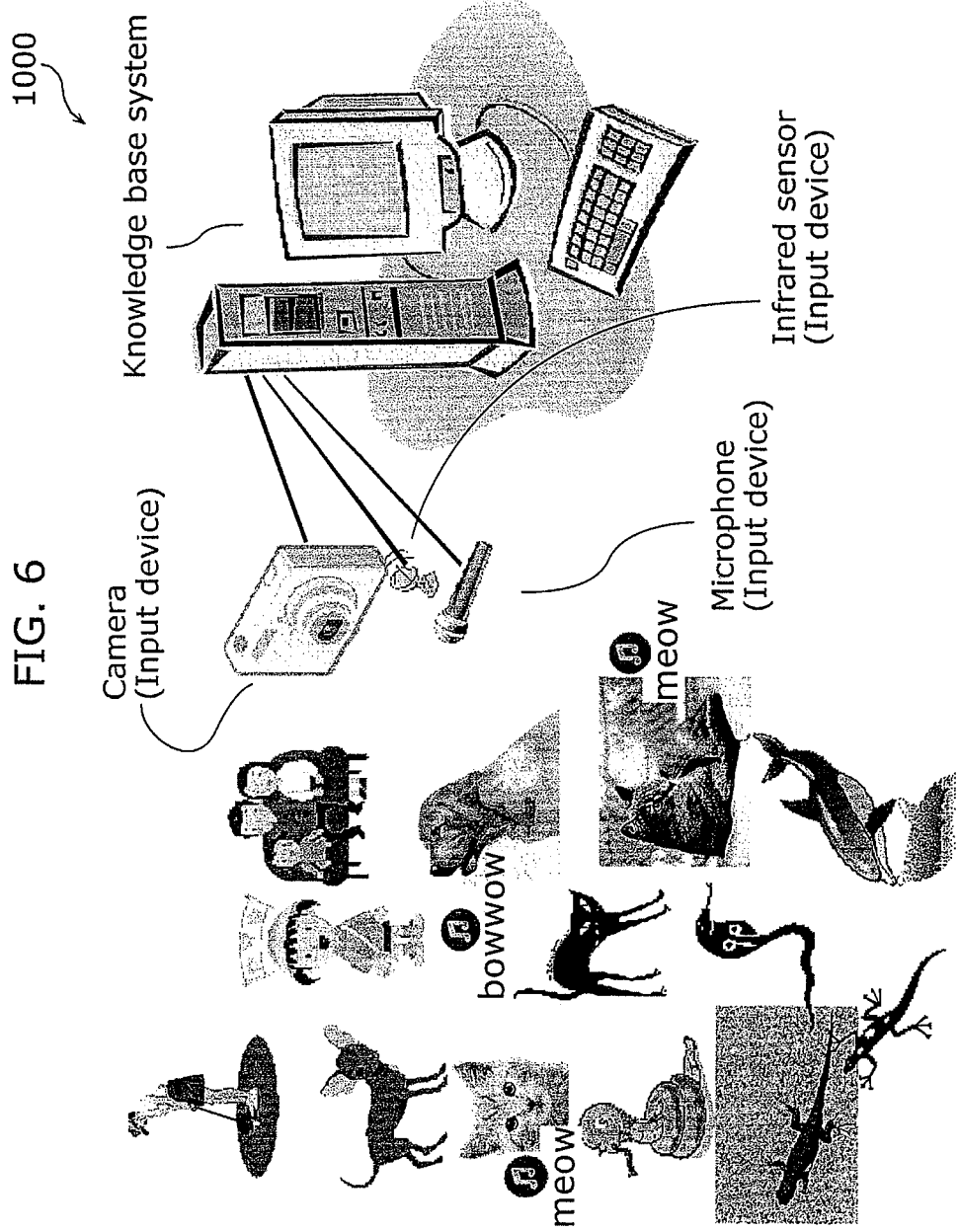
FIG. 6 is a conceptual diagram of a knowledge base system according to the embodiment.

FIG. 6 shows a knowledge base system 1000 according to the embodiment of the present invention. As shown in FIG. 6, a camera, a microphone, an infrared sensor, and so on are connected to a computer as input devices. A computer shown in FIG. 7 is employed in the knowledge base system 1000 shown in FIG. 6.

Figure 7:
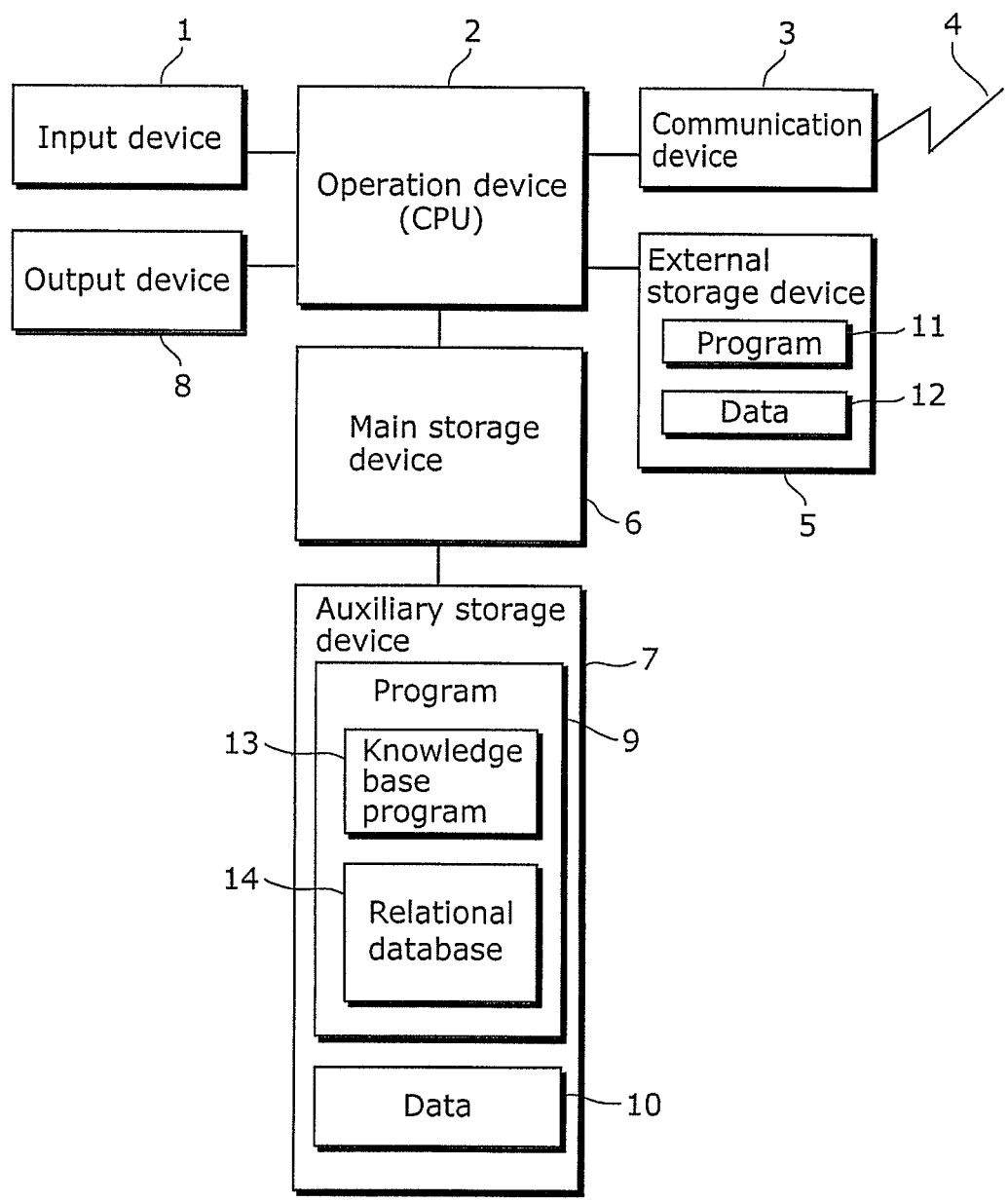
FIG. 7 is a block diagram of a computer system according to the embodiment.

FIG. 7 is a schematic diagram of the computer. The computer shown in FIG. 7 includes an input device 1, an operation device (Central Processing Unit: CPU) 2, a communication device 3, an external storage device 5, a main storage device 6, and an auxiliary storage device 7.

The operation device 2, for example, instructs the auxiliary storage device 7 to read a program 9 and data 10 used by the program 9, which are stored in the auxiliary storage device 7, into the main storage device 6. The operation device 2 also instructs to store a program or data stored in the main storage device 6, into the auxiliary storage device 7. The operation device 2 instructs the external storage device 5 to read data 12 and a program 11 stored in the external storage device 5, into the main storage device 6. The operation device 2 also instructs to store a program or data stored in the main storage device 6, into the external storage device 5.

The input device 1 includes a keyboard, a mouse, a scanner for capturing an image, a camera, a microphone, a temperature sensor, a pressure sensor, and the like. Analog data of an image, a sound, a temperature, or the like is converted to digital data. An output device 8 includes a display device such as a flat display, a printer, a sound output device (speaker), a relay contact, a device controller, and the like.

The operation device 2 instructs the communication device 3 to communicate with another computer or device not shown, via a network 4. Having read the program 9 stored in the auxiliary storage device 7 or the program 11 stored in the external storage device 5 into the main storage device 6, the operation device 2 performs processing according to a procedure described in the read program 9 or 11. The program 9 or 11 includes not only operations but also procedures of input via the input device 1, output via the output device 8, communication using the communication device 3, data reading/writing with the main storage device 6, and data reading/writing with the auxiliary storage device 7 and the external storage device 5.

A knowledge base program 13 is a program for performing logic operations and processing knowledge collections and knowledge networks according to the present invention. A relational database 14 is used for generating data 10 or 12 in table form in the auxiliary storage device 7 or the external storage device 5, and performing processing such as addition, search, reference, update, or deletion on the generated table. The knowledge base program 13 uses the relational database 14 to perform data addition, search, reference, update, or deletion on the table.

Figure 8:
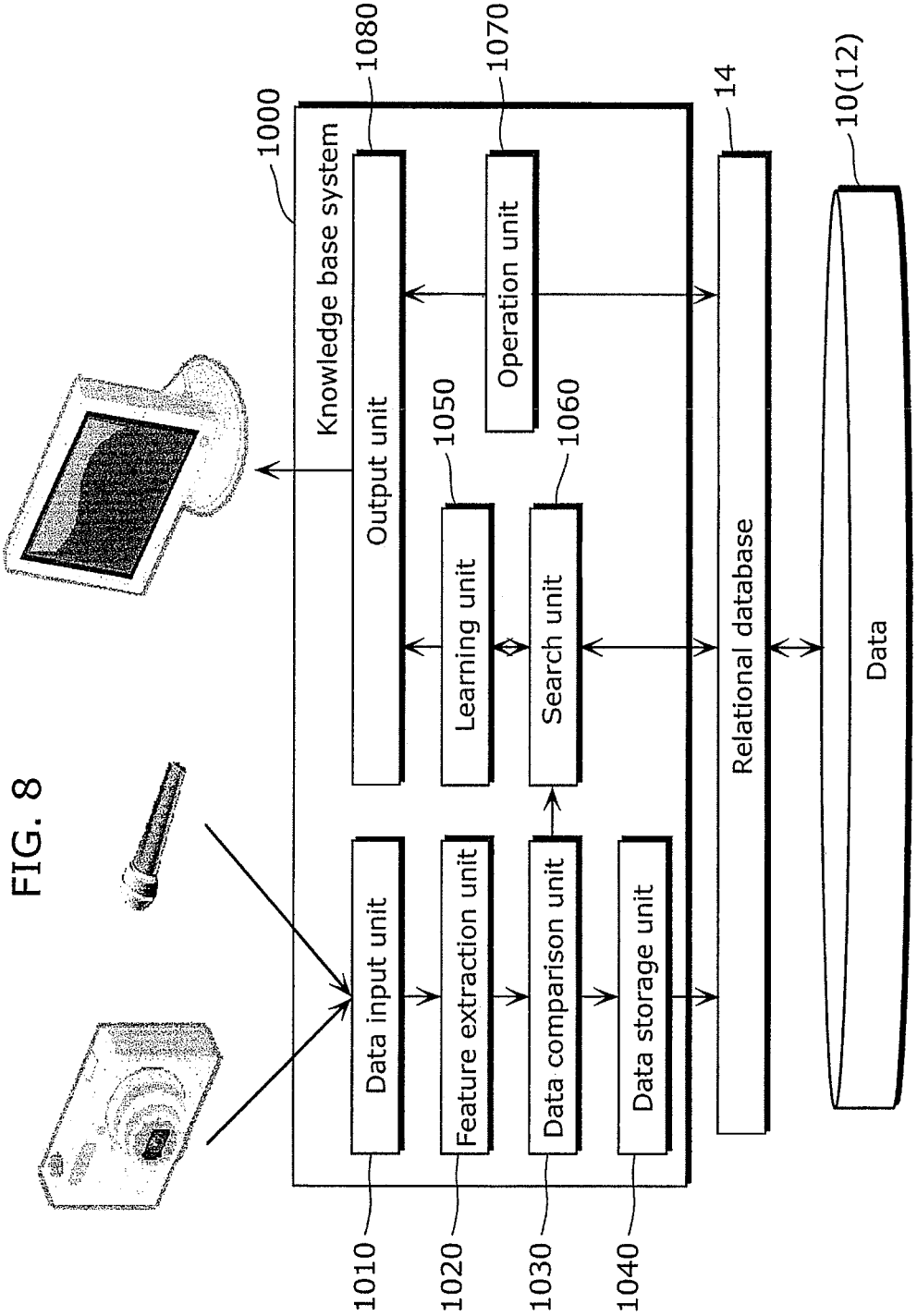
FIG. 8 is a functional block diagram of the knowledge base system according to the embodiment.

FIG. 8 is a functional block diagram of the knowledge base system 1000 according to the embodiment of the present invention. For example, each functional block shown in FIG. 8 is stored in the auxiliary storage device 7 shown in FIG. 4, as the knowledge base program 13. The knowledge base program 13 is included in the program 9 in the auxiliary storage device 7, and programs functioning as, for example, a data input unit 1010, a feature extraction unit 1020, a data comparison unit 1030, a data storing unit 1040, a learning unit 1050, a search unit 1060, an operation unit 1070, and an output unit 1080 are included in the knowledge base program 13. The program 9 is read into the main storage device 6 and executed by the operation device 2. The data input unit 1010 and the output unit 1080 are also read into the main storage device 6 and executed by the operation device 2.

The data input unit 1010 automatically obtains image data by the camera and sound data by the microphone, in the following manner. For example, detection of a person or an animal in front of the camera by the infrared sensor triggers the camera to obtain image data, and the microphone to obtain sound data. Moreover, an operation such as clicking the mouse by someone may trigger the camera to obtain image data and the microphone to obtain sound data.

The feature extraction unit 1020 generates feature data or identification data from input data inputted to the data input unit 1010.

The data comparison unit 1030 compares the feature data (or identification data) extracted by the feature extraction unit 1020, with feature data (or identification data) already stored in the data 10 (or the data 12, hereafter the same).

The data storing unit 1040, in the case where new feature data or identification data is generated by the feature extraction unit 1020, stores the new feature data or identification data in the data 10. The data storing unit 1040 also generates an attribute identifier of a new attribute, and stores the attribute identifier in the data 10 in association with the new feature data or identification data. The data storing unit 1040 further generates an entity identifier of a new entity, and stores the entity identifier in the data 10 in association with the attribute identifier of the new attribute.

Note that the data storing unit 1040 actually requests the relational database 14 to store the new feature data or identification data in the data 10. Other components (the search unit 1060, the operation unit 1070, and the like) accessing the data 10 also request the relational database 14 to perform processing such as data addition, search, reference, update, deletion, or the like, and obtain processing results from the relational database 14. In the following description, however, description about the processing of the relational database 14 is omitted for simplicity's sake.

The following describes operations of the data input unit 1010, the feature extraction unit 1020, the data comparison unit 1030, and the data storing unit 1040 when newly registering feature data or identification data in the data 10 based on input data obtained from outside.

The data input unit 1010 obtains input data such as image data or sound data directly emitted from an object. The feature extraction unit 1020 extracts a feature from the input data such as the image data or the sound data obtained by the data input unit 1010, as feature data or identification data. The feature data or the identification data undergoes several processing, and then is stored in a knowledge base in the data 10.

In detail, the feature extraction unit 1020 extracts the feature data from the input data received from the data input unit 1010, and passes the extracted feature data to the data comparison unit 1030. The data comparison unit 1030 compares the received feature data with feature data already stored in the data 10, to check whether or not the same feature data exists.

In the case where the same feature data does not exist, the data storing unit 1040 stores the feature data in the knowledge base, generates an attribute in the knowledge base, and directly connects the stored feature data and the generated attribute. The data storing unit 1040 also generates an entity, and directly connects the generated entity and the generated attribute. In the case where the same identification data does not exist, the data storing unit 1040 stores the identification data in the knowledge base, generates an attribute in the knowledge base, and directly connects the stored identification data and the generated attribute. The data storing unit 1040 also generates an entity, and directly connects the generated entity and the generated attribute.

One attribute to which a plurality of pieces of feature data are directly connected aggregates all of the pieces of feature data together, thereby representing a property, a feature, a meaning, or a concept representative of all of the pieces of feature data. An attribute to which only one piece of feature data is connected also represents a property, a feature, a meaning, or a concept of the feature data. The number of pieces of feature data connected to one attribute is not limited to one.

One attribute to which only a plurality of pieces of identification data are directly connected aggregates all of the pieces of identification data, thereby representing all of the pieces of identification data. The number of pieces of identification data connected to one attribute is not limited to one.

A specific example in the case of causing the computer to execute the above-mentioned processing is described below, with reference to FIGS. 9 and 10. FIG. 9 is a diagram showing an example of an attribute identifier/feature data correspondence table. FIG. 10 is a diagram showing an example of an entity identifier/attribute identifier correspondence table.

In the attribute identifier/feature data correspondence table shown in FIG. 9, an attribute identifier and a feature data identifier (a memory address in which feature data is stored, in this example) are associated with each other. That is, "attribute" in this Description includes an attribute identifier and feature data associated with the attribute identifier, as shown in FIG. 9.

Note that the attribute identifier is not a word representing the attribute, and is made of a symbol (a numeric string in this example) that has no meaning per se. The feature data is data representing the content of the attribute, for example, data representing at least one of a shape, a sound, a smell, a taste, a color, a pressure, a temperature, a length, a coordinate value, and an area of the attribute identified by the attribute identifier.

Though not shown, an attribute identifier and identification data (or identification data identifier) associated with the attribute identifier may be held in the table shown in FIG. 9. The identification data is data generated from a word representing the attribute.

As is clear from FIG. 9, a plurality of pieces of feature data (or identification data) may be associated with one attribute identifier, and one piece of feature data (or identification data) may be associated with different attribute identifiers.

In the entity identifier/attribute identifier correspondence table shown in FIG. 10, an entity identifier and an attribute identifier are associated with each other. Note that the entity identifier is not a word representing an entity, and is made of a symbol that has no meaning per se. That is, "entity" in this Description is represented by an entity identifier and a set of zero or more attribute identifiers associated with the entity identifier.

First, the data storing unit 1040 stores new feature data (or identification data, hereafter the same) extracted by the feature extraction unit 1020 in the data 10, and then generates a new attribute identifier. Here, the data storing unit 1040 generates the new attribute identifier that does not overlap with any attribute identifier already registered in the correspondence table shown in FIG. 9. The data storing unit 1040 registers the newly generated attribute identifier and an identifier of the feature data stored in the data 10 in association with each other, in the attribute identifier/feature data correspondence table shown in FIG. 9.

Next, the data storing unit 1040 generates a new entity identifier. Here, the data storing unit 1040 generates the new entity identifier that does not overlap with any entity identifier already registered in the correspondence table shown in FIG. 10. The data storing unit 1040 registers the entity identifier and the above-mentioned attribute identifier in association with each other, in the entity identifier/attribute identifier correspondence table shown in FIG. 10.

As an example, unused entity identifiers may be held in the data 10, with the new entity identifier being obtained from among the unused entity identifiers. Moreover, unused attribute identifiers may be held in the data 10, with the new attribute identifier being obtained from among the unused attribute identifiers. Furthermore, unused feature data identifiers or unused identification data identifiers may be held in the data 10, with the new feature data identifier or the new identification data identifier being obtained from among the unused feature data identifiers or the unused identification data identifiers. Applying a common form to an attribute identifier, an entity identifier, a feature data identifier, and an identification data identifier contributes to a simplified mechanism.

The learning unit 1050 organizes relationships between entity identifiers, attribute identifiers, and feature data identifiers (identification data identifiers) shown in FIGS. 9 and 10, based on information obtained from outside. The search unit 1060 searches the correspondence tables shown in FIGS. 9 and 10, according to an instruction from the data comparison unit 1030 or the learning unit 1050. These processing will be described in detail later.

The operation unit 1070 performs a logic operation on the knowledge base stored in the data 10. In more detail, when at least one entity identifier is designated as an operation target, the operation unit 1070 performs the logic operation on an attribute associated with the entity identifier. Specific examples of the logic operation include an AND operation, an OR operation, a NOT operation, a NAND operation, a NOR operation, commonality calculation, non-commonality calculation, similarity calculation, and non-similarity calculation. These processing will be described in detail later.

The output unit 1080 functions as a device driver for outputting a learning result of the learning unit 1050, an operation result of the operation unit 1070, or the like to the output device 8.

In the following, "entity" and "attribute" are described as being subjected to processing. In actual processing in the knowledge base system 1000, however, an entity identifier for identifying the entity and an attribute identifier for identifying the attribute are subjected to processing.

For example, "connecting an entity and an attribute to each other" denotes that an entity identifier and an attribute identifier are registered in the entity identifier/attribute identifier correspondence table shown in FIG. 10 in association with each other. In addition, "obtaining an entity connected to an attribute" denotes that an entity identifier associated with an attribute identifier is obtained. Further, "generating an entity" denotes that a new entity identifier is generated. These are merely examples, and the same interpretation applies to other similar expressions.

This embodiment describes an example of implementation by a computer system using software. A procedure described in information which is a program can be replaced by hardware. Hence, the present invention can equally be implemented as an operation device such as a processor or an integrated circuit.

A method whereby the above-mentioned hypothesis about the fourth information processing is realized using a computer is described below. The following describes the embodiment of the present invention.

Regarding the fourth information processing, four aspects, namely, (1) knowledge form, (2) knowledge operation, (3) knowledge collection and knowledge network, and (4) knowledge collection and knowledge network use method, are described in sequence. The knowledge form is described first.

In the conventional third information processing, knowledge is expressed in spoken language or language written in letters, i.e. in a form of a word sequence. Animals incapable of language use unlike contemporary humans cannot use knowledge in the form of the word sequence. Such animals are therefore incapable of performing the third information processing.

The following examines (1) knowledge form in the fourth information processing. Since a knowledge base system is an information system that deals with knowledge, a form of information in the knowledge base system is a form of knowledge, too. In the fourth information processing, an entity is set as a basic unit of knowledge. One entity is one knowledge. Entities include not only concrete entities such as stones and mountains, but also abstract entities such as coldness, sizes, web pages, and sounds.

An entity can have an attribute which is a predetermined property. The number of attributes of one entity is not limited to one, as one entity can have zero or more attributes. A group of zero or more attributes is referred to as an attribute set. One aspect of a logic operation is a set operation. In the case of performing a logic operation on an attribute, it is sometimes convenient to treat all attributes of one entity as an attribute set. One attribute set includes zero or more attributes. An entity has an attribute as ancillary information, or an entity has an attribute set as ancillary information. Note that "an entity has an attribute" denotes not only that the entity has the attribute itself but also that the entity has a pointer to the attribute. Likewise, "an entity has an attribute set" denotes not only that the entity has the attribute set itself but also that the entity has a pointer to the attribute set.

The following describes a method of representing an attribute of an entity without using a word. First, coordinate axes are used in the following description. Coordinate axes are used because they are likely to facilitate intuitive understanding. The use of coordinate axes is not an essential feature of this embodiment, and is merely an example for easier understanding.

Figure 11:
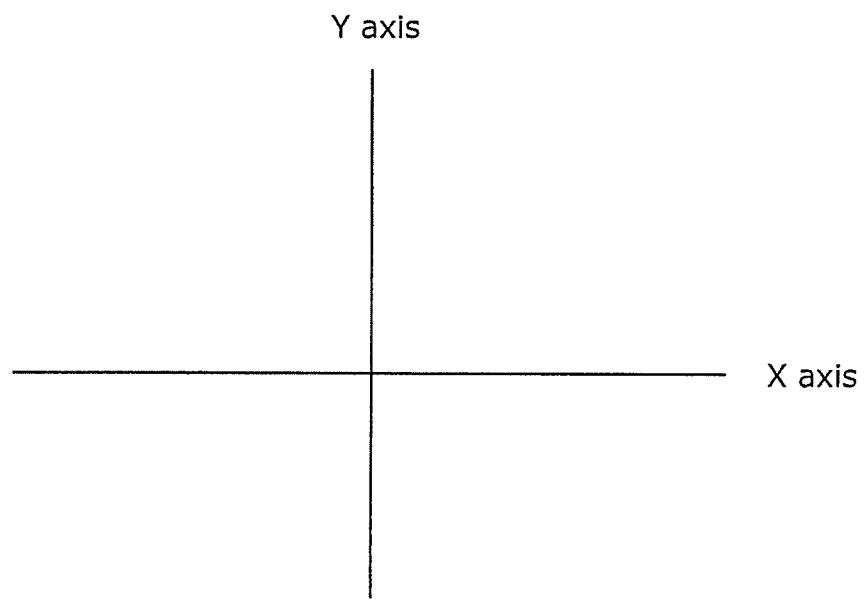
FIG. 11 is a diagram showing a two-dimensional orthogonal coordinate system.
Figure 12:
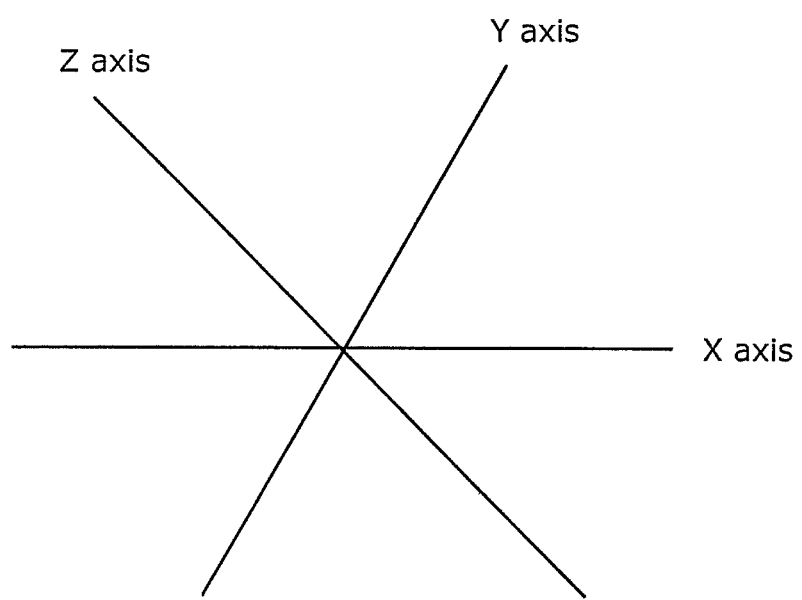
FIG. 12 is a diagram showing a three-dimensional coordinate system whose coordinate axes intersect at an angle smaller than a right angle.

In FIG. 11, an X axis and a Y axis intersect at a right angle, allowing a figure on a plane to be represented. When three coordinate axes of the X axis, the Y axis, and a Z axis intersect at a right angle, a three-dimensional solid can be represented. When the X axis, the Y axis, and the Z axis intersect at an angle smaller than a right angle, three coordinates can be represented on a plane, as shown in FIG. 12. By further reducing an angle at which coordinate axes intersect, more coordinate axes can be represented on a plane.

Figure 13:
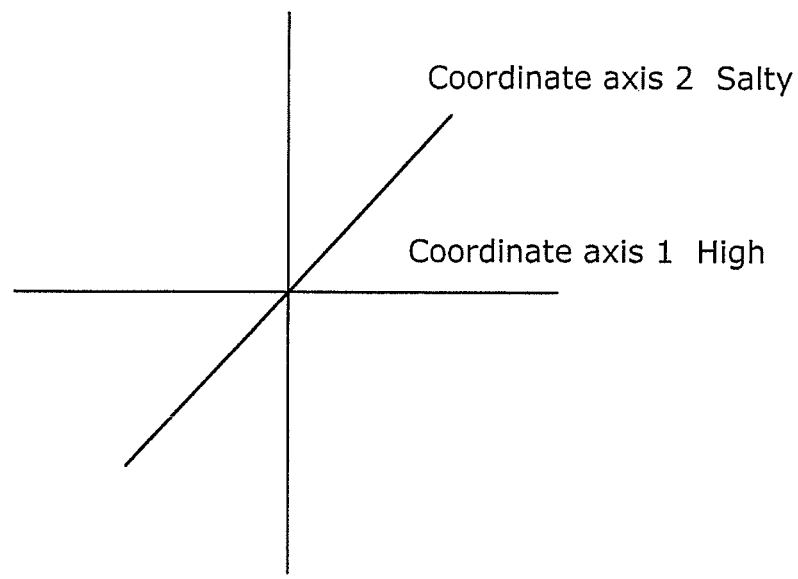
FIG. 13 is a diagram showing an example where attributes are represented by coordinate axes.

FIG. 13 shows an example where an attribute corresponds to a coordinate axis, in the embodiment of the present invention. In FIG. 13, attributes are represented by coordinate axes in three dimensions. One attribute is represented by one coordinate axis. A coordinate axis 1 represents an attribute "high", a coordinate axis 2 represents an attribute "salty", and a coordinate axis 3 represents an attribute "sweet".

Here, correspondence between an attribute and a coordinate axis is merely intended for simplicity's sake. That is, correspondence between an attribute and a coordinate axis is not an essential feature of this embodiment. Besides, the coordinate axes 1, 2, and 3 intersect at a right angle in FIG. 13, merely for easier understanding of this embodiment. This is merely an example for simplicity, and at which angle the coordinate axes intersect is not an essential feature of this embodiment.

An entity typically has one or more attributes. In the example shown in FIG. 13, an attribute corresponds to a coordinate axis. The attribute is represented by a combination of an identifier of the coordinate axis and a true-false value indicating true or false. The true-false value can take any of three values that are: a true value; a false value; and a value that is neither true nor false. For example, the true value is set as "1", the false value is set as "−1", and the value that is neither true nor false is set as "0".

In each coordinate axis corresponding to an attribute of an entity, an entity whose true-false value is "1" has the attribute represented by the coordinate axis. Meanwhile, an entity whose true-false value is "−1" does not have the attribute, and an entity whose true-false value is "0" is not characterized by the attribute. The true-false value may be set to "0" in the case where whether true or false is not defined, i.e. in the undefined case. It is natural to represent one attribute by a combination of one attribute identifier for identifying the attribute and one true-false value. An identifier of the true-false value may be used instead of the value such as "1", "−1", or "0". That is, the true-false value may be any of three identifiers for identifying: "true"; "false"; and "neither true nor false". For example, the identifier of "true" may be set as 20005", the identifier of "false" as "20006", and the identifier of "neither true nor false" as "20007".

An attribute may have no true-false value. In the case where an entity has an attribute, a true-false value of the attribute may be set as true. In the case where the entity does not have the attribute, on the other hand, the true-false value of the attribute may be set as false. In the case where the entity does not have the attribute, the true-false value may be set as false or undefined. Here, "undefined" denotes that whether it is true or false is not defined. Since the attribute has no true-false value in this method, logic operation processing can be simplified. In the world of mathematics, the discovery of the number 0 (zero) has a great significance. It seems that sophisticated information handling is required to clearly distinguish a state where an entity does not have an attribute by a form in which the attribute has a true-false value indicating false. Accordingly, when limiting only to the fourth information processing, the method whereby an attribute has no true-false value seems to be more natural.

Take an entity "mountain" as an example. Suppose "mountain" has an attribute "high". The attribute "high" is connected to feature data extracted from an image of a high mountain. Since an entity typically has a plurality of attributes, the entity "mountain" has an attribute set including the attribute "high". This being the case, "mountain is high" is true. Meanwhile, "mountain is salty" is not true. "Rock salt mountain is salty" is true. This is because "rock salt mountain" has both an attribute of "rock salt" and an attribute of "mountain". "Rock salt" has the attribute "salty", so that "rock salt mountain" has the attributes "high" and "salty".

The entities "mountain", "rock salt", and "rock salt mountain" can be described as follows, using coordinate axes and true-false values.

(1) Mountain: 1 in the coordinate axis 1
(2) Rock salt: 1 in the coordinate axis 2, −1 in the coordinate axis 3
(3) Rock salt mountain: 1 in the coordinate axis 1, 1 in the coordinate axis 2, −1 in the coordinate axis 3

This can also be described as follows, using symbols.
(1) Mountain (1: 1)
(2) Rock salt (2: 1, 3: −1)
(3) Rock salt mountain (1: 1, 2: 1, 3: −1)

An entity is shown on the left of the left bracket, the brackets as a whole represent an attribute set of a word, and the inside of the brackets represents each individual attribute of the entity. The number on the left of ":" in the brackets is an attribute identifier of an attribute, whereas the number on the right of ":" is a true-false value of the attribute. In the case where an entity is not characterized by an attribute, an attribute identifier of a corresponding coordinate axis and a true-false value are omitted. A state where an entity does not have an attribute can be considered as a state where the attribute does not influence a meaning of the entity, or there is no information about a relationship between the entity and the attribute.

It is also possible to describe an attribute only in the case where an entity has the attribute, that is, a true-false value of the attribute of the entity is true. No true-false value is used in this case. This method seems to be more natural in the fourth information processing. This method is closer to the above-mentioned hypothesis. The following is an example where an attribute without a true-false value is described only in the case where a true-false value of an attribute of an entity is true.
(1) Mountain (1)
(2) Rock salt (2)
(3) Rock salt mountain (1, 2)

An attribute identifier of an attribute may include a primary identifier and a secondary identifier. The primary identifier represents a basic property of the attribute, while the secondary identifier represents a more detailed property of the attribute such as a degree or a state. The secondary identifier corresponds to an adverb. The primary identifier of the attribute corresponds to an identifier of a primary attribute in the above-mentioned hypothesis, and the secondary identifier of the attribute corresponds to an identifier of a secondary attribute in the above-mentioned hypothesis. There may be a situation where an attribute only includes a primary attribute. Both a primary attribute and a secondary attribute are attributes, and have the same data structure.

For example, an attribute "height" can have a more detailed attribute such as "tall", "slightly tall", or "short". Taking the height as an example, a primary identifier which is an identifier of a primary attribute can be associated with a basic attribute "height", while a secondary identifier which is an identifier of a secondary attribute can be associated with an attribute such as "tall" or "short" that modifies the basic attribute. For example, feature data generated from an image of measuring a height of a person with a height measuring rod is directly connected to and associated with the primary attribute, and feature data generated from an image of a short person is directly connected to and associated with the secondary attribute.

Understanding can be facilitated by associating the primary identifier with an identifier of a coordinate axis and the secondary identifier with a position or a range on the coordinate axis. In this case, feature data corresponding to the value, range, degree, or state associated with the secondary identifier is directly connected to and associated with the secondary attribute, where the secondary identifier which is the identifier of the secondary attribute and an identifier of the feature data are associated with each other. Examples of the feature data directly associated with the secondary attribute include not only feature data of a numeric value, but also feature data generated from information obtained by a sensor or a sense organ called five senses, such as a sound or an image. The secondary identifier which is the identifier of the secondary attribute modifies the primary identifier which is the identifier of the primary attribute, like an adverb. Using the primary identifier as a key, the feature data directly corresponding to the primary identifier of the attribute can be obtained. Using the secondary identifier as a key, the feature data directly corresponding to the secondary identifier of the attribute can be obtained.

Since every attribute does not necessarily have a more detailed attribute, there is a situation where the secondary identifier which is the identifier of the secondary attribute is not needed. In this case, the value of the secondary identifier may be omitted or set to a special value such as 0, thereby indicating that there is no detailed property. As an example, the secondary identifier is shown following "*" on the right of the primary identifier in the case where there is a detailed property, whereas "*" and the secondary identifier are omitted in the case where there is no detailed property.

For example, a secondary identifier corresponding to "very salty" is 9, and a secondary identifier corresponding to "slightly salty" is 1. A plurality of secondary identifiers may further be provided in stages between "slightly salty" and "very salty". This can be described by the following expressions. A secondary identifier is an identifier, too. Accordingly, a secondary identifier may be such an identifier that, for example, indicates data representing the feature "very salty", e.g. indicates feature data of the value of 9. In the following example, the same character is used as the data representing the feature "very salty" and its secondary identifier, to facilitate intuitive understanding.
(1) Mountain (1: 1)
(2) Rock salt (2*9: 1, 3: −1)
(3) Rock salt mountain (1: 1, 2*9: 1, 3: −1)

Suppose A represents "mountain", B represents "rock salt", and C represents "rock salt mountain". Each of A and B is not a word representing a meaning of an entity, but is an "entity identifier" for simply identifying the entity without representing the meaning of the entity. The entity has one "entity identifier" and one attribute set. An identifier such as 30003 may be used instead of A. The set can include zero or more attributes, and so the number of attribute identifiers representing attributes corresponding to the "entity identifier" of the entity is not limited to one, but may be zero, one, or two or more.
(1) A (1: 1)
(2) B (2*9: 1, 3: −1)
(3) C (1: 1, 2*9: 1, 3: −1)

Replacing A with 1000, B with 1001, and C with 1002 yields the following.
(1) 1000 (1: 1)
(2) 1001 (2*9: 1, 3: −1)
(3) 1002 (1: 1, 2*9: 1, 3: −1)

Moreover, showing only the attributes whose true-false values are true yields the following.
(1) 1000 (1)
(2) 1001 (2*9)
(3) 1002 (1, 2*9)

In this way, an entity can be represented as a point, a line, a plane, a solid, or the like, in a space in which attributes are set as coordinate axes. An overlap extent and closeness of two entities in the space in which the attributes are set as the coordinate axes indicate relatedness between the two entities.

The use of such a data structure allows entities and attributes associated with the brain's neurons to be represented efficiently. Connections between entities and attributes associated with the brain's neurons can be represented by representing the entities and the attributes by identifiers for identifying the entities and the attributes. Identifiers for identifying entities and attributes are used as keys to search for entities and attributes, thereby obtaining connected entities and attributes. A correspondence table between entity identifiers and attribute identifiers is generated for the connected entities and attributes. By searching the table using an entity identifier as a key, an attribute identifier connected to the entity can be obtained. By searching the table using an attribute identifier as a key, an entity identifier connected to the attribute can be obtained. In addition, a correspondence table between attribute identifiers and feature data is generated beforehand for connected attributes and feature data. By searching the table using an attribute identifier as a key, feature data connected to the attribute can be obtained. By searching the table using feature data, an attribute identifier connected to the feature data can be obtained. Thus, connections between entities, attributes, and feature data can be imitated.

In this embodiment, connections between neurons are imitated in such a manner that entities and attributes are represented only by identifiers which simply identify the entities and the attributes without representing their meanings, and an entity or an attribute is selected and obtained using an identifier as a key, rather than connecting neurons corresponding to entities and attributes by dendrites and the like.

In a conventional information system, a person is associated with an identifier that is an employee number. Conventionally, a person can have a plurality of identifiers of different forms including not only an employee number but also a pension number and the like. A car has identifiers such as a license plate number and a production number. The employee number, the pension number, and the car number are each information of a different form. The same entity "person" can have identifiers of different forms. Different entities "person" and "car" have identifiers of different forms.

In this embodiment, every entity has only an identifier of the same single form, where an entity and an entity identifier are in a one-to-one correspondence with each other. Moreover, every attribute has only an identifier of the same single form, where an attribute and an attribute identifier are in a one-to-one correspondence with each other. In addition, a true-false value may be an identifier indicating a true-false value. In this case, the true-false value is either an attribute "true" or an attribute "false". The attribute "true" is connected to feature data representing "true", whereas the attribute "false" is associated with feature data representing "false". All identifiers including an identifier of a primary attribute which is a primary identifier of an attribute, an identifier of a secondary attribute which is a secondary identifier of an attribute, and an identifier of a true-false value can be limited to the same form as an entity identifier.

When receiving information from outside, a feature is extracted from the received information. The extracted feature is held as feature data. The held feature data is associated with an entity identifier or an attribute identifier. When outputting information to outside, identification data connected to an entity or an attribute is obtained, a word is generated from the obtained identification data, and the generated word is outputted. Identification data generated from a word "hana" in Japanese and "flower" in English is connected to one attribute. Feature data generated from an image of an actual blooming flower is associated with another attribute. These two attributes are associated with one entity. In this way, it is possible to obtain an entity from one attribute and then obtain another attribute connected to the same entity. As a result, feature data of an image or identification data of a word connected to an attribute can be outputted. For example, the identification data of the word "flower" can be obtained from the feature data of the flower image and outputted.

The following describes (2) knowledge operation in the fourth information processing.

Consider a method of checking whether or not rock salt is salty. That is, consider a method of checking whether or not an entity has a given attribute. The following description is possible using a virtual programming language.

B. include ((2*9: 1))

B is a word or an identifier representing an entity, and has an attribute set. An argument (2*9: 1) is an attribute set including one attribute. In the case where an entity name or an entity identifier is described in an expression, an attribute set of a corresponding entity is subjected to an operation. Though the attribute set includes one attribute in this example, the number of attributes may be zero or more than one. The program "B. include ((2*9: 1))" returns a true value as a return value, when the attribute set of B includes the same attribute as the argument. The program returns a false value as a return value, when the attribute set of B includes the same attribute identifier but its true-false value is different. The program returns, as a return value, a value indicating that the same attribute is not included, when the attribute set of B does not include the same attribute identifier. A NULL value may be used as the value indicating that the same attribute is not included. Alternatively, the program may return a false value as a return value, when the attribute set of B does not include the same attribute identifier. According to this operation, it is possible to check whether or not an entity has a given attribute.

A name may be assigned to the attribute set (2*9: 1) and included in the expression. For example, a name "verySalty" may be assigned to (2*9: 1), yielding an expression "B. include (verySalty)".

In actuality, a program "include" performs the following processing to generate a true value, a false value, or a NULL value. B is referred to as an entity having an attribute set to be compared, and an attribute set which is an argument of the program, i.e. verySalty, is referred to as an attribute set to compare. In the case where all attributes of the attribute set to compare are included in the attribute set to be compared and also their true-false values match, a true value is returned as a return value. In the case where all attributes of the attribute set to compare are included in the attribute set to be compared but there is a mismatch of any of their true-false values, a false value is returned as a return value. In the case where at least one of the attributes of the attribute set to compare is not included in the attribute set to be compared, a NULL value is returned as a return value, indicating that there is an attribute incapable of comparison. A false value may instead be returned in the case where at least one of the attributes of the attribute set to compare is not included in the attribute set to be compared. Whether to return NULL or false depends on a design decision of the program. The return values and conditions used here are merely an example, and other combinations of return values and conditions may instead be used.

In the case where the same attribute is not included, it is convenient if a method of checking whether or not a similar attribute is included is available. That is, for a predetermined number of attributes or more to compare, in the case where primary identifiers are included in the attribute set to be compared and also their true-false values match, a true value is returned as a return value. This is merely an example, and other conditions are also applicable.

An example of conditions in which false and NULL are returned as return values is shown below. This is merely an example, and other conditions are also applicable. In the case where the primary identifiers of the attributes of the attribute set to compare are included in the attribute set to be compared but the number of matches of their true-false values is less than a predetermined number, a false value is returned as a return value. In the case where none of the primary identifiers of the attributes of the attribute set to compare is included in the attribute set to be compared, a NULL value is returned as a return value, indicating that comparison is impossible. These conditions are merely an example, and any other appropriate conditions may instead be used.

Describing in a virtual programming language yields the following program. The following program isLike is a program for determining a degree of similarity.

B. isLike ((2*9: 1))

This can equally be described as B. isLike (verySalty).

A secondary identifier of an attribute indicates a value, a value range, a degree, a state, or the like, as supplementary information. A secondary identifier of an attribute, that is, a secondary attribute, is connected to a value, a value range, a degree, or a state which is feature data. It is possible to designate a primary identifier and apply a determination criterion of whether or not the same primary identifier and the same secondary identifier are included. By holding the value or the range which is the feature data corresponding to the secondary identifier beforehand and obtaining information of the value or the range using the secondary identifier as a key, direct value comparison can be carried out.

A primary attribute "height" can be connected to a secondary attribute that is connected to feature data of a specific value such as 190 cm. However, there is also an attribute that is not clear, such as an attribute "tall". Concerning a Japanese male, most people determine that 185 cm is tall. 60% of people may determine that 180 cm is tall. Thus, there is often an attribute that does not have a clear boundary.

A theory of fuzzy set enables such an attribute with no clear boundary to be represented appropriately. A secondary attribute is connected to a membership function in a fuzzy set, instead of feature data of a specific height range. When an actual value is given as an argument, the membership function generates a value in a range from 0 to 1. This value indicates a degree. When the generated degree is equal to or more than a predetermined value, the secondary attribute of the fuzzy function is determined as true. In this case, a primary attribute and a secondary attribute that is connected to a fuzzy function with feature data are set as an attribute of an entity.

A numeric value, sound data, image data, moving image data, and the like are also included in actual data. Feature data generated from the actual data is connected to the same attribute as a fuzzy function. The actual data is not limited to the above-mentioned data. For example, a length breadth ratio may be obtained from face image data, where a degree of round face is generated according to a held membership function using the ratio as an argument.

A degree is generated by executing a membership function held beforehand, using an actual value as an argument. A true-false value may be set to true when the generated degree is equal to or more than a predetermined value, and false when the generated degree is less than the predetermined value.

Figure 14:
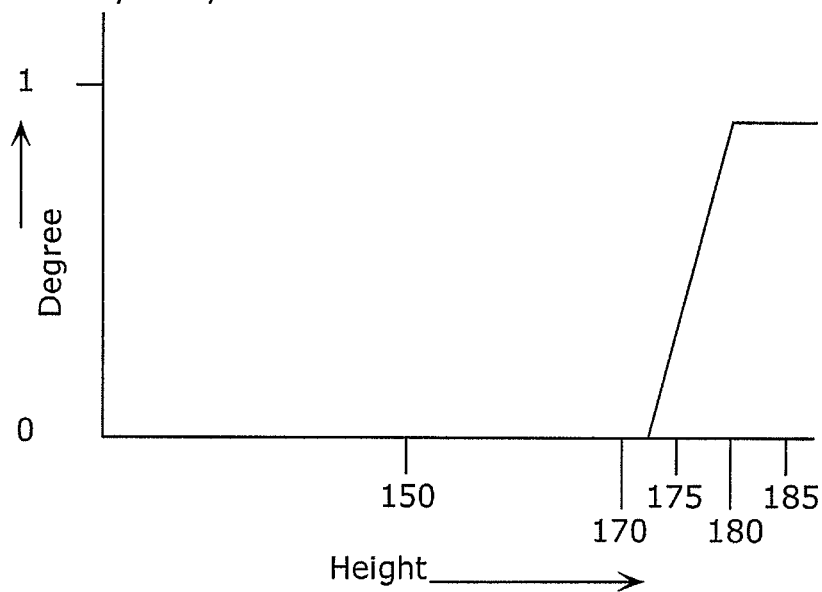
FIG. 14 is a diagram showing an example of a fuzzy set.

FIG. 14 shows an example of a fuzzy set in the embodiment. When data such as a specific value in a horizontal axis in FIG. 14 is given, a membership function generates a value from 0 to 1 indicating a degree as shown in a vertical axis in FIG. 14, and returns the value indicating the degree as a return value.

As a method of generating an attribute that is not clear, there is a method whereby various feature data and identification data are connected to one attribute. For example, in speech recognition, a word is pronounced by a number of people, and identification data is generated from their pronunciation. A plurality of pieces of identification data generated as a result are connected to one attribute. This attribute indicates a speech representation of the word. When identification data same as any identification data connected to the attribute is generated from input speech, the input speech is recognized as the attribute. This method can also be used for feature data, and is applicable to all kinds of information including not only sounds but also images.

There is a need to know to what degree attributes are common between two attribute sets. This degree of being common is referred to as a degree of commonality. For example, whether or not any attribute has the same attribute identifier and the same true-false value between two attribute sets is checked. When the number of pairs of matching attributes is one, the degree of commonality is set to 1. When the number of pairs of matching attributes is two, the degree of commonality is set to 2. Thus, the degree of commonality can be calculated by a program that returns, as the degree of commonality, the number of pairs of matching attributes. In the case where an attribute has a weight as ancillary information, the degree of commonality may be counted by also adding weights of the matching attributes. The weight addition is also included in the counting. This commonality calculation method is merely an example, and other methods may instead be used.

There is also a need to know to what degree attributes do not match between two attribute sets. This degree of mismatch is referred to as a degree of non-commonality. For example, whether or not any attribute has the same attribute identifier but differs in true-false value between two attribute sets is checked. When the number of pairs of such attributes is one, the degree of non-commonality is set to 1. When the number of pairs of such attributes is two, the degree of non-commonality is set to 2. Thus, the degree of non-commonality can be calculated by a program that returns, as the degree of non-commonality, the number of pairs of such attributes. In the case where an attribute has a weight as ancillary information, the degree of non-commonality may be counted by also adding weights of the attributes. This non-commonality calculation method is merely an example, and other methods may instead be used.

The degree of commonality and the degree of non-commonality can be used as a criterion of to what degree two attribute sets are similar or to what degree two attribute sets are not similar. The program for calculating the degree of commonality can also return a list of matching attributes, as a return value. The program for calculating the degree of non-commonality can also return a list of mismatching attributes, as a return value.

A high degree of commonality indicates that the number of common attributes is large. A degree of non-commonality more than 0 indicates a possibility that opposing attributes are included. One may feel "there is something wrong", when reading a book or listening to a story. This feeling can be associated with the case where the degree of non-commonality is more than 0. There is a possibility of some kind of contradiction, when the degree of commonality is high but also the degree of non-commonality is not 0.

The AND operation newly generates an attribute set composed of attributes common to two attribute sets. A program performing the AND operation collects each attribute having the same attribute identifier and the same true-false value between two attribute sets, and generates a new attribute set composed of the collected attributes. For example, this can be described as follows. The AND operation is also an intersection. The AND operation can be written, for example, as (A AND B=c=$\phi$). Here, c is an attribute set including no attribute, and $\phi$ denotes an attribute set including no attribute.

The OR operation newly generates an attribute set that includes all attributes included in at least one of two attribute sets. A program performing the OR operation generates a new attribute set composed of all attributes included in any of two attribute sets. The OR operation is also a union.

Though there are both a method whereby each attribute having the same attribute identifier but differing in true-false value is included in the new attribute set generated by the OR operation and a method whereby each attribute having the same attribute identifier but differing in true-false value is not included in the new attribute set generated by the OR operation, the method of not including such an attribute is considered to be more natural. In the case where a true-false value of an attribute is true in one attribute set but false in the other attribute set, the two attribute sets have opposing attributes.

In view of this, there is also a method in which the degree of non-commonality is calculated for two attribute sets and, only when the degree of non-commonality is 0, the OR operation is performed. This can be expressed in symbols as follows. Let a be an attribute set (1: 1), and b be an attribute set (2: 1, 3: −1). The OR operation of a and b can be written as (a OR b=g). Here, g is an attribute set (1: 1, 2: 1, 3: −1).

The NOT operation newly generates an attribute set in which all attributes included in an attribute set are inverted in true-false value. This can be expressed in symbols as follows. Suppose an attribute set a includes an attribute (1: 1). The NOT operation of a can be written as (NOT a=k). Here, k has an attribute (1: −1).

Note that lower-case alphabets are used for attribute sets and upper-case alphabets are used for entities in the examples described above.

According to the operation method described above, logic operation expressions are unchanged regardless of whether the number of attributes included in an attribute set is large or small. An entity typically has a large number of attributes. The present invention enables logic operation expressions to be written extremely simply, as compared with the conventional techniques.

As is clear from the above description, according to this embodiment, an entity and an attribute of the entity are each represented not by a word but by an identifier which is information that does not have a meaning of the entity or the attribute itself. An attribute set composed of attributes each represented by an identifier which is information that does not have a meaning of the attribute itself is subjected to a logic operation.

Understanding may be facilitated by the following interpretation. Each attribute included in an attribute set corresponds to a different one of coordinate axes. A coordinate axis identifier for identifying the coordinate axis corresponding to the attribute is an attribute identifier, and the attribute is represented by a combination of the attribute identifier and a true-false value. In the case where the attribute is true, the attribute is represented by a combination of the attribute identifier and a true value. In the case where the attribute is not true, the attribute is represented by a combination of the attribute identifier and a false value. Correspondence between an attribute and a coordinate axis is merely intended to facilitate understanding of the present invention, and is not an essential feature of the present invention.

An attribute identifier may include a primary identifier and a secondary identifier, for more detailed representation of an attribute. The primary identifier corresponds to an identifier of a primary attribute, and the secondary identifier corresponds to an identifier of a secondary attribute. It is possible to set a coordinate axis identifier for identifying a coordinate axis corresponding to the attribute as the primary identifier, and set an identifier of a value, a range, a degree, or the like indicating a more detailed feature of the attribute as the secondary identifier, where the attribute is a combination of the identifier including the primary identifier and the secondary identifier and a true-false value. However, there is also an attribute that does not require a secondary identifier. In such a case, a special value such as NULL indicating that there is no secondary identifier, may be used as the secondary identifier. As an alternative, the secondary identifier may be simply omitted.

The above describes the method of representing the degree of the attribute by use of the secondary identifier. However, for example, there are different criteria for the attribute "tall" between racial groups. Hence, it is effective if actual information such as a height can be obtained from the attribute. Information of an actual height value is held as feature data, the attribute "height" is generated, and the feature data of the height is associated with the secondary attribute of the attribute. Moreover, feature data generated from a full-body image may be connected to the attribute "height". This makes it possible to determine whether tall or not based on the feature data connected to the attribute "height", and change the meaning of the attribute. In so doing, actual information can be obtained from the attribute identifier. That is, actual information, i.e. feature data, can be obtained using the attribute identifier as a search key.

The example of each program described above is assumed to be a functional type program, and so returns a program execution result as a return value. However, a program which is not functional type is also applicable.

An attribute can be generated from all kinds of information such as an image, a moving image, a sound, a touch, a temperature, a pressure, and so on. For example, an attribute such as "long face" or "round face" can be generated from a face image. Suppose there is a length breadth ratio calculation function of extracting face image data from image data and calculating a length breadth ratio of the face from the extracted face image data. When face image data is given, a length breadth ratio of the face is calculated from the given face image data using the length breadth ratio calculation function. An attribute closest to the calculated face length breadth ratio is selected, and a true-false value of the selected attribute is set to true.

In this embodiment, identification data is generated from a word and held, and this identification data generated from the word is associated with an attribute. In the knowledge base system, such identification data generated from a word is simply used for selecting an entity or an attribute, and is not used for representing a meaning or a concept of the entity or the attribute. An attribute connected to feature data generated from information other than a word, such as an image, a sound, a touch, a temperature, or a pressure, is generated, and an attribute set including the generated attribute is subjected to a logic operation. This can be applied to, for example, an image diagnostic system, a facility monitoring system, and the like There is a case where one entity inherits an attribute set of another entity. There is also a case where one entity includes an attribute set of another entity. The OR operation is associated with such a case of inheriting or including an attribute of another entity.

The following describes (3) knowledge collection and knowledge network in the fourth information processing.

A collection of entities having a common attribute is called a knowledge collection. At least one attribute is designated, and each entity having an attribute identifier of the designated attribute is selected. A collection of selected entities is a knowledge collection. Though each entity having attribute identifiers of all designated attributes is normally selected, each entity having a part of the designated attributes may also be selected.

For each entity, the number of times the entity is selected may be stored so that each entity selected at least a predetermined number of times is collected to form a knowledge collection. For example, in the case where search is performed using ten attributes, each entity selected at least eight times, which is a value obtained by multiplying the number of attributes used in the search by 0.8, is collected to form a knowledge collection. Moreover, in the case where a connection between an entity and an attribute has, as ancillary information, a weight indicating a connection strength, the weight may be added each time the entity is selected to thereby hold a weight cumulative total for the entity so that each entity whose cumulative total exceeds a predetermined value is collected to form a knowledge collection, instead of storing the number of times the entity is selected. The method of using the weight and the method of using the number of times of selection are both a search performed using an attribute.

There is a special situation where a knowledge collection is made up of only one entity. This can be interpreted to mean that one entity is specified and recognized according to an attribute used in a search.

One entity that is connected only to all attributes used to generate a collection of entities is an abstract entity denoting the collection of entities. An attribute connected to identification data generated from a word is connected to this abstract entity, thereby enabling the abstract entity to be identified by the identification data.

There is a possibility that, in a knowledge collection, entities are related to each other. These related entities are connected to each other. A collection of such entities connected to each other is a knowledge network. By connecting entities to each other, a relationship between the entities is represented. The relationship includes a state where the entities are bidirectionally connected and a state where the entities are unidirectionally connected. In the bidirectional connection, the two connected entities cannot be distinguished from each other, so that the entities are in an equal relationship. In the unidirectional connection, the two connected entities can be distinguished from each other. For example, a parent-child relationship is represented by a unidirectional connection, where an entity "parent" is connected to an entity "child" only in one direction from "parent" to "child". This makes it possible to distinguish the entity "parent" and the entity "child" from each other.

A relationship represented by a unidirectional connection may correspond to an inclusion relationship in which one entity is included in another entity.

Adding a connection between entities, changing how entities are connected, and deleting a connection in a knowledge network all correspond to learning of knowledge. Adding a new entity or deleting an existing entity in the knowledge network also correspond to learning of knowledge. Generating a new knowledge network also corresponds to learning. Existence and connections of entities in the knowledge network are knowledge. An entity is knowledge, too.

Figure 15:
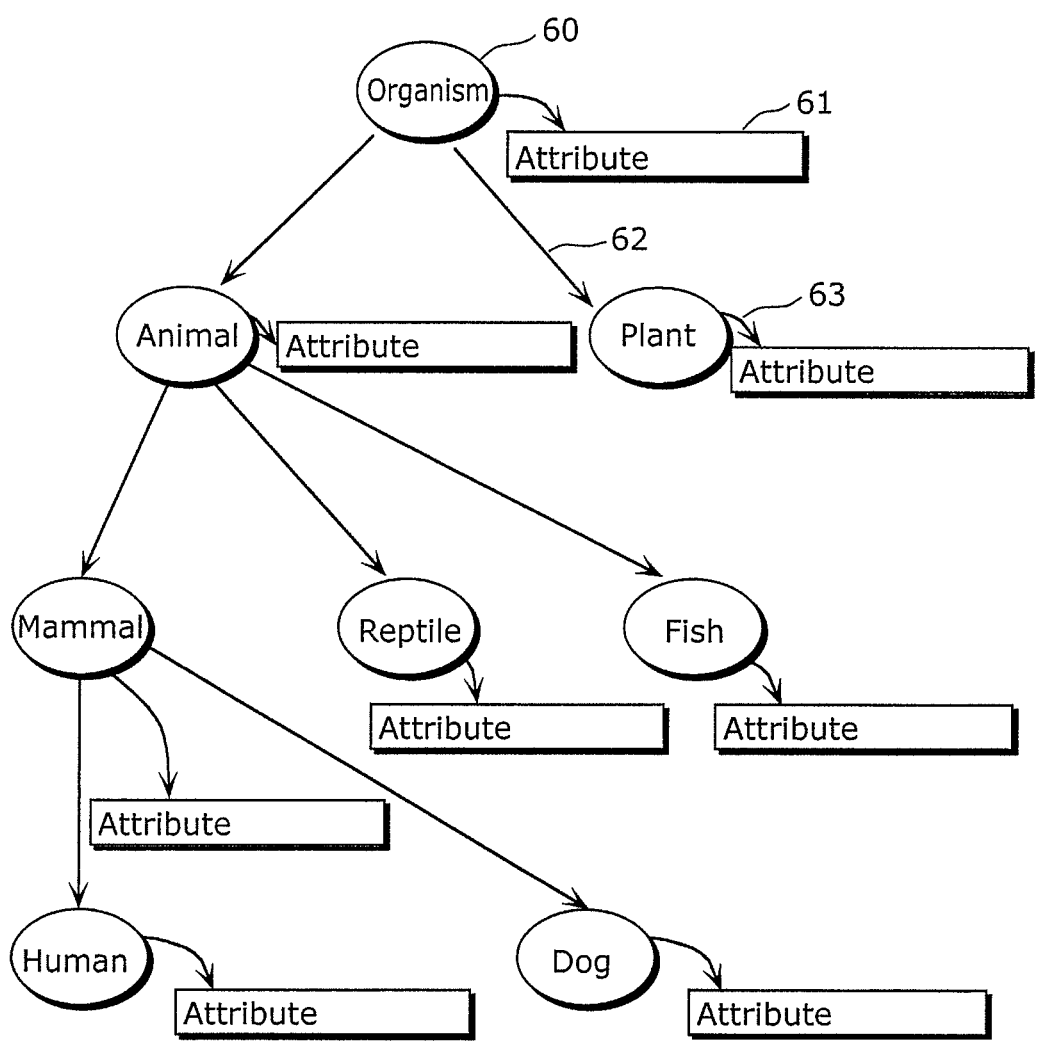
FIG. 15 is a diagram showing connections between entities.

FIG. 15 shows inclusion relationships between entities. A circle shown in FIG. 15 is a node 60. The node 60 holds an entity identifier, and represents an entity. The node 60 is only the entity represented by the entity identifier. An attribute 61, a set of attributes 61, feature data, identification data are not the node 60. The attribute 61 and the set of attributes 61 are ancillary information of the entity which is the node 60. The entity includes not only a concrete entity such as a stone or a dog, but also an abstract entity such as light, a web page, and a concept. The node 60 may not have the attribute 61. When an entity is unknown, the entity does not have the attribute 61. The node 60 has zero or more attributes 61. All attributes of one entity can be regarded as the set of attributes 61. The set of attributes 61 corresponds to an entity/attribute list shown in FIG. 19. An arrow 62 represents a relationship between the nodes 60. That is, the arrow 62 represents a relationship between entities. An arrow 63 represents a connection between the node 60 and the attribute 61.

There are two types of methods in which an entity has an attribute for generating a knowledge collection. The first method is the following. For example, in FIG. 15, all entities have an attribute "organism", entities "animal", "mammal", "reptile", and "fish" have an attribute "animal", and entities "mammal", "human", and "dog" have an attribute "mammal". Thus, an entity which is a lower-level concept has an attribute that represents an entity which is a higher-level concept. Particularly when every entity of the lower-level concept is given the attribute representing the higher-level concept, the entity of the lower-level concept always has the attribute representing the higher-level concept. This being so, by designating an attribute representing one concept and generating a knowledge collection, the knowledge collection that includes all entities of its lower-level concept can be obtained. As an example, when the attribute "animal" is designated to generate a knowledge collection, the generated knowledge collection includes "animal" and its lower-level concepts "mammal", "reptile", and "fish".

The second method is the following. An entity of a lower-level concept does not have an attribute representing its higher-level concept. Attribute are hierarchized and attribute hierarchy information is held. In the attribute hierarchy information, an attribute representing a higher-level concept is connected to an attribute representing its lower-level concept in sequence, thereby allowing attributes representing a plurality of concepts to be arranged in the same order. Attributes succeeding one attribute are selected form the attribute hierarchy information, and entities having at least one of the selected attributes are collected to generate a knowledge collection. By selecting all attributes succeeding one attribute from the attribute hierarchy information to generate a knowledge collection, a knowledge collection including all of its lower-level concepts can be obtained. By selecting attributes in a certain range, a knowledge collection having the attributes in this range can be generated. It is, however, difficult to represent a relationship between entities by a knowledge collection. On the other hand, a relationship between entities can be easily represented by a knowledge network connecting entities.

Entities can be connected in a knowledge collection, as shown in FIG. 15. The connected entities are referred to as a knowledge network. As an exception, an entity having no common attribute, i.e. an entity not included in the knowledge collection, may also be connected to the knowledge network. The knowledge network has various connection structures, such as a tree structure in which a node as an end is connected to one or more nodes. The connection is either directional or non-directional. In the directional connection, the two connected entities have a difference. In the non-directional connection, it can be assumed that the two connected entities are connected not unidirectionally but bidirectionally. The directional connection is indicated by an arrow. The non-directional connection is indicated by a line. The arrow has a start point and an end point, where an end capped by a triangle is the end point and an end not capped by a triangle is the start point. The start point and the end point may also be referred to as a beginning point and a terminal point of the arrow, respectively.

The knowledge network may instead have a network structure in which there is no node serving as a root which is a start point, unlike the tree structure. Any knowledge network is possible so long as entities are connected to each other, with there being no limit on how the entities are connected. There is also a knowledge network including only one entity or including no entity. In a network of neurons, a connection between neurons by a dendrite or the like corresponds to an arrow.

An entity can belong to a plurality of knowledge collections. Hence, an entity can belong to a plurality of knowledge networks. For example, a person has an attribute such as a blood relationship. The person also has an attribute such as a graduating school. In order to represent these multiple attributes by one knowledge network, a very complex knowledge network needs to be generated. In view of this, a knowledge network representing the blood relationship and a knowledge network representing the graduating school are individually generated, and a node of a person is set to belong to a plurality of knowledge networks such as the knowledge network representing the blood relationship and the knowledge network representing the graduating school. In the knowledge network representing the blood relationship, nodes which are entities are connected by the blood relationship. In the knowledge network representing the graduating school, for example, nodes are connected by a grade. By representing entity-to-entity connections in separate knowledge networks, each individual knowledge network can be significantly simplified in structure.

An entity typically belongs to a plurality of knowledge networks. In a knowledge network, entities are directly connected to each other by some kind of relationship. By connecting entities having a common attribute only by one predetermined relationship, a knowledge network can represent clearly systematized knowledge. When an entity belongs to a knowledge network, it is possible to represent and hold systematized knowledge about the entity. Only entities are connected in a knowledge network.

The following describes (4) knowledge collection and knowledge network use method in the fourth information processing.

An example method of using a knowledge collection is described first. By generating a knowledge collection as a result of collecting entities that have all designated attributes and checking whether or not a given entity is included in the generated knowledge collection, it is possible to determine whether or not the given entity has all attributes used for generating the knowledge collection.

A knowledge collection is a collection of entities (entity identifiers). Accordingly, a logic operation such as the AND operation, the OR operation, or the NOT operation can be performed on an abstract entity representing the knowledge collection.

An example method of using a knowledge network is described next. For example, suppose an arrow connecting nodes in a knowledge network indicates an inclusion relationship, as shown in FIG. 15. A node at a start point includes a node at an end point. In the case where a node A can be reached by traveling from a node B zero or more times in a direction opposite to an arrow, "if B, then A" is true. When the number of times of travel is zero, the node A and the node B are the same node. As mentioned earlier, a node represents an entity.

Figure 16:
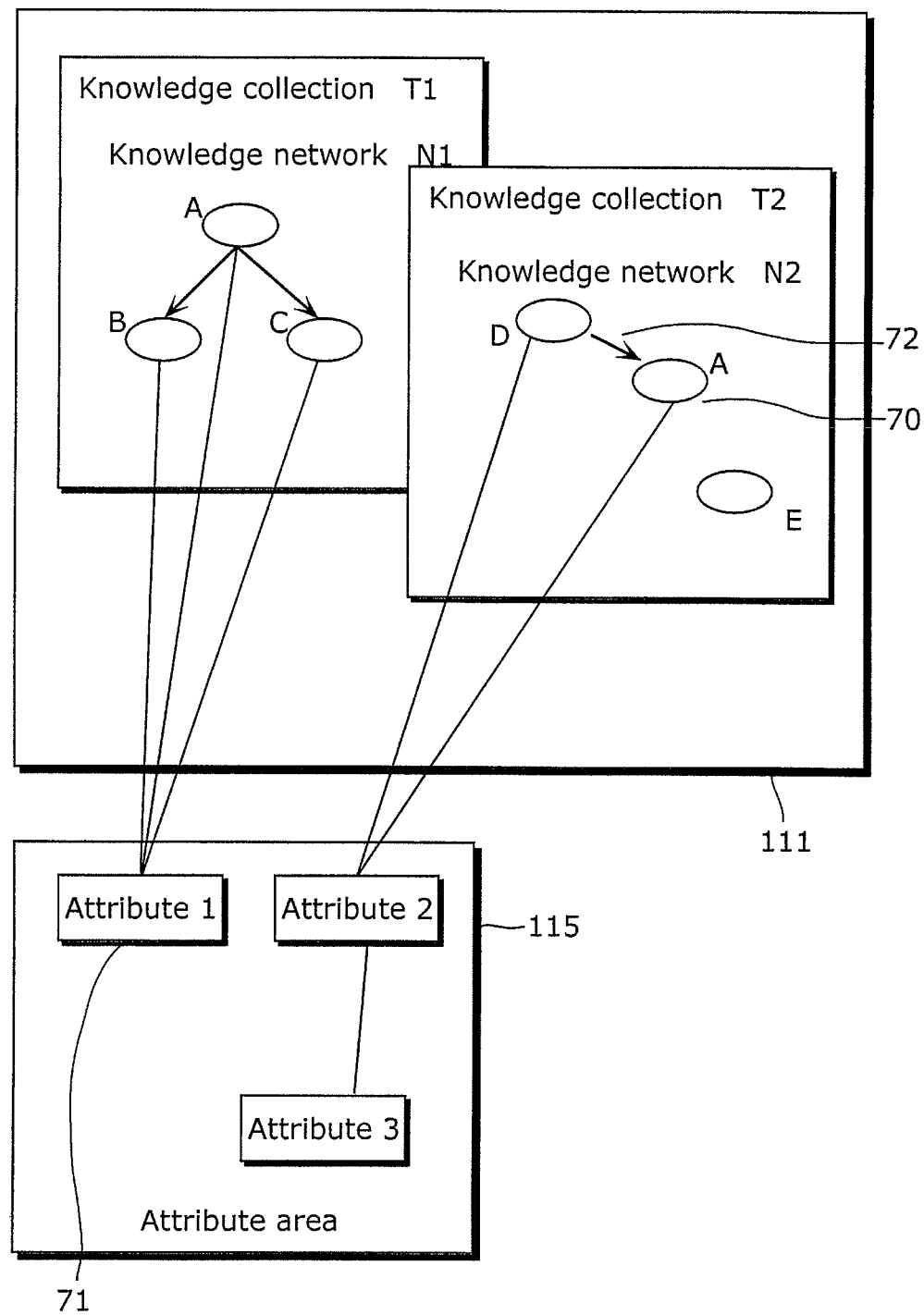
FIG. 16 is a diagram showing a relationship between a knowledge network and an attribute.

Suppose, in a knowledge network N1 shown in FIG. 16, the node A can be reached by traveling from the node B zero or more times in a path of a direction opposite to an arrow. Also suppose, in a knowledge network N2 different from the knowledge network N1 to which the node B belongs, a node D can be reached by traveling from the node A zero or more times in a path of a direction opposite to an arrow. This being the case, there is a possibility that "if node B, then node D". There is also a possibility that the node B and the node D are related in some way. A degree of such a possibility depends on to what extent the knowledge network passed through is appropriately generated. In the case where a total number of times of travel is zero, the node B, the node A, and the node D are the same node. When the above-mentioned path is discovered and the path is determined to have an appropriate connection, the node D and the node B can be connected by one arrow. Here, the node D and the node B may be directly connected by generating a new knowledge network including the node D and the node B.

Though the above uses a unidirectionally-connected knowledge network as an example, the same applies to a bidirectionally-connected knowledge network. Note however that, in the bidirectional connection, connected entities do not have a clear difference.

As described above, when another entity in another knowledge network can be reached from one entity, it can be determined that there is a possibility of some kind of relationship between the entity which is a node at a start point and the entity which is a node at an end point. Thus, rough determination can be quickly made by use of a knowledge network. After such rough determination, at least one attribute of the entity which is the node at the start point is compared with at least one attribute of the entity which is the node at the end point, to make final determination of whether or not the connection is appropriate.

There is a conventional method of representing a network structure by directly connecting nodes which are each a word, i.e. a letter string of a language. In this method, however, not only a word representing an entity but also a word representing an attribute is used as a node. This causes a larger number of nodes and a larger number of connections to be included than the network structure according to the present invention, resulting in a very complex network structure. Besides, it is impossible to easily generate a knowledge collection and classify knowledge, unlike in this embodiment.

The following describes (1) knowledge form in the case of using the relational database 14.

The relational database 14 makes it possible to efficiently perform a set operation such as extracting data satisfying a certain condition from data in a table form. Accordingly, an example of using the relational database 14 is described in this embodiment. However, the present invention is not limited to the use of the relational database 14. In the present invention, an entity and an attribute are connected and, instead of sending a signal to the connected entity and attribute to detect the connected entity and attribute, search is performed using, as a key, an identifier for identifying an entity, an attribute, feature data, or identification data, thereby obtaining the connected entity, attribute, feature data, and identification data.

In the system according to the present invention, an entity identifier itself is an entity, and an attribute identifier itself is an attribute. A primary identifier of an attribute itself is a primary attribute, and a secondary identifier of an attribute itself is a secondary attribute. Feature data is indicated by a pointer which is an identifier. The feature data itself is included in the data 10. Identification data is indicated by a pointer which is an identifier. The identification data itself is included in the data 10.

FIGS. 17A, 17B, 18, and 19 schematically show tables in the data 10 generated by the relational database 14.

FIG. 17A shows an attribute source data list. FIG. 17B shows an entity name/entity identifier correspondence table. The attribute source data list includes a word which is a name of an entity expressed in letters, a word representing an attribute of the entity, and a true-false value of the attribute. Actual data is data as a source of the true-false value. In the case where the actual data is present, the true-false value may be generated from the actual data. Regarding the generation of the true-false value, the true-false value may be omitted. The true-false value may be omitted by applying a rule that the true-false value is true only when the attribute is listed in the table.

It is also possible to hold the actual data as feature data, and associate a newly generated attribute with the feature data, thereby setting the new attribute as an attribute of the entity. In the entity name/entity identifier correspondence table, a word which is a name of an entity is associated with an entity identifier. In the case where the entity is connected to feature data (not shown), a pointer to the feature data is also included in the association.

FIG. 18 shows a correspondence table between attributes associated with words and attribute identifiers. This table corresponds to the first level in FIGS. 2A and 2B. In this table, an attribute identifier is associated with feature data (not shown) held beforehand. A primary identifier which is a primary attribute is associated with a pointer which is an identifier of feature data of the primary attribute. A secondary identifier which is a secondary attribute is associated with a pointer which is an identifier of feature data of the secondary attribute. In this table, a word associated with an attribute is associated with an attribute identifier. In the case where the attribute identifier is connected to feature data (not shown), an identifier of the feature data, i.e. a pointer to the feature data, is also included in the association.

An attribute identifier is connected to feature data (not shown), thereby creating a meaning or a concept. The number of pointers of associated feature data may be limited to not more than one per row so that the same number of rows as the number of associated pieces of feature data are provided. As an alternative, pointers to all pieces of feature data may be included in one row. The attribute/attribute identifier correspondence table is intended to associate a word of an attribute in the attribute source data list in FIG. 17A, with an attribute identifier. Using a word of an attribute in the attribute source data list in FIG. 17A as a key, a corresponding attribute identifier is obtained from the attribute/attribute identifier correspondence table.

The obtained attribute identifier may include a primary identifier and a secondary identifier, or include only a primary identifier. If possible combinations of primary identifiers and secondary identifiers are set beforehand, an improper combination can be detected based on this information. Even though possible combinations of primary identifiers and secondary identifiers are set beforehand, a possible combination of a primary identifier and a secondary identifier can further be added or deleted by learning.

There is also a situation where an attribute in the attribute source data list in FIG. 17A includes a primary attribute and a secondary attribute. Moreover, the attribute/attribute identifier correspondence table in FIG. 18 may have a condition that a true-false value of an attribute is true. In the case where the attribute/attribute identifier correspondence table has a condition for setting a true-false value of an attribute as true and also has actual data as a source of the attribute, the true-false value can be set by determining whether or not the actual data satisfies the condition for setting the true-false value of the attribute as true. The condition may be a determination function such as a membership function of a fuzzy set. In this case, the data as a source of the attribute may not have a true-false value. Feature data is generated from the actual data.

From an entity identifier corresponding to an entity name, an attribute identifier of an attribute, and a true-false value obtained from the attribute source data list in FIG. 17A, the entity name/entity identifier correspondence table in FIG. 17B, and the attribute/attribute identifier correspondence table in FIG. 18, an entity/attribute list in which an entity identifier, an attribute identifier of the entity, and a true-false value are associated with each other is generated as shown in FIG. 19. The true-false value may be omitted by applying a rule that the true-false value is true in the case where the entity identifier and the attribute identifier of the attribute of the entity are shown, and false in the case where the entity identifier and the attribute identifier of the attribute of the entity are not shown. Moreover, feature data generated from actual data of the attribute may be provided or may not be provided. In this Description, having an identifier of feature data is also referred to as having the feature data. In the case where the attribute has one primary attribute and one secondary attribute, the primary attribute and the secondary attribute are separated in different columns in the table.

All rows selected from the entity/attribute list in FIG. 19 using an entity identifier as a key indicate an attribute set of the entity, and each of the selected rows indicates an attribute of the entity. This table corresponds to the second level in FIG. 3.

Note that feature data (not shown) is associated with an entity identifier and an attribute identifier. Through a search using an identifier of the feature data as a key, the entity identifier and the attribute identifier associated with the feature data can be obtained. The entity and the attribute connected to the feature data have the identifier of the feature data, i.e. a pointer to the feature data.

FIG. 20A shows an entity/primary attribute/secondary attribute correspondence table. This table presents an example of a combination of an entity, a primary attribute, and a secondary attribute which are connected so as to form a triangle whose vertices are the entity, the primary attribute, and the secondary attribute. By designating the entity and the primary attribute and searching this table, the secondary attribute which is the remaining element of the triangle can be obtained.

In a primary attribute/secondary attribute correspondence table shown in FIG. 20B, a primary attribute and a secondary attribute are associated with each other, and an appropriate combination of a primary attribute and a secondary attribute is held. The number of secondary attributes associated with one primary attribute is not limited to one, but may be more than one. It is possible to select an appropriate combination of a primary attribute and a secondary attribute from these combinations, associate an entity with the primary attribute and the secondary attribute, and add a combination of the associated entity, primary attribute, and secondary attribute to the entity/attribute list.

In the case where the attribute includes the primary attribute and the secondary attribute, the same feature data may be directly connected to and associated with the primary attribute and the secondary attribute constituting the attribute. The number of pieces of feature data associated with the primary attribute and the secondary attribute constituting the attribute is not limited to one, but may be more than one. Both the primary attribute and the secondary attribute are an attribute, are one or more in number, and are connected to one or more pieces of feature data.

Since the entity, the primary attribute, and the secondary attribute are connected in the triangle, the remaining element is specified when two out of the three elements of the triangle, namely, the entity, the primary attribute, and the secondary attribute, are designated. In the case where the attribute connected to an entity includes the primary attribute and the secondary attribute, the attribute connected to both the entity and the primary attribute can be searched for and obtained. This attribute is the secondary attribute. Feature data representing a rough meaning or concept is connected to the primary attribute. Feature data representing a more detailed meaning or concept is connected to the secondary attribute. The rough meaning or concept can be detected by obtaining the feature data connected to the primary attribute. The more detailed meaning or concept can be detected by obtaining the feature data connected to the secondary attribute.

The following describes (2) knowledge operation in the case of using the relational database 14.

The AND operation is an operation of selecting common attributes from two attribute sets and newly generating an attribute set composed of the selected attributes. The OR operation is an operation of selecting attributes included in at least one of two attribute sets and newly generating an attribute set composed of the selected attributes. The NOT operation is an operation of generating, for each attribute in an attribute set, an attribute whose true-false value is changed to false when the true-false value is true and changed to true when the true-false value is false, and newly generating an attribute set composed of generated attributes. The XOR operation is an operation of selecting attributes included only in either of two attribute sets and newly generating an attribute set composed of the selected attributes.

The following describes procedures of the AND operation, the OR operation, the NOT operation, the XOR operation, and the similarity and non-similarity calculation for attribute sets according to the embodiment of the present invention. These are merely procedures according to one embodiment, and different procedures are also applicable. Besides, the definitions of the AND operation, the OR operation, the NOT operation, and the XOR operation and the definitions of the degree of similarity and the degree of non-similarity may be changed. When the definitions are changed, the procedures are changed, too.

Figure 21:
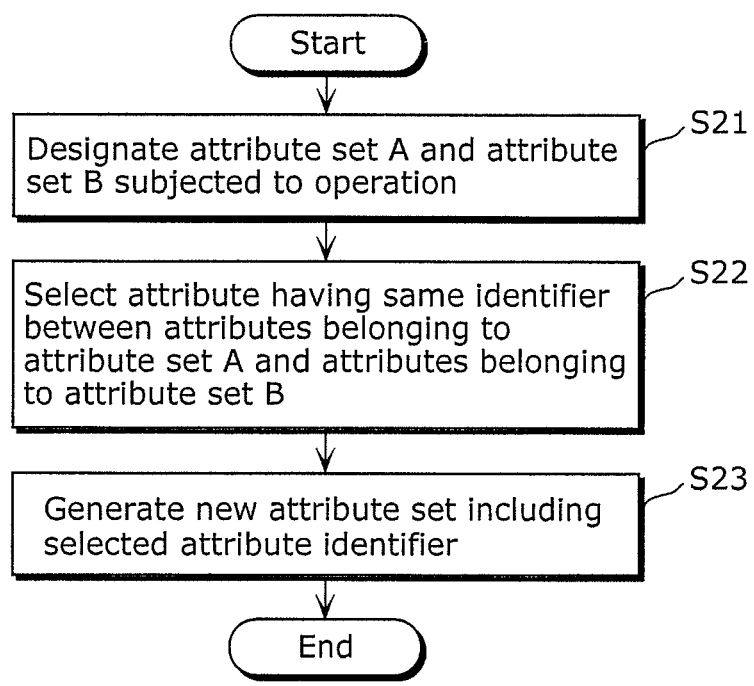
FIG. 21 is a flowchart of an AND operation.

FIG. 21 is a flowchart of the AND operation in the embodiment. The procedure of the AND operation is described below, with reference to FIG. 21.

First, an attribute set A and an attribute set B subjected to the AND operation are designated (Step S21). Typically, by designating an entity identifier, a set of zero or more attribute identifiers associated with the entity identifier is designated. Next, each attribute having the same attribute identifier between attributes belonging to the attribute set A and attributes belonging to the attribute set B is selected (Step S22).

Following this, each attribute having the same attribute identifier and associated with the same true-false value is selected from the selected attributes, and an attribute set composed of the selected attributes is newly generated (Step S23). The newly generated attribute set is outputted as a result of the AND operation.

In the case where the attribute has no true-false value, each attribute having the same attribute identifier is selected, and an attribute set composed of the selected attributes is newly generated. These two selection processes are collectively referred to as a process of selecting matching attributes. This being so, the AND operation is a process of selecting matching attributes from the attributes of the attribute set A and the attributes of the attribute set B and newly generating an attribute set (intersection) composed of the selected attributes.

Figure 22:
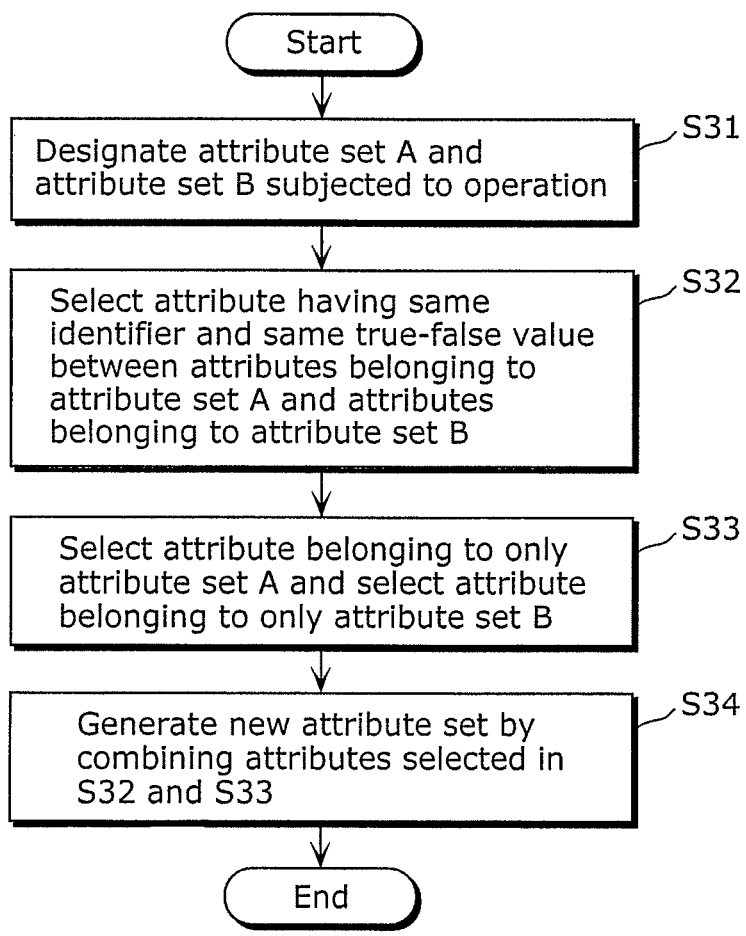
FIG. 22 is a flowchart of an OR operation.

FIG. 22 is a flowchart of the OR operation in the embodiment. The procedure of the OR operation is described below, with reference to FIG. 22.

First, the attribute set A and the attribute set B subjected to the OR operation are designated (Step S31). Next, each attribute having the same attribute identifier and associated with the same true-false value between the attributes belonging to the attribute set A and the attributes belonging to the attribute set B is selected (Step S32). In the case where the attribute has no true-false value, each attribute having the same attribute identifier is selected. These two selection processes are collectively referred to as a process of selecting matching attributes. This corresponds to the result of the above-mentioned AND operation.

Following this, each attribute not included in the attribute set B is selected from among the attributes in the attribute set A. That is, each attribute identifier included only in the attribute set A is selected. In, addition, each attribute not included in the attribute set A is selected from among the attributes in the attribute set B. That is, each attribute identifier included only in the attribute set B is selected (Step S33). An attribute set composed of all attributes selected in Steps S32 and S33 is newly generated as a result of the OR operation (Step S34).

In the case of not taking the true-false value into consideration, the attribute set obtained in the above process is a new attribute set (union) generated by collecting attribute identifiers included in at least one of the attribute set A and the attribute set B. In the case of taking the true-false value into consideration, on the other hand, the attribute set obtained in the above process can be generated, for example, by excluding each attribute that is included in both the attribute set A and the attribute set B but differs in true-false value, from the union of the attribute set A and the attribute set B.

Figure 23:
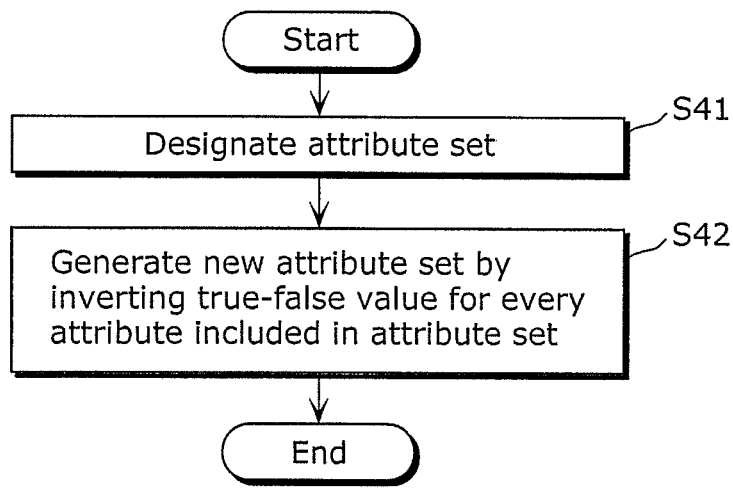
FIG. 23 is a flowchart of a NOT operation.

FIG. 23 is a flowchart of the NOT operation in the embodiment. The procedure of the NOT operation is described below, with reference to FIG. 23.

First, an attribute set subjected to the operation is designated (Step S41). Next, for each attribute included in the designated attribute set, the true-false value is inverted. That is, a new attribute is generated by changing the true-false value to false when the true-false value is true and to true when the true-false value is false. A new attribute set is generated by collecting the generated attributes (Step S42).

Figure 24:
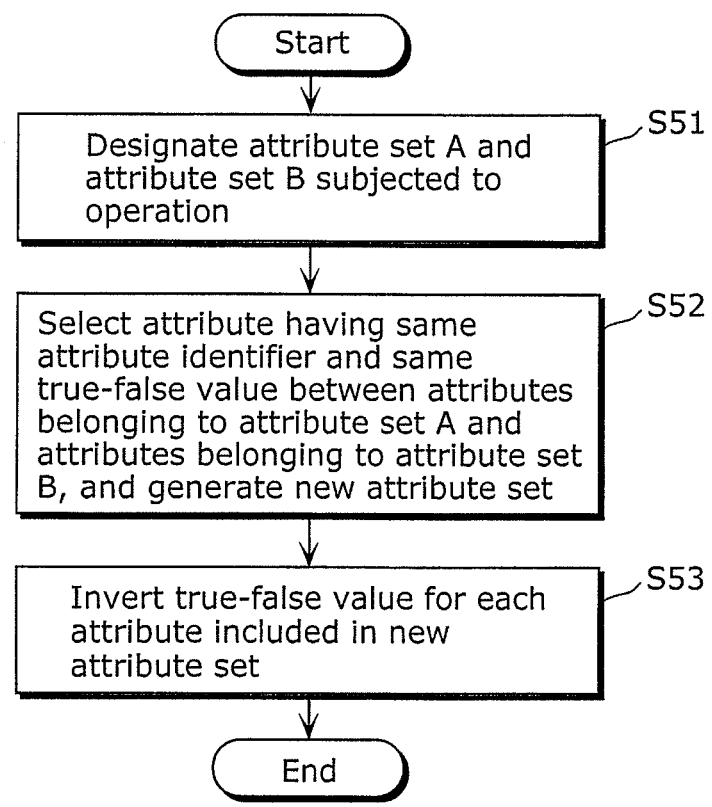
FIG. 24 is a flowchart of a NAND operation.

FIG. 24 is a flowchart of the NAND operation in the embodiment. The procedure of the NAND operation is described below, with reference to FIG. 24.

First, the attribute set A and the attribute set B subjected to the NAND operation are designated (Step S51). Next, each attribute having the same attribute identifier and associated with the same true-false value between the attributes belonging to the attribute set A and the attributes belonging to the attribute set B is selected to generate a new attribute set (Step S52). This corresponds to the result of the above-mentioned AND operation.

Following this, for each attribute in the newly generated attribute set, the true-false value is inverted. That is, a new attribute is generated by changing the true-false value to false when the true-false value is true and to true when the true-false value is false (Step S53). This corresponds to the result of the above-mentioned NOT operation. A resulting attribute set is outputted as a result of the NAND operation.

Figure 25:
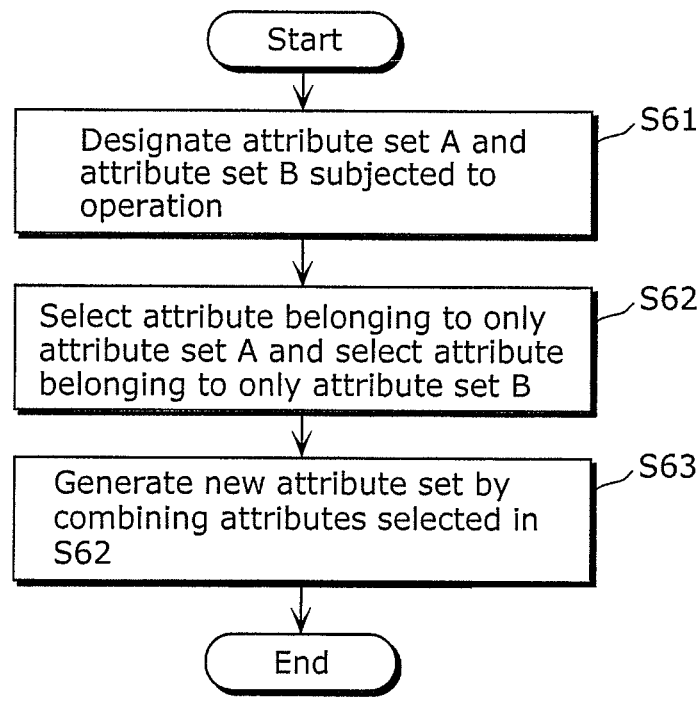
FIG. 25 is a flowchart of a XOR operation.

FIG. 25 is a flowchart of the XOR operation in the embodiment. The procedure of the XOR operation is described below, with reference to FIG. 25.

First, the attribute set A and the attribute set B subjected to the XOR operation are designated (Step S61). Next, each attribute not included in the attribute set B is selected from among the attributes in the attribute set A. That is, each attribute identifier included only in the attribute set A is selected. In addition, each attribute not included in the attribute set A is selected from among the attributes in the attribute set B. That is, each attribute identifier included only in the attribute set B is selected (Step S62). This process corresponds to Step S33 in FIG. 22. An attribute set composed of all attributes selected in Step S62 is newly generated as a result of the XOR operation (Step S63).

In other words, a new attribute set in which attribute identifiers included only in either the attribute set A or the attribute set B are collected is generated. Note that the attribute set obtained as a result of the above process can also be produced by, for example, subtracting the intersection of the attribute set A and the attribute set B (the result of the AND operation) from the union of the attribute set A and the attribute set B (the result of the OR operation).

Figure 26:
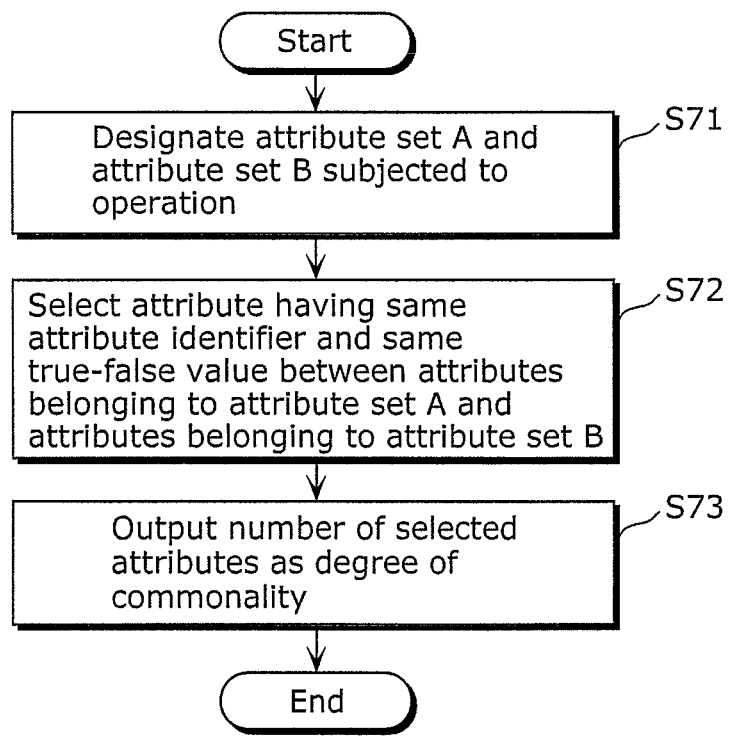
FIG. 26 is a flowchart of a process of calculating a degree of commonality.

FIG. 26 is a flowchart of the process of commonality calculation in the embodiment. The procedure of the commonality calculation is described below, with reference to FIG. 26.

First, the attribute set A and the attribute set B subjected to the operation are designated (Step S71). Next, each attribute having the same attribute identifier and associated with the same true-false value between the attributes belonging to the attribute set A and the attributes belonging to the attribute set B is selected (Step S72). In the case where the attribute has no true-false value, each attribute having the same attribute identifier is selected. These two selection processes are collectively referred to as a process of selecting matching attributes. Each attribute having the same primary identifier may be determined as the same attribute, even though differing in secondary identifier.

A result of counting the number of selected attributes is outputted as the degree of commonality (Step S73). The condition of selecting matching attributes is merely an example, and other conditions may be used. In the case where a connection between an entity and an attribute has a weight indicating a connection strength, the weight may be added up instead of counting the number of pairs.

The commonality calculation process in which the determination criterion of whether or not the primary identifier is the same regardless of the secondary identifier is employed is the similarity calculation process.

Figure 27:
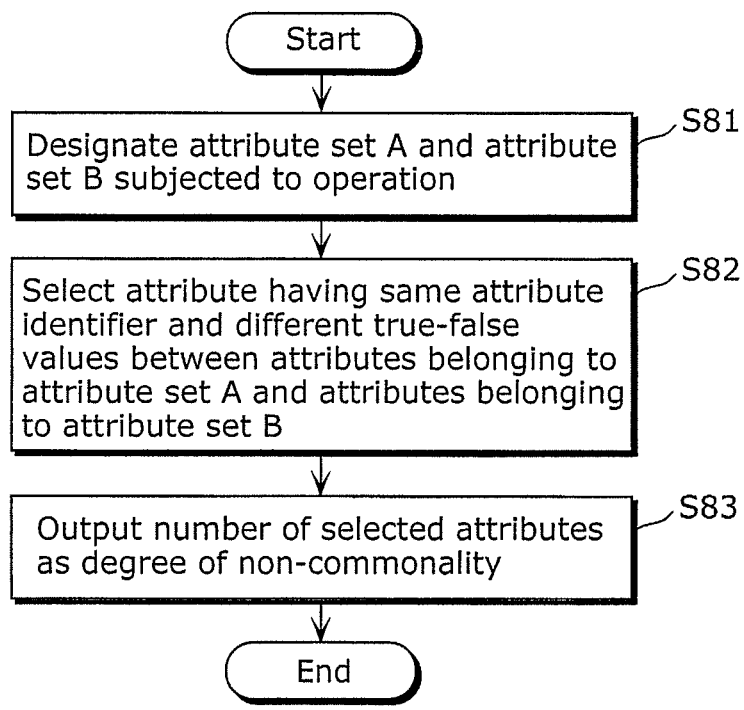
FIG. 27 is a flowchart of a process of calculating a degree of non-commonality.

FIG. 27 is a flowchart of the process of non-commonality calculation in the embodiment. The procedure of the non-commonality calculation is described below, with reference to FIG. 27.

First, the attribute set A and the attribute set B subjected to the operation are designated (Step S81). Next, each attribute having the same attribute identifier but differing in true-false value between the attributes belonging to the attribute set A and the attributes belonging to the attribute set B is selected (Step S82). In the case where the attribute has no true-false value, each attribute included only in either the attribute set A or the attribute set B is selected. These two selection processes are collectively referred to as a process of selecting mismatching attributes.

A result of counting the number of selected attributes is outputted as the degree of non-commonality (Step S83). The method of selecting mismatching attributes is merely an example, and other selection conditions may be used. In the case where a connection between an entity and an attribute has a weight indicating a connection strength, the weight may be added up instead of counting the number of pairs.

The commonality calculation process in which the determination criterion of whether or not the primary identifier is the same regardless of the secondary identifier is employed is the non-similarity calculation process.

In the above operations, each attribute in an attribute set is automatically processed by the operation unit 1070 held beforehand. The user of this logic operation system does not issue each individual instruction to process an attribute. When the user of the logic operation system designates an entity or an attribute set as an operation target, the operation is automatically performed on an attribute of the entity or each attribute of the attribute set.

The following describes (3) knowledge collection and knowledge network in the case of using the relational database 14.

For example, an entity is held in the database in a data structure such as the entity/attribute list shown in FIG. 19. One or more attributes are designated, and an entity having all designated attributes is selected from the attribute list. As a result, a collection of entities having all designated attributes is generated. This is called a knowledge collection. One entity that is connected only to all attributes used to generate a collection of entities is an abstract entity denoting a knowledge collection.

It is preferable to directly connect an attribute "knowledge collection" to such an abstract entity representing the knowledge collection, thereby associating them with each other. For example, an attribute to which identification data for identifying the abstract entity representing the knowledge collection is directly connected or an attribute to which feature data of the abstract entity representing the knowledge collection is directly connected is connected to the abstract entity representing the knowledge collection. This makes it easier to distinguish the abstract entity representing the knowledge collection and an entity included in the knowledge collection from each other.

There is a case where an entity not connected to another entity is included in the knowledge collection. There is even a case where the knowledge collection has no entity-to-entity connection. Meanwhile, there is also a case where an entity is connected to another entity in the knowledge collection. There is further a case where all entities are connected to each other in the knowledge collection. Connected entities form a knowledge network. Several knowledge networks connected in different ways may be included in one knowledge collection. An entity outside a knowledge collection may be connected to an entity inside the knowledge collection, or entities may be connected irrespective of a knowledge collection.

When an entity in a knowledge collection belongs to a knowledge network to connect to another entity, a relationship between the entity and the other entity is clear. In other words, a knowledge network represents systematized knowledge. It is possible to generate, in a knowledge collection "family", a knowledge network connected in a relationship according to age, or a knowledge network connected in a parent-child relationship. A plurality of knowledge networks may be generated in one knowledge collection.

There is a situation where an entity in a knowledge network in a knowledge collection belongs to another knowledge network in another knowledge collection. For example, a person can belong to a knowledge network of a family and simultaneously belong to a knowledge network of a school.

FIGS. 28A to 28C show an example of a data structure for realizing the knowledge network shown in FIG. 15.

FIG. 28A shows a correspondence table 86 between an entity name 87 and an entity identifier 88, and corresponds to the entity name/entity identifier correspondence table shown in FIG. 17B. In the correspondence table 86, a word which is a letter string describing a name of an entity in a language is associated with the entity identifier 88. FIG. 28B shows a knowledge network/attribute correspondence table 101, where an attribute identifier 103 characterizing a knowledge network is associated with a knowledge network identifier 102.

In the knowledge network/attribute correspondence table 101, when only attribute identifiers of all attributes characterizing a knowledge network are connected to one entity identifier, an entity identified by the entity identifier is an abstract entity representing the knowledge network. It is preferable to connect an attribute "knowledge network" to such an abstract entity representing the knowledge network, to distinguish it from an abstract entity representing a knowledge collection generated using the same attributes. In addition, a weight may be directly associated as ancillary information, in each row of the correspondence table 101, i.e. each combination of the knowledge network identifier 102 and the attribute identifier 103. The weight indicates a strength of relatedness between the knowledge network and the attribute.

This is described in more detail, with reference to FIG. 28C.

A node 80 which is an entity in a knowledge network has only one entity identifier 81. The node 80 which is the entity can also have knowledge network information 84. For each knowledge network to which a node which is an entity belongs, the node which is the entity holds one piece of knowledge network information. The number of pieces of knowledge network information 84 held by the node 80 which is the entity may be zero, one, or more than one. The knowledge network information 84 includes zero or more forward pointers 82, zero or more backward pointers 83, and one knowledge network identifier 85. In the case where the number of forward pointers 82 and the number of backward pointers 83 are both zero, the knowledge network is composed of one node 80 which is the entity.

For example, suppose a node A which is an entity is connected to a node B which is an entity. In the case where the node A is unidirectionally connected to the node B, the node A holds an entity identifier of the node B in the forward pointer 82, and the node B holds an entity identifier of the node A in the backward pointer 83. This makes it possible to represent the connection direction, and also easily travel in the forward direction which is the connection direction and the backward direction which is opposite to the connection direction. In the case where the node A and the node B are bidirectionally connected, on the other hand, the node A holds the entity identifier of the node B in the forward pointer 82, and the node B holds the entity identifier of the node A in the forward pointer 82.

A beginning point and a terminal point of a pointer having a direction may be respectively referred to as a higher level and a lower level to distinguish them from each other, or respectively referred to as a lower level and a higher level to distinguish them from each other. Nodes connected by a bidirectional pointer do not have a higher level/lower level distinction, and may be referred to as parallel.

Moreover, whether or not the node A which is the entity is directly connected to a node C which is an entity can be easily checked by checking whether or not the node A has the forward pointer 82 or the backward pointer 83 including an entity identifier of the node C. In the case where the nodes A and C which are two connected entities each have the forward pointer 82 to the other node, the nodes A and C are bidirectionally connected. In the case where one of the two connected nodes A and C holds the entity identifier of the other one of the two connected nodes A and C in the forward pointer 82 while the other one of the two connected nodes A and C holds the entity identifier of the one of the two connected nodes A and C in the backward pointer 83, the nodes A and C are unidirectionally connected.

The knowledge network information 84 of the node 80 may also include a weight 100 that indicates a strength of relatedness between the entity and the knowledge network. Alternatively, the weight 100 may be omitted. When the node 80 which is the entity holds the knowledge network identifier 85 and the weight 100 together, the strength of relatedness between the entity and the knowledge network can be represented. This weight 100 can be used as a determination criterion upon selecting a knowledge network to which an entity belongs. That is, the weight 100 can be used as a selection criterion upon traveling from one knowledge network to another knowledge network, in a manner such as selecting a knowledge network of a larger weight 100, selecting a knowledge network of a smaller weight 100, or selecting a knowledge network in a designated range of the weight 100.

Though not shown in FIG. 28C, the forward pointer 82 and the backward pointer 83 in the knowledge network information 84 may each have a weight that indicates a strength of connection to a node indicated by the pointer. Such a weight can be used as a criterion upon selecting one pointer from a plurality of pointers.

The knowledge network identifier 85 is an identifier for identifying the knowledge network. A knowledge network in a knowledge collection generated by designating a plurality of attributes is characterized by the plurality of attributes. A knowledge network characterized by one attribute is also possible. When the knowledge network identifier 85 is connected to all attributes characterizing the knowledge network, the knowledge network identifier 85 is an abstract entity that has the attributes characterizing the knowledge network and represents the knowledge network. An attribute other than the attributes used for selection may be connected to the knowledge network identifier.

A knowledge network generated irrespective of a knowledge collection may be identified by an attribute representing a feature of the knowledge network. In the case where a plurality of knowledge networks are included in one knowledge collection, an attribute characterizing each knowledge network is added to distinguish them. This eases selection of one knowledge network from a plurality of knowledge networks in one knowledge collection.

Figure 29:
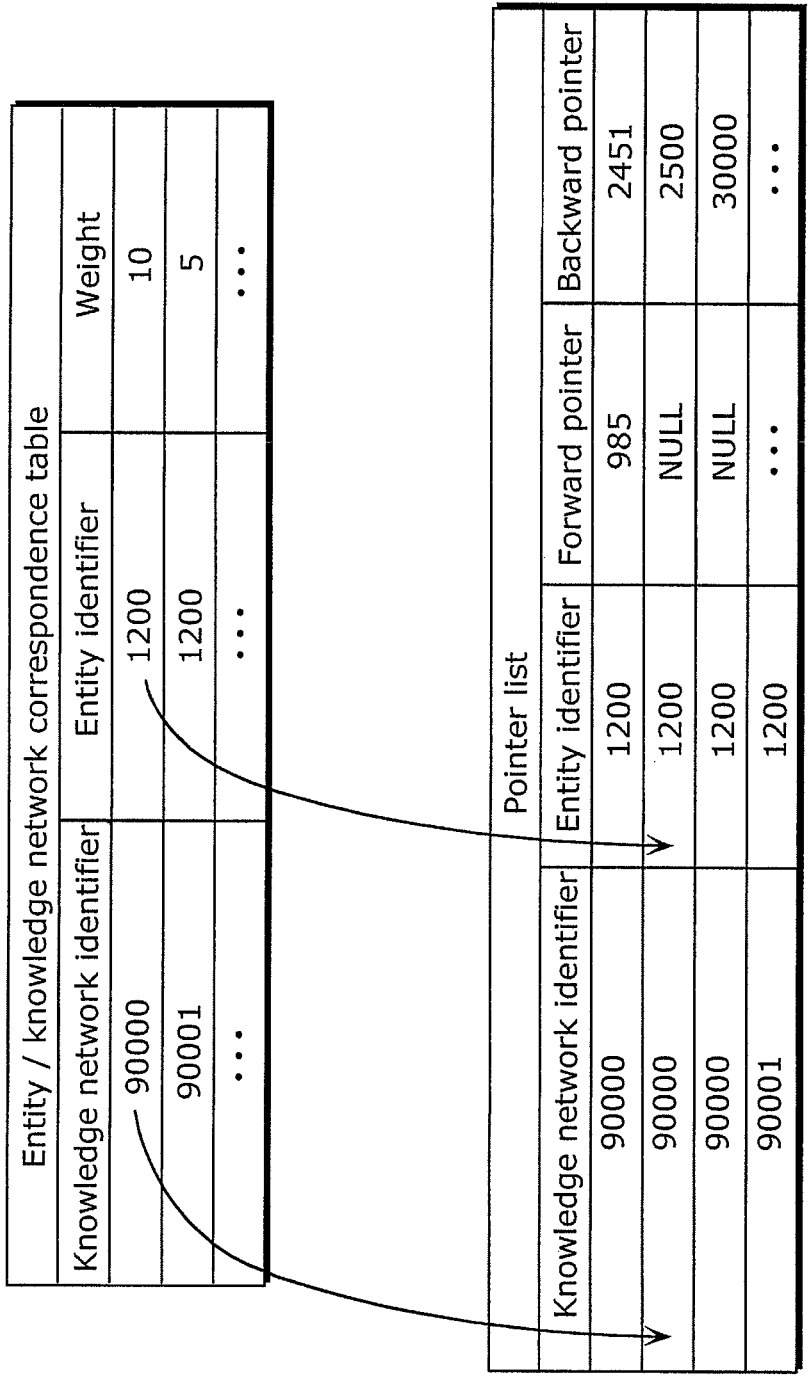
FIG. 29 is a diagram showing a data structure of a node.

FIG. 29 shows an example of a data structure of a node. An entity/knowledge network correspondence table shown in an upper part of FIG. 29 associates a knowledge network identifier and an entity identifier with each other. By performing a search using an entity identifier designated as a search key, a knowledge network identifier of a knowledge network to which an entity identified by the entity identifier belongs can be detected. A weight may be associated with the knowledge network identifier and the entity identifier. Alternatively, the weight may be omitted. The weight indicates a degree of relatedness between the knowledge network and the entity.

A pointer list shown in a lower part of FIG. 29 associates a forward pointer and a backward pointer with a combination of an entity identifier and a knowledge network identifier. Though the two separate pointers of the forward pointer and the backward pointer are shown in FIG. 29, one pointer and information indicating forward or backward may instead be used as a pair. Each of these pointers indicates an entity-to-entity connection in a knowledge network. The pointer includes an entity identifier of the other connected entity. An unused pointer may be set to a special value such as NULL. Moreover, a weight may be assigned to each pointer. The weight indicates a degree of relatedness to the other connected entity. Alternatively, the weight may be omitted. Thus, the node is composed of the entity/knowledge network correspondence table and the pointer list.

The pointer list is searched by designating a knowledge network identifier and an entity identifier. A pointer including an entity identifier of another entity connected with the entity in the knowledge network can be obtained from a search result.

By searching the pointer list using, as a search key, the network identifier and the entity identifier of the other entity obtained from the pointer, a pointer of the other entity can be obtained. As a result of this process, a node which is an entity of an entity identifier indicated by the pointer is detected. Obtaining the entity identifier indicated by the pointer in this way means traveling to the entity designated by the pointer by following the pointer in the knowledge network. This means traveling from one entity to another entity which are connected to each other in the knowledge network. An entity-to-entity connection is deleted by deleting a knowledge network identifier, an entity identifier, and a pointer from the pointer list. An entity-to-entity connection is established by adding a knowledge network identifier, an entity identifier, and a pointer to the pointer list.

An attribute identifier of an attribute that characterizes a knowledge network and a knowledge network identifier are associated with each other in the following manner.

In the case of associating one knowledge network identifier with a plurality of attribute identifiers, the following process is performed. Combinations between the knowledge network identifier and the attribute identifiers each of which identifies a different one of a plurality of attributes are generated as many as the number of attributes, and added to the knowledge network/attribute correspondence table 101 shown in FIG. 28B. The knowledge network/attribute correspondence table 101 is searched using a knowledge network identifier as a key, as a result of which an attribute identifier of an attribute characterizing a corresponding knowledge network can be obtained. Conversely, the knowledge network/attribute correspondence table 101 is searched using one attribute identifier as a key, and a search result is further searched using another attribute identifier as a key. Repeating this process enables obtainment of a knowledge network identifier of a knowledge network characterized by all attributes used in the search.

In this way, a knowledge network characterized by a plurality of attributes, that is, a knowledge network of a specific field, can be obtained. An attribute associated with a knowledge network may be selected from attributes of all entities in the knowledge network, or may be an attribute of any of the entities. The attribute may also be an attribute other than the attributes of the entities in the knowledge network. An attribute specific to the knowledge network may be generated and associated with the knowledge network. By searching the entity/knowledge network correspondence table shown in FIG. 29 using a knowledge network identifier as a search key, an entity identifier of each entity belonging to a corresponding knowledge network can be obtained.

A node which is an entity has an entity identifier and a knowledge network identifier. Therefore, by searching nodes using a knowledge network identifier as a key, an entity identifier of each entity having the knowledge network identifier can be obtained. That is, each entity included in a corresponding knowledge network can be detected.

A combination of a forward pointer and a backward pointer corresponds to an arrow between nodes. The forward pointer is used when traveling to a node connected in an arrow direction. The backward pointer is used when traveling to a node connected in a direction opposite to the arrow direction. A weight assigned to a pointer represents a strength of relatedness between an entity having the pointer and an entity directly associated by the pointer.

Figure 30:
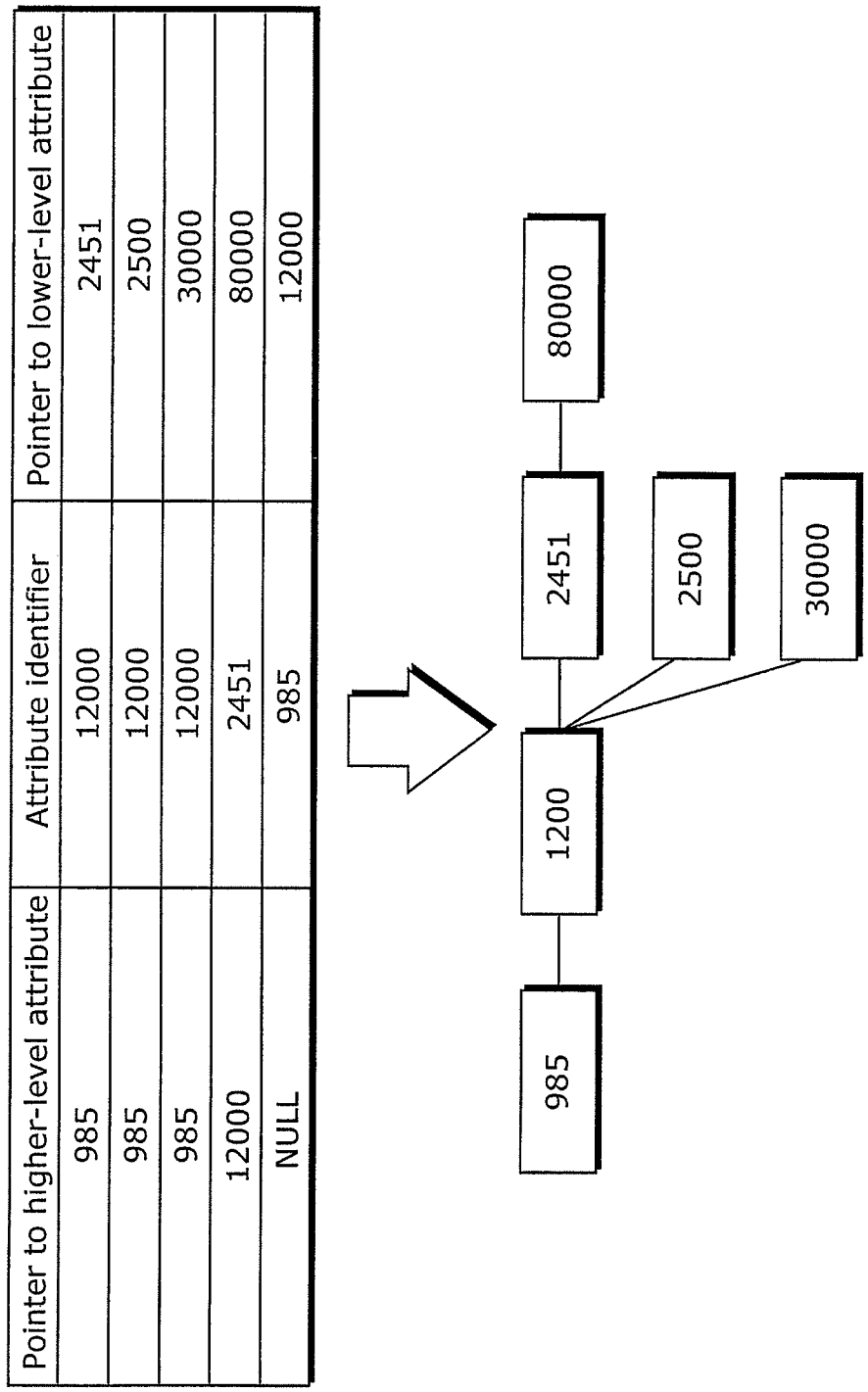
FIG. 30 is a diagram showing attribute hierarchy information.

FIG. 30 shows a table which provides an example of attribute hierarchy information. This is an example of attribute hierarchy information in the case of hierarchizing attributes. A data structure called a list structure is employed in this example. An attribute identifier of one attribute has a pointer to a higher level and a pointer to a lower level. The pointer to the higher-level attribute includes an attribute identifier of the higher-level attribute. The pointer to the lower-level attribute includes an attribute identifier of the lower-level attribute. When the attribute does not have the pointer to the higher level or the pointer to the lower level, the pointer to the higher level or the pointer to the lower level is set to a special value such as NULL, indicating that there is no pointer.

By searching the column of the pointer to the higher level using an attribute identifier designated as a search key, a lower-level attribute of the designated attribute is selected. By searching the column of the pointer to the lower level using an attribute identifier designated as a search key, a higher-level attribute of the designated attribute is selected. By searching the column of the attribute identifier using an attribute identifier designated as a search key, a pointer to a higher level and a pointer to a lower level of the designated attribute are selected.

Some attributes are selected from the hierarchized attributes in the attribute hierarchy information, and the entity/attribute list shown in FIG. 19 is searched using one of the selected attributes as a key, as a result of which each entity having the attribute is selected. This search is performed for all of the selected attributes. Only entities selected as a result of the search are collected to form a knowledge collection. Thus, a knowledge collection having a certain range of hierarchized attributes is obtained. For example, connecting an entity having a higher-level attribute to an entity having an attribute of an immediate lower level in the knowledge collection yields a hierarchical knowledge network.

The following describes (4) knowledge collection and knowledge network use method in the case of using the relational database 14.

Figure 31:
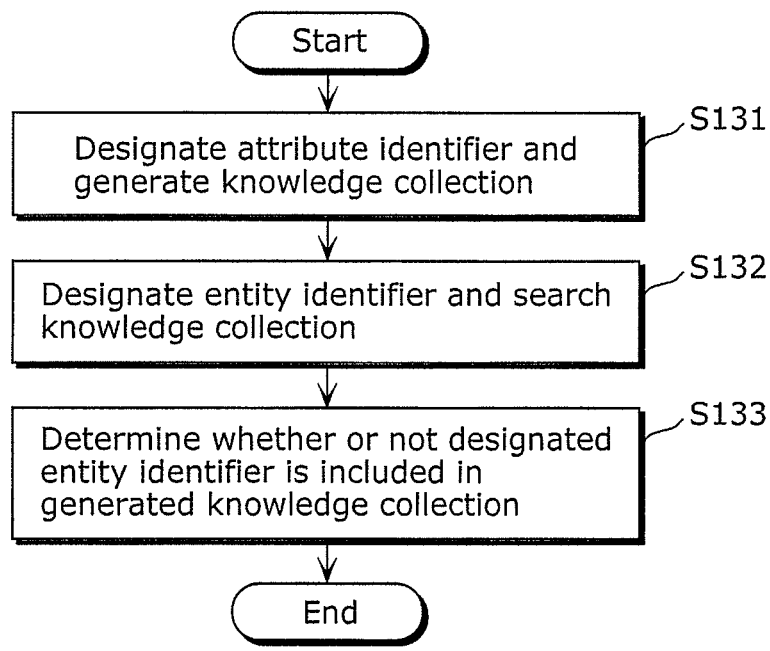
FIG. 31 is a flowchart of a process of searching a knowledge collection.

An example of use of a knowledge collection is described first, with reference to FIG. 31. First, the entity/attribute list shown in FIG. 19 is searched by designating attribute identifiers of some attributes as a key, as a result of which a knowledge collection of only entities having all attributes used in the search is generated (Step S131). Next, the generated knowledge collection is searched by designating an entity identifier of a given entity as a key (Step S132). When the entity identifier of the search key is included in the generated knowledge collection, the entity can be determined as having all attributes designated upon generating the knowledge collection (Step S133).

As a specific example, suppose a knowledge collection of graduates of a school is generated. This knowledge collection of graduates is searched using an identifier of Mr. Suzuki. When the identifier of Mr. Suzuki can be selected, Mr. Suzuki can be determined as a graduate of the school. In the case where a given entity is included in a knowledge collection generated by designating one or more given attribute identifiers, the given entity is determined as satisfying a condition of the given attributes.

The networked knowledge use method has been described in the above hypothesis. A procedure of implementing the use method described in the hypothesis is described below, with reference to FIGS. 28A to 28C.

Learning includes generating or deleting a knowledge network, adding or deleting an entity in a knowledge network, adding, deleting, or changing an entity-to-entity connection, and so on. A connection can be changed by combining addition and deletion. That is, a connection can be changed by deleting an unnecessary connection and adding a new connection. Learning also includes adding or deleting an attribute which is ancillary information of an entity. Learning further includes adding or deleting feature data or identification data to or from an attribute.

A knowledge network is generated in the following manner.

A knowledge network identifier of a new knowledge network is determined first. An attribute characterizing the new knowledge network is determined next. A combination of the determined network identifier and an attribute identifier of the determined attribute is added to the knowledge network/attribute correspondence table 101 shown in FIG. 28B. In the case where a plurality of attributes characterize the knowledge network, combinations of the determined network identifier and attribute identifiers of the plurality of attributes are generated as many as the number of attributes, and added to the knowledge network/attribute correspondence table 101. Thus, the knowledge network and the attribute are associated with each other. The knowledge network information 84 can be obtained in this way. However, this knowledge network is still a knowledge network lacking knowledge.

Following this, an entity which is knowledge is added to the knowledge network. By adding the knowledge network information 84 to the node 80 which is an entity, the entity is added to the knowledge network. In detail, a combination of the knowledge network identifier and an entity identifier of the entity is added to the entity/knowledge network correspondence table shown in FIG. 29. In so doing, the knowledge network information is added to the node.

Next, entities in the knowledge network are connected to each other. An entity can be connected to another entity by adding the forward pointer 82 and the backward pointer 83 to the knowledge network information 84. The two connected entities are assumed to already have the knowledge network information 84. In detail, a forward pointer and a backward pointer are added to the pointer list in FIG. 29, as a result of which the entities are connected. In association with a combination of a knowledge network identifier and an entity identifier of one entity, a forward pointer or a backward pointer including an entity identifier of the other entity is added to the pointer list. Likewise, in association with a combination of a knowledge network identifier and an entity identifier of the other entity, a forward pointer or a backward pointer including an entity identifier of the one entity is added to the pointer list. This connects the two entities.

In the case where each of the former entity and the latter entity sets the entity identifier of the other one of the former entity and the latter entity in the forward pointer, the two entities are bidirectionally connected. In the case where one of the former entity and the latter entity sets the entity identifier of the other one of the former entity and the latter entity in the forward pointer while the other one of the former entity and the latter entity sets the entity identifier of the one of the former entity and the latter entity in the backward pointer, the two entities are unidirectionally connected.

An entity-to-entity connection is deleted in the following manner.

Two connected entities each have a pointer including an entity identifier of the other entity. The connection between the two entities can be deleted by deleting the two pointers from the pointer list. In the case where, in a knowledge network, there is no pointer in the pointer list for indicating an entity identifier of an entity, the entity may be deleted from the knowledge network. The entity is deleted from the knowledge network by deleting, from the entity/knowledge network correspondence table, a row of correspondence between the entity identifier and the knowledge network identifier.

An attribute which is ancillary information of an entity is added or deleted in the following manner.

The entity/attribute list shown in FIG. 19 is searched using an entity identifier and an attribute identifier as a key. By deleting the selected row, the connection between the attribute and the entity can be deleted. The attribute itself is not deleted here. By adding a correspondence relationship between an entity identifier and an attribute identifier to the entity/attribute list, the attribute can be added to the entity.

A new entity is added between two entities in the following manner. First, the new entity is connected to the two entities according to the above-mentioned procedure. Next, the connection between the two entities is deleted according to the above-mentioned procedure.

An entity is recognized using a given attribute in the following manner.

One attribute is selected from among given attributes, and the entity/attribute list is searched using an attribute identifier of the selected attribute as a key. Following this, one attribute is selected from among the rest of given attributes, and a search result is further searched using an attribute identifier of the selected attribute as a key. This is performed for all of the given attributes. Even though there are a plurality of selected rows, when only one entity identifier is included in these selected rows, the entity identifier represents an entity having all of the given attributes. Hence, the entity is identified by the given attributes.

In the case where a plurality of entity identifiers remain even after the search is performed for all of the given attributes, the plurality of entity identifiers represent candidates of the entity to be identified. In such a case, an attribute is further added to repeat the search until there is only one entity identifier.

An attribute is selected in the following manner. Feature data or identification data in the knowledge base determined as the same as feature data or identification data generated from information inputted to the knowledge base system is selected and obtained. An attribute directly connected to and associated with the obtained feature data or identification data is selected and obtained. This obtained attribute is used to perform entity recognition as mentioned above.

Inference is performed in the following manner.

Two entities are designated, and a search is performed for a path of traveling from one entity to the other entity while following a pointer. When the travel path is found, there is a possibility that the two entities have some kind of relationship. This process corresponds to inference. In the case of a directional connection, there are a method of using both a forward pointer and a backward pointer and a method of using only one of a forward pointer and a backward pointer. This process corresponds to inference.

Figure 32:
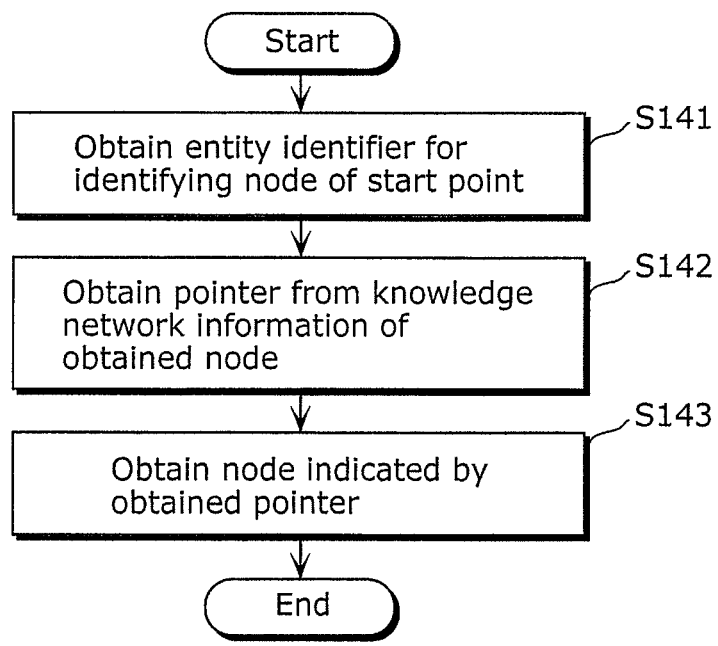
FIG. 32 is a flowchart of a process of following a knowledge network.

As shown in FIG. 32, an entity identifier of an entity as a start point, i.e. a node of a start point, is designated first (Step S141). The entity/knowledge network correspondence table shown in FIG. 29 is searched using the entity identifier as a key, to obtain a knowledge network identifier of a knowledge network to which the entity identified by the entity identifier belongs.

Following this, the pointer list is searched using the entity identifier and the knowledge network identifier as a key, to obtain a forward pointer or a backward pointer of the entity identified by the entity identifier in the knowledge network identified by the knowledge network identifier (Step S142).

Next, an entity identifier set in the obtained forward pointer or backward pointer is referenced to obtain an entity (node) related to the entity identified by the entity identifier designated first (Step S143). By repeating this process, it is possible to travel within the same knowledge network or to another knowledge network. Sequentially recording entity identifiers of entities to which travel is performed enables recording of a travel path.

Travel is performed from one entity as a start point to another connected entity, while following a pointer. There is a possibility that the entity at the start point and the reached entity have some kind of relationship. This process is also inference. When one entity is connected to a plurality of entities, a weight of each pointer may be compared to select a pointer of highest relatedness for travel. In the case of traveling from one entity to a different knowledge network, a weight of knowledge network information of each knowledge network may be compared to travel to a knowledge network of lowest relatedness.

Thus, a possibility of relatedness between entities can be detected by traveling within one knowledge network or between a plurality of knowledge networks. Once the possibility of relatedness between the two entities has been detected, the degree of commonality, the degree of non-commonality, the degree of similarity, or the like is calculated to generate information for determining whether or not the two entities are related to each other. The use of symbolic logic here enables precise determination of whether or not the two entities are related to each other.

Figure 33:
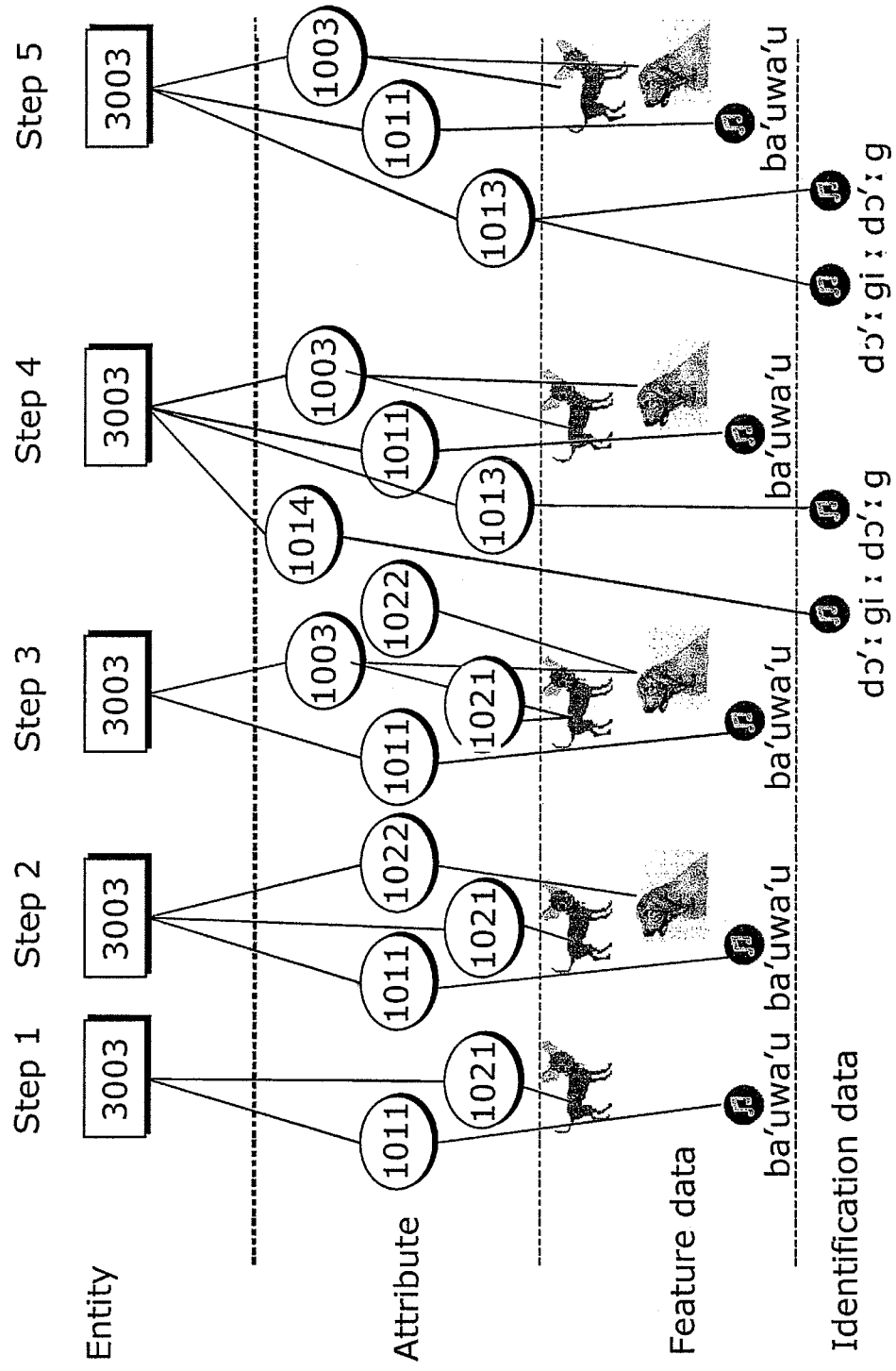
FIG. 33 is a diagram showing an example of a data structure in a knowledge base.

In FIG. 33, a word "Dog" in the language is inputted by speech to the knowledge base system, and identification data is generated and stored in the knowledge base according to the embodiment. When the word "Dog" is inputted by speech, the feature extraction unit 1020 generates identification data of the sound data. Meanwhile, when an image of letters for the word "Dog" is inputted, the feature extraction unit 1020 generates identification data of the image. When a character code of the word "Dog" is inputted, the feature extraction unit 1020 generates identification data of the character code.

Though "Dog" is shown in phonetic symbols in FIG. 33, the form of expression of identification data is not limited to this, and the above-mentioned sound data, image data, character code, and the like may also be used. For example, in the case of sound input via the microphone, identification data is pattern data of a sequence of numeric values or binary data indicating a signal strength for each frequency component, such as 55 as an intensity of sound of 100 hertz, 156 as an intensity of sound of 200 hertz, and so on. Feature data and identification data marked with a musical note in FIG. 33 and the like is the above-mentioned sound data or sound pattern data.

In the knowledge base, identification data does not directly represent a meaning or a concept. Only feature data directly has and represents a meaning or a concept in the knowledge base, and therefore a meaning or a concept is unknown unless feature data is obtained.

The knowledge base according to the embodiment includes an entity and an attribute. For example, an entity (3003) shown in FIG. 33 represents a dog. An attribute (1003) represents a feature of an appearance of a dog. Hereafter, "entity (xxxx)" denotes an entity identifier "xxxx", and "attribute (yyyy)" denotes an attribute identifier "YYYY".

An example of a process in which data is stored and knowledge is accumulated in the knowledge base according to the embodiment is described below, with reference to FIG. 33. This is merely an example, and the other processes are also applicable.

First, an image of a dog is captured by the camera, and the image data is inputted to the knowledge base system 1000 according to the embodiment of the present invention. That is, an image of a dog is captured by the camera as an input device, and the captured image data is inputted to the knowledge base system 1000 via the data input unit 1010. The image data which is the input data received by the data input unit 1010 is passed to the feature extraction unit 1020. The feature extraction unit 1020 extracts a feature from the input data, and generates feature data.

The generated feature data is passed to the data comparison unit 1030. The data comparison unit 1030 compares the received feature data with already stored feature data, to check whether or not the same feature data exists. In the case where the same feature data does not exist, the data storing unit 1040 stores the received feature data in the knowledge base, newly generates an attribute in the knowledge base, and connects the stored feature data and the newly generated attribute. The data storing unit 1040 also newly generates an entity in the knowledge base, and connects the newly generated entity and the newly generated attribute. As a result, the entity indirectly associated with the dog which is the object directly emitting the image is generated in the knowledge base. The entity in the knowledge base is not directly associated with the object.

The following describes a learning process by entity addition in Step 1 shown in FIG. 33.

Suppose, while capturing an image of a dog as an object by the camera, the dog's bark "bowwow" is inputted to the knowledge base system 1000 from the microphone.

That is, an image of a small dog as an object is captured by the camera, and inputted to the data input unit 1010 in the knowledge base system 1000. The image data inputted to the data input unit 1010 is passed to the feature extraction unit 1020. The feature extraction unit 1020 generates feature data from the inputted image data. The data comparison unit 1030 checks whether or not the same feature data already exists in the knowledge base. Since the same feature data does not exist, the data storing unit 1040 stores the feature data in the knowledge base, generates an attribute (1021) shown in FIG. 33, and connects the stored feature data to the attribute (1021).

The data storing unit 1040 also generates the entity (3003) shown in FIG. 33, and connects the attribute (1021) and the entity (3003) to each other. Thus, the knowledge base system 1000 receives information from outside the knowledge base system 1000, generates feature data from the received information, and stores the generated feature data in the knowledge base. The knowledge base system 1000 then generates an attribute, and connects the stored feature data to the generated attribute. The knowledge base system 1000 also generates an entity, and connects the generated attribute to the generated entity. The process in which the feature data is connected to the newly generated entity through the attribute corresponds to the learning process by entity addition.

Input processing is equally performed on the dog's bark inputted from the microphone. Sound data of the dog's bark "bowwow" inputted to the data input unit 1010 from the microphone is passed to the feature extraction unit 1020. The feature extraction unit 1020 generates feature data from the received sound data. The data comparison unit 1030 determines that the same feature data does not exist in the knowledge base. The data storing unit 1040 accordingly stores the generated feature data in the knowledge base. The data storing unit 1040 also generates an attribute (1011) shown in FIG. 33, and connects the stored feature data to the attribute (1011). Though not shown, the data storing unit 1040 may further generate an entity and connect the attribute (1011) to the generated entity. Alternatively, the data storing unit 1040 may not generate the entity.

When an operator makes a keyboard input or a mouse operation, the learning unit 1050 conducts the following learning process. The following learning process may be automatically launched when an entity is generated and then feature data is generated. As an alternative, a keyboard input, a mouse operation, or the like may be made upon start of the input in Step 1 to instruct to perform the learning process beforehand.

First, the learning unit 1050 obtains the feature data generated first and stored in the knowledge base, or the feature data in the knowledge base determined as the same as the feature data generated first. The search unit 1060 obtains the attribute (1021) connected to the obtained feature data. The search unit 1060 also obtains the entity (3003) connected to the obtained attribute (1021). The learning unit 1050 receives the obtained entity (3003), and recognizes the entity (3003).

Next, the learning unit 1050 obtains the feature data generated next from the dog's bark "bowwow" and stored in the knowledge base, or the feature data in the knowledge base determined as the same as the feature data generated next. The search unit 1060 obtains the attribute (1011) connected to the feature data. At this point, the two attributes (1021, 1011) are not directly connected to the same entity, and accordingly the learning unit 1050 performs the following process.

The learning unit 1050 connects the recognized entity (3003) to the attribute (1011) that is generated next and is not directly connected to the recognized entity (3003). The entity (3003) becomes an entity having the feature data of the dog's bark through the attribute (1011). This state corresponds to Step 1 shown in FIG. 33.

Note that a criterion of whether or not input is performed sequentially, i.e. a time interval criterion, is held in the knowledge base system 1000 beforehand. It is also possible to receive a new criterion from outside the knowledge base system 1000, hold the received criterion, and make criterion addition or change. A determination criterion of whether or not the feature data is the same is also held in the knowledge base system 1000 beforehand. It is also possible to receive a new criterion from outside the knowledge base system 1000, hold the received criterion, and make criterion addition or change.

After the feature data is stored in the knowledge base to thereby construct the knowledge base as described above, the following recognition process can be carried out. For example, suppose the dog's bark is inputted to the data input unit 1010 in the knowledge base system 1000 from the microphone. The data input unit 1010 passes sound data of the dog's bark to the feature extraction unit 1020, and the feature extraction unit 1020 generates feature data from the received sound data. The data comparison unit 1030 receives the generated feature data, and checks whether or not the same feature data exists in the knowledge base. When the same feature data is found, the search unit 1060 obtains the attribute (1011) connected to the found feature data. The search unit 1060 also obtains the entity (3003) connected to the attribute (1011), and recognizes the entity (3003).

Thus, from the dog's bark inputted to the knowledge base system 1000, the object directly emitting the bark is recognized as the entity (3003). The search unit 1060 further obtains another attribute (1021) connected to the entity (3003), thereby obtaining another feature data generated from the image of the dog and connected to the attribute (1021). The obtained feature data is feature data generated from information, i.e. an image, directly emitted from the recognized object. In this way, feature data other than the bark used for the recognition of the entity (3003) can be obtained. Upon receiving the feature data generated from the image, the output unit 1080 displays the image of the dog on the display device which is an output device, based on the received feature data.

Hence, it is possible to recognize the object based on the bark, and output the image of the dog which is the recognized object.

The following describes a learning process by feature data addition in Step 2 shown in FIG. 33.

Suppose the dog's bark "bowwow" is inputted to the knowledge base system 1000 from the microphone. The sound data inputted to the data input unit 1010 from the microphone is passed to the feature extraction unit 1020, and the feature extraction unit 1020 generates feature data. The data comparison unit 1030 receives the generated feature data, and checks whether or not the same feature data exists in the knowledge base. When the same feature data is found, the search unit 1060 obtains the attribute (1011) connected to the same feature data. The search unit 1060 also obtains the entity (3003) connected to the attribute (1011). As a result of this process, the entity (3003) is recognized from the dog's bark "bowwow" inputted from the microphone.

A determination criterion of whether or not the feature data is the same is held in the knowledge base system 1000 beforehand. It is also possible to receive a new determination criterion from outside the knowledge base system 1000 and hold the received determination criterion. The determination criterion of whether or not the feature data is the same is referred to as a sameness criterion.

Following this, an image of another large dog is captured by the camera and inputted to the data input unit 1010 in the knowledge base system 1000. The image data inputted to the data input unit 1010 is passed to the feature extraction unit 1020. The feature extraction unit 1020 generates feature data from the inputted image data. The data comparison unit 1030 receives the generated feature data, and checks whether or not the same feature data exists in the knowledge base. Here, the data comparison unit 1030 determines that the same feature data does not exist. The data storing unit 1040 accordingly stores the generated feature data in the knowledge base, generates an attribute (1022) shown in FIG. 33, and connects the stored feature data to the generated attribute (1022). Though not shown, the data storing unit 1040 may further generate an entity and connect the attribute (1022) to the generated entity. Alternatively, the data storing unit 1040 may not generate the entity.

When the operator makes a keyboard input or a mouse operation, the learning unit 1050 conducts the following learning process. The following learning process may be automatically launched when two pieces of feature data are sequentially generated. As an alternative, a keyboard input or a mouse operation may be made before the data input to instruct to perform the learning process beforehand.

First, the learning unit 1050 obtains the feature data in the knowledge base determined as the same as the feature data generated from the dog's bark "bowwow" and received first. The search unit 1060 obtains the attribute (1011) connected to the obtained feature data. The search unit 1060 also obtains the entity (3003) connected to the obtained attribute (1011). The learning unit 1050 receives the obtained entity (3003), and recognizes the entity (3003). Following this, the learning unit 1050 obtains the feature data generated from the image of the large dog and received and stored next. The search unit 1060 obtains the attribute (1022) connected to the feature data. Since the obtained two attributes (1011, 1022) are not connected to the same entity, the learning unit 1050 performs the following process.

The learning unit 1050 connects the recognized entity (3003) to the attribute (1022) that is received next and is not directly connected to the recognized entity (3003). The entity (3003) becomes an entity having the feature data generated from the image of the large dog through only the attribute (1022).

The following describes a learning process by feature data integration in Step 3 shown in FIG. 33. This learning process is a process of integrating feature data stored in the knowledge base, which is performed after the learning process by feature data addition in Step 2. This is a process of connecting pieces of feature data connected to two different attributes, to one common attribute. After the input in Step 2, when instructed to perform the integration process by a mouse operation or a keyboard input, the learning unit 1050 conducts the following integration process. Alternatively, a mouse operation or a keyboard input may be made upon start of Step 2 to instruct to perform the integration process.

The image of the small dog is inputted from the camera, and the feature extraction unit 1020 generates feature data from the inputted image data. The data comparison unit 1030 checks whether or not the same feature data as the generated feature data exists in the knowledge base. Since the same feature data exists in the knowledge base, the search unit 1060 obtains the attribute (1021) connected to the feature data. The search unit 1060 also obtains the entity (3003) connected to the obtained attribute (1021).

Following this, the image of the large dog is inputted from the camera, and the feature extraction unit 1020 generates feature data from the inputted image data. The data comparison unit 1030 checks Whether or not the same feature data as the generated feature data exists in the knowledge base. Since the same feature data exists in the knowledge base, the search unit 1060 obtains the attribute (1022) connected to the feature data. The search unit 1060 also obtains the entity (3003) connected to the obtained attribute (1022).

Since the attribute (1021) and the attribute (1022) are connected to the same entity, the learning unit 1050 performs the following process.

The learning unit 1050 obtains the two attributes (1021, 1022). In the case where the numbers of pieces of feature data respectively connected to the two different attributes are both one, the learning unit 1050 performs the following process. The learning unit 1050 generates a new attribute (1003), connects the two pieces of feature data to the generated attribute (1003), and deletes the connections between the entity (3003) and the two attributes (1021, 1022). Instead of generating the new attribute (1003), the learning unit 1050 may directly connect, to one of the two attributes (1021, 1022), the feature data connected to the other attribute, and delete the connection between the entity (3003) and the other attribute.

In the case where the number of pieces of feature data connected to one attribute is one whereas the number of pieces of feature data connected to the other attribute is more than one, the learning unit 1050 performs the following process. The learning unit 1050 connects the feature data connected to the attribute to which only one piece of feature data is connected, to the other attribute, and deletes the connection between the entity and the attribute to which only one piece of feature data is connected.

When feature data is newly stored in the knowledge base, an attribute is generated, and the stored feature data is connected to the generated attribute. In other words, when feature data is stored in the knowledge base, the number of pieces of feature data connected to an attribute to which the stored feature data is connected is only one. Hence, the above-mentioned feature data aggregation is possible.

An attribute connected to a plurality of pieces of feature data aggregates these pieces of feature data together, to represent a property, a feature, a meaning, or a concept of aggregated feature data.

A recognition process can be performed in a state of Step 3, too. When the dog's bark is inputted to the knowledge base system 1000, feature data is generated from the inputted dog's bark, and the generated feature data is compared with feature data in the knowledge base. When the same feature data is found, the attribute (1011) connected to the same feature data is obtained. After obtaining the entity (3003) connected to the attribute (1011), a plurality of (two in this example) pieces of feature data can be obtained simply by obtaining only one other attribute (1003) connected to the entity (3003). In the case of Step 2, on the other hand, the two pieces of feature data cannot be obtained unless the two attributes (1021) and (1022) are obtained.

Suppose the dog's bark "bowwow" is inputted to the knowledge base system 1000 from the microphone. The feature extraction unit 1020 generates feature data from the inputted dog's bark, and passes the generated feature data to the data comparison unit 1030. Since the feature data generated from the dog's bark is already stored in the knowledge base, the data comparison unit 1030 determines that the same feature data exists. The search unit 1060 accordingly obtains the attribute (1011) connected to the same feature data. The search unit 1060 also obtains the entity (3003) connected to the attribute (1011). The search unit 1060 further obtains the other attribute (1003) connected to the entity (3003), with it being possible to obtain the feature data connected to the attribute (1003). The output unit 1080 displays the image of the dog on the display device, based on the obtained feature data. Through the above series of processing, the object is recognized as a dog from the dog's bark and the image of the recognized dog is displayed.

In the state of Step 2, the two attributes (1021) and (1022) are obtained. In the state of Step 3, on the other hand, only one attribute (1003) needs to be obtained to obtain two pieces of feature data. The number of times an attribute connected to the entity is obtained can be reduced, which contributes to faster feature data obtainment than in Step 2.

The following describes a learning process by identification data addition in Step 4 shown in FIG. 33.

The image of the small dog is inputted to the data input unit 1010 in the knowledge base system 1000 from the camera. The feature extraction unit 1020 generates feature data from the inputted image. The data comparison unit 1030 checks whether or not the same feature data as the generated feature data exists in the knowledge base. Since the same feature data is found, the search unit 1060 obtains the attribute (1003) connected to the same feature data. The search unit 1060 also obtains the entity (3003) connected to the obtained attribute (1003). Thus, from the image of the small dog inputted from the camera, the object directly emitting the image is recognized as the entity (3003).

Next, a speech sound of the word "Dog" is inputted to the data input unit 1010 in the knowledge base system 1000 from the microphone. The feature extraction unit 1020 generates identification data from the inputted speech, and the data comparison unit 1030 checks whether or not the same identification data as the generated identification data exists in the knowledge base. Since the same identification data is not found, the data storing unit 1040 stores the generated identification data in the knowledge base. The data storing unit 1040 also generates an attribute (1013), and connects the generated attribute (1013) and the stored identification data. Though not shown, the data storing unit 1040 may further generate an entity and connect the attribute (1013) to the generated entity. Alternatively, the data storing unit 1040 may not generate the entity.

When the operator makes a keyboard input or a mouse operation, the learning unit 1050 conducts the following learning process. The following learning process may be automatically launched when one piece of feature data and one piece of identification data are sequentially generated. Alternatively, a mouse operation or a keyboard input may be made upon start of Step 4 to instruct to perform the integration process.

First, the learning unit 1050 obtains the feature data in the knowledge base determined as the same as the feature data generated from the image of the small dog and received first. The search unit 1060 obtains the attribute (1003) connected to the obtained feature data. The search unit 1060 also obtains the entity (3003) connected to the obtained attribute (1003). The learning unit 1050 receives the obtained entity (3003), and recognizes the entity (3003).

Following this, the learning unit 1050 obtains the identification data generated from the speech sound of the word "Dog" and received and stored next. The search unit 1060 obtains the attribute (1013) connected to the identification data. Since the obtained two attributes (1003, 1013) are not connected to the same entity, the learning unit 1050 performs the following process.

The learning unit 1050 connects the recognized entity (3003) to the attribute (1013) that is received next and is not directly connected to the recognized entity (3003). The entity (3003) becomes an entity having the identification data generated from the word "Dog" through the attribute (1013).

Likewise, identification data generated from a speech sound of a word "Doggy" is stored in the knowledge base. An attribute (1014) is generated and connected to the stored identification data. The generated attribute (1014) is connected to the entity (3003). The image of the small dog and the word "Doggy" may be associated with each other, and the word "Dog" and the word "Doggy" may be associated with each other.

For the sake of simplifying the drawing, the attribute (1021) and the attribute (1022) are not shown in Step 4.

The following describes a learning process by identification data integration in Step 5 shown in FIG. 33.

This learning process is a process of integrating identification data stored in the knowledge base, which is performed after the learning process by identification data addition in Step 4. This is a process of connecting pieces of identification data connected to two different attributes, to one common attribute. After the learning process by identification data addition in Step 4, when instructed to perform the integration process by a mouse operation or a keyboard input, the learning unit 1050 conducts the following integration process. Alternatively, a mouse operation or a keyboard input may be made upon start of Step 4 in order to instruct to perform the integration process.

The speech sound of the word "Dog" is inputted from the microphone, and the feature extraction unit 1020 generates identification data from the inputted speech. The data comparison unit 1030 checks whether or not the same identification data as the generated identification data exists in the knowledge base. Since the same identification data exists in the knowledge base, the search unit 1060 obtains the attribute (1013) connected to the identification data. The search unit 1060 also obtains the entity (3003) connected to the obtained attribute (1013).

Following this, the speech sound of the word "Doggy" is inputted from the microphone, and the feature extraction unit 1020 generates identification data from the inputted speech. The data comparison unit 1030 checks whether or not the same identification data as the generated identification data exists in the knowledge base. Since the same identification data exists in the knowledge base, the search unit 1060 obtains the attribute (1014) connected to the identification data. The search unit 1060 also obtains the entity (3003) connected to the obtained attribute (1014).

Since the two attributes (1013, 1014) are connected to the same entity (3003), the learning unit 1050 performs the following process.

The learning unit 1050 obtains the two attributes (1013, 1014). In the case where the numbers of pieces of identification data respectively connected to the two different attributes are both one, the learning unit 1050 performs the following process. The learning unit 1050 generates a new attribute, connects the two pieces of identification data to the generated attribute, connects the generated attribute to the entity (3003), and deletes the connections between the entity (3003) and the two attributes (1013, 1014). Instead of generating the new attribute, the learning unit 1050 may directly connect, to one of the two attributes (1013, 1014), e.g. the attribute (1013), the identification data connected to the other attribute (1014), and delete the connection between the entity (3003) and the other attribute (1014). For the sake of simplifying the drawing, the attribute (1014), the attribute (1021), and the attribute (1022) are not shown in Step 5.

In the case where the number of pieces of identification data connected to one attribute is one whereas the number of pieces of identification data connected to the other attribute is more than one, the learning unit 1050 performs the following process. The learning unit 1050 connects the identification data connected to the attribute to which only one piece of identification data is connected, to the other attribute, and deletes the connection between the entity and the attribute to which only one piece of identification data is connected.

When identification data is newly stored in the knowledge base, an attribute is generated, and the stored identification data is connected to the generated attribute. In other words, when identification data is stored in the knowledge base, the number of pieces of identification data connected to an attribute to which the stored identification data is connected is only one. Hence, the above-mentioned identification data aggregation is possible. An attribute connected to a plurality of pieces of identification data aggregates these pieces of identification data together, to represent aggregated identification data.

As a result of such learning, when the speech sound "Dog" or "Doggy" is inputted from the microphone, the entity (3003) is recognized, and the image of the dog generated from the feature data that is connected to the entity (3003) through only one attribute (1013) can be displayed on the display device which is an output device. For example, when the speech sound "Dog" is inputted from the microphone, the feature extraction unit 1020 extracts a feature, and generates identification data. The data comparison unit 1030 checks whether or not the same identification data as the generated identification data exists in the knowledge base. Since the same identification data exists in the knowledge base, the search unit 1060 obtains the attribute (1013) connected to the identification data. The search unit 1060 also obtains the entity (3003) connected to the obtained attribute (1013). The search unit 1060 further obtains another attribute (1003) connected to the entity (3003), thereby obtaining feature data connected to the attribute (1003). The output unit 1080 displays the image of the dog on the display device, based on the obtained feature data. Moreover, the search unit 1060 obtains another attribute (1011) connected to the entity (3003), thereby obtaining feature data connected to the attribute (1011). The output unit 1080 outputs the dog's bark "Bowwow" from a sound reproduction device which is an output device, based on the obtained feature data. Thus, the entity "dog" is recognized from the word "Dog", and the image and bark of the dog are outputted.

In the case where there is no need to associate a word in the language with an attribute or an entity in the knowledge base, identification data is unnecessary. An animal incapable of language use is assumed to construct a knowledge base not including identification data, and perform knowledge processing such as recognition and inference by use of the knowledge base not including identification data. Meanwhile, a human who learns language is assumed to construct a knowledge base including both identification data and feature data. Accordingly, it is possible to construct (1) a knowledge base composed of feature data, attributes, and entities without including identification data, (2) a knowledge base composed of identification data, attributes, and entities without including feature data, and (3) a knowledge base composed of identification data, feature data, attributes, and entities. In the case of performing only symbolic logic, the knowledge base of (2) may be used.

Learning can not only add but also delete feature data, identification data, an attribute, or an entity in the knowledge base. A connection of feature data, identification data, an attribute, or an entity is added, deleted, or changed by learning.

Feature data and identification data are again described below.

As shown in FIG. 1, identification data in the knowledge base according to the embodiment is generated only from a word in the language, and feature data in the knowledge base according to the embodiment is generated only from data such as an image or a sound directly emitted from an object in the real world. The object is not a word. In the knowledge base, the identification data does not directly represent a meaning or a concept of the word. In order to detect the meaning or the concept of the original word, it is necessary to obtain an attribute connected to the identification data, obtain an entity connected to the obtained attribute, obtain another attribute connected to the obtained entity, and obtain the feature data connected to the obtained attribute.

In the knowledge base according to the embodiment, the entity (3003) is indirectly associated with an object "dog". In a knowledge base according to another embodiment, however, the entity (3003) may be indirectly associated with not an object "dog", but an object "cat". In view of this, identification data is generated from a word in the language and connected to and associated with an entity or an attribute in the knowledge base, thereby allowing information exchange to be performed between different knowledge bases through words.

Identification data is used to associate the language and the knowledge base outside the language, with each other. Since an identifier assigned to the same entity or the same attribute differs for each knowledge base, information exchange is impossible unless an identifier generated from a word in the language is used. The use of a word in the language as a medium allows information to be exchanged between a plurality of knowledge bases.

Identification data can also be used to extract knowledge from the knowledge base, into the language. By converting knowledge in the knowledge base to a word through the medium of identification data, the knowledge can be extracted from the knowledge base into the language. For example, an entity represented by an identifier in the knowledge base is converted to a word through the medium of identification data, as a result of which the entity can be distinguished more easily than when using only the identifier. Besides, when an entity identifier or an attribute identifier in the knowledge base is converted to a word, the entity or the attribute can then be written in letters. Understanding can be facilitated by visually recognizing such a written entity or attribute as a word.

Figure 34:
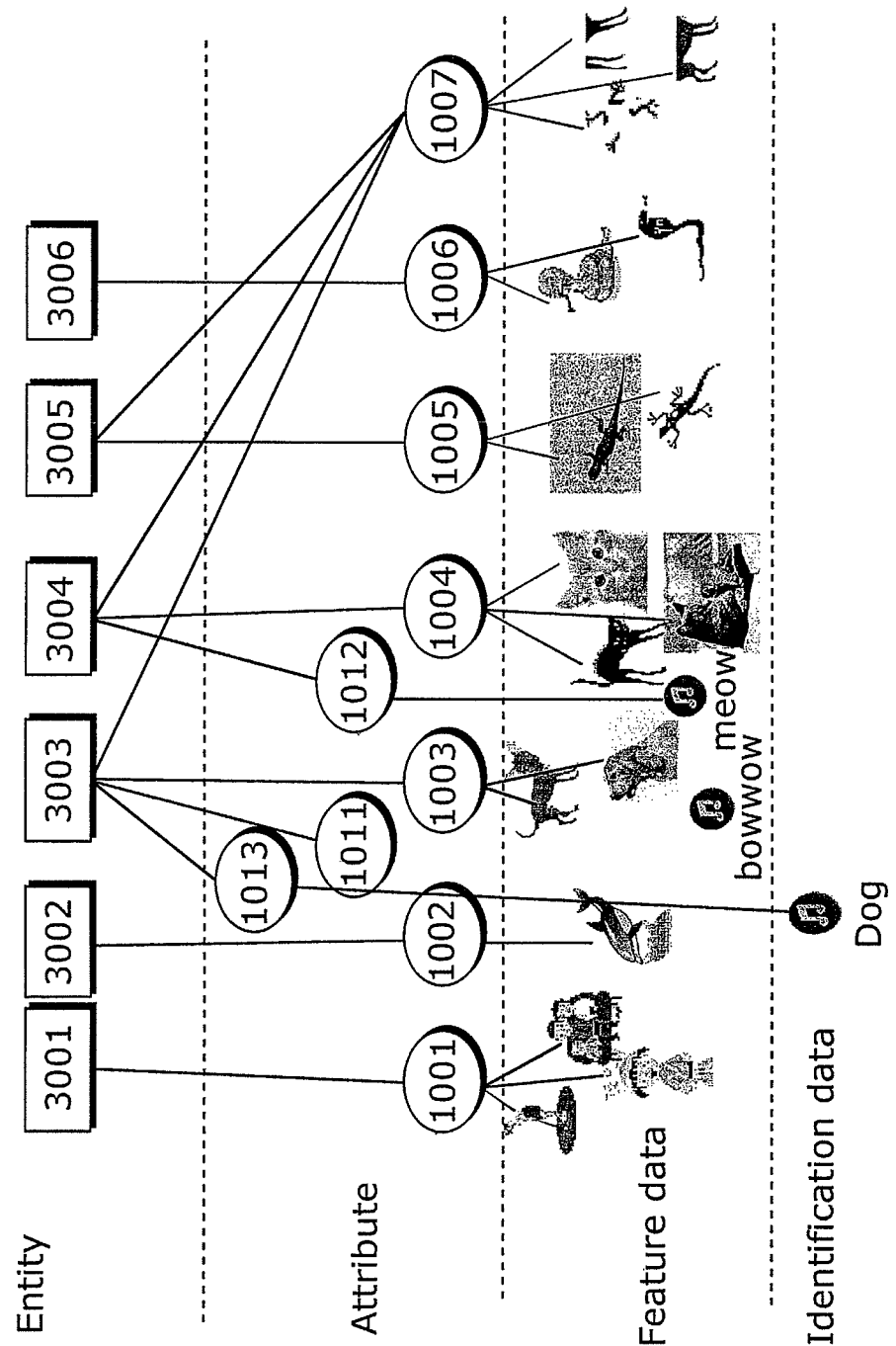
FIG. 34 is a diagram showing an example of a data structure in a knowledge base.

There is also a case where new feature data is generated from stored feature data. In FIG. 34, feature data of fourlegged is generated and stored in the knowledge base. This feature data is generated by the feature extraction unit 1020, from already stored feature data generated from images of a dog, a cat, a lizard, and the like.

Figure 35:
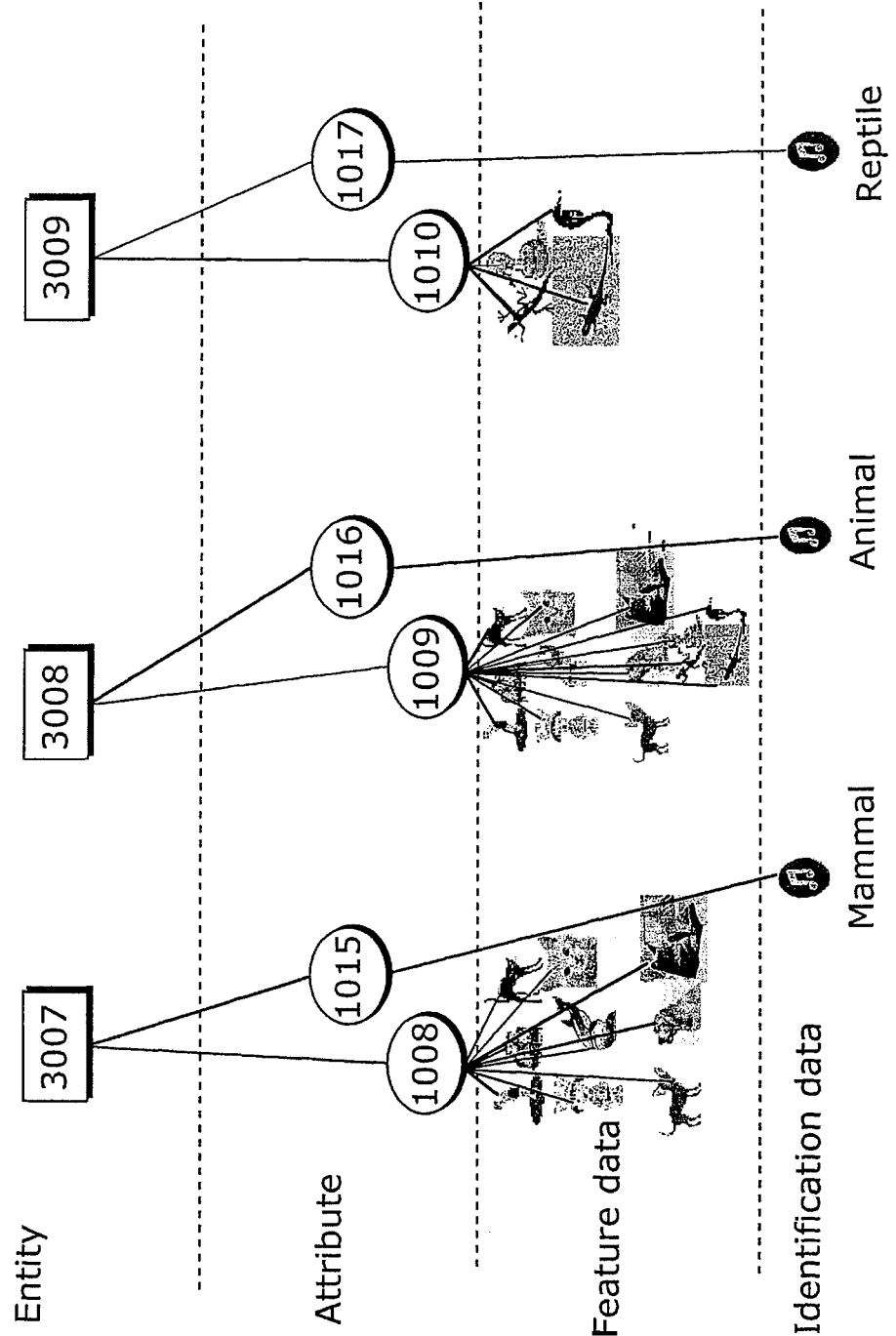
FIG. 35 is a diagram showing an example of a data structure in a knowledge base.

An entity (3001) "human", an entity (3002) "dolphin", the entity (3003) "dog", an entity (3004) "cat", an entity (3005) "lizard", and an entity (3006) "snake" are stored in the knowledge base shown in FIG. 34. FIG. 35 shows entities and attributes newly generated as a result of a learning process by the learning unit 1050 based on the knowledge base shown in FIG. 34.

For example, a speech sound of a word "Mammal" is inputted to the data input unit 1010 in the knowledge base system 1000 from the microphone. The feature extraction unit 1020 extracts a feature, and generates identification data. The data comparison unit 1030 determines that the identification data does not exist in the knowledge base, and the data storing unit 1040 stores the identification data in the knowledge base. The data storing unit 1040 generates an attribute (1015), and connects the identification data to the generated attribute (1015). The data storing unit 1040 also generates an entity (3007), and connects the generated attribute (1015) to the generated entity (3007).

A mouse operation or a keyboard input is made to instruct to perform an attribute integration process.

The speech sound of the word "Mammal" is again inputted to the data input unit 1010 in the knowledge base system 1000 from the microphone. The feature extraction unit 1020 extracts a feature, and generates identification data. The data comparison unit 1030 determines that the identification data exists in the knowledge base. The search unit 1060 obtains the attribute (1015) connected to the same identification data. The search unit 1060 also obtains the entity (3007) connected to the obtained attribute (1015). The learning unit 1050 receives the obtained entity (3007), and recognizes the entity (3007).

When an instruction to newly generate an attribute is inputted to the knowledge base system 1000 by a mouse operation or a keyboard input, the learning unit 1050 generates an attribute (1008), connects the generated attribute (1008) to the recognized entity (3007), and obtains the generated attribute (1008). A list of attributes already connected to the recognized entity (3007) is displayed on the display device, allowing the operator to designate one attribute from the list and obtain the designated attribute.

Next, the image of the large dog is inputted to the data input unit 1010 in the knowledge base system 1000 from the camera. The feature extraction unit 1020 extracts a feature, and generates feature data. The data comparison unit 1030 checks whether or not the same feature data as the generated feature data exists in the knowledge base. Since the same feature data exists, the search unit 1060 obtains the same feature data in the knowledge base.

When an instruction to add feature data is inputted to the knowledge base system 1000 by a mouse operation or a keyboard input, the learning unit 1050 connects the obtained feature data to the obtained attribute (1008).

As a result of repeating this process, a plurality of pieces of feature data generated from images of mammals are connected to the attribute (1008) as shown in FIG. 35, where the attribute (1008) represents a meaning or a concept "mammal". The attribute (1008) is connected to the entity (3007) "mammal". An entity (3008) "animal" and an entity (3009) "reptile" are generated in the same way as above.

Figure 36:
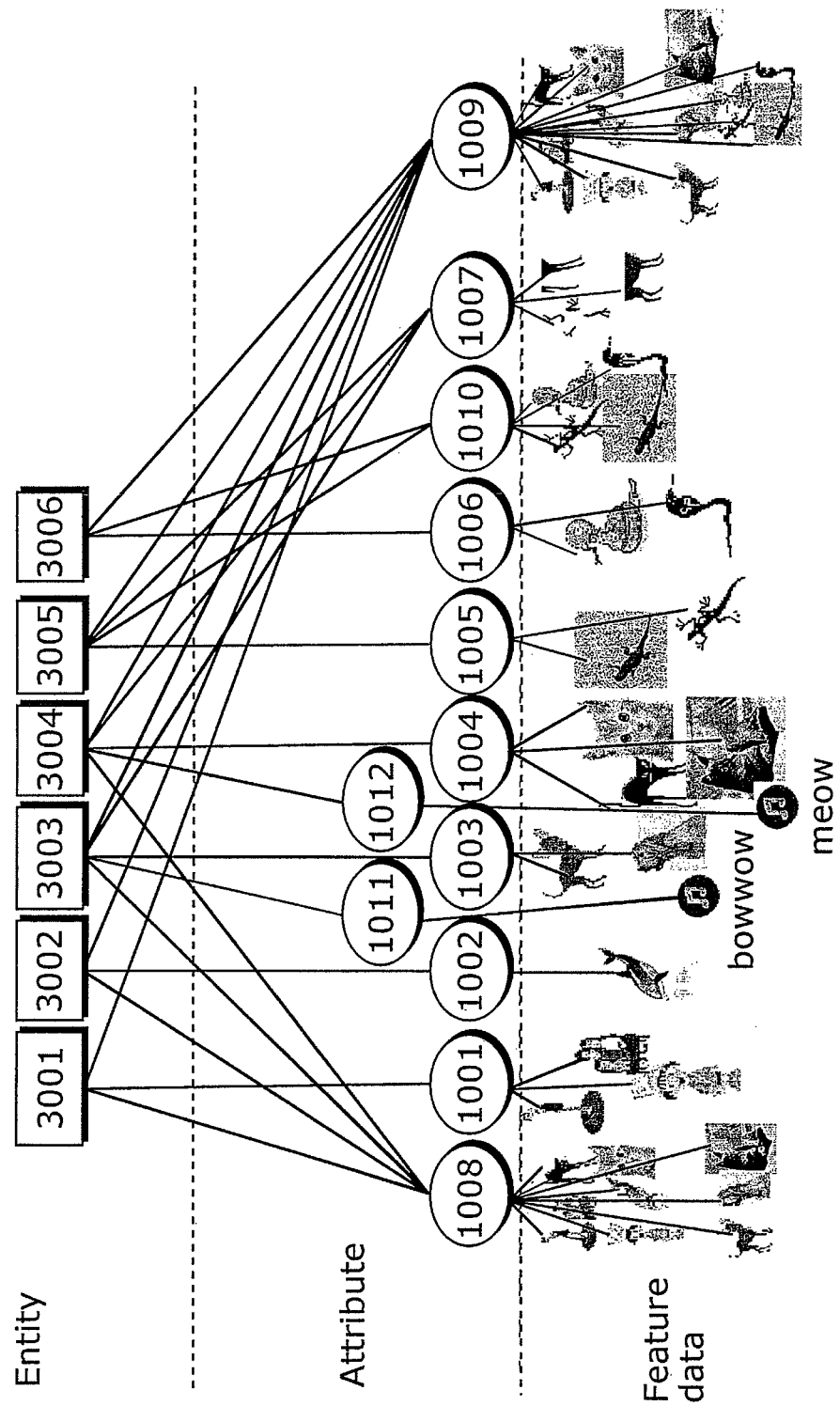
FIG. 36 is a diagram showing an example of a data structure in a knowledge base.

FIG. 36 shows a knowledge base in which the three attributes (1008, 1009, 1010) shown in FIG. 35 are added to the knowledge base shown in FIG. 34, with the attribute (1008) being connected to the entities (3001, 3002, 3003, 3004). Thus, the attribute (1008) "mammal" is added to the entities (3001, 3002, 3003, 3004) which accordingly have the attribute (1008). The same process is performed for the attributes (1009, 1010).

An attribute addition process by the learning unit 1050 is performed in the following manner.

For example, the speech sound of the word "Mammal" is inputted to the data input unit 1010 in the knowledge base system 1000 from the microphone. The feature extraction unit 1020 extracts a feature, and generates identification data. The data comparison unit 1030 determines that the same identification data exists in the knowledge base. The search unit 1060 obtains the attribute (1015) connected to the same identification data. The search unit 1060 also obtains the entity (3007) connected to the obtained attribute (1015). The learning unit 1050 recognizes the entity (3007).

Next, for example, an image of a human is inputted from the camera. The feature extraction unit 1020 generates feature data, and the search unit 1060 obtains an attribute (1001) connected to the same feature data as the generated feature data. The search unit 1060 also obtains the entity (3001) connected to the obtained attribute (1001). The learning unit 1050 recognizes the entity (3001). In the case where the entity (3007) recognized first and the entity (3001) recognized next are different, the learning unit 1050 connects the attribute (1008) directly connected to the entity (3007) recognized first, to the entity (3001) recognized next.

As a result of repeating this process, the entity (3001) "human", the entity (3002) "dolphin", the entity (3003) "dog", and the entity (3004) "cat" are connected to the attribute (1008) "mammal", and as a result have the attribute (1008).

In FIG. 36, for example, the entities connected to the attribute (1008) can be selected to collect the entities having the attribute (1008). The entities (3001, 3002, 3003, 3004) are the entities selected and collected in such a way. These collected entities are referred to as a knowledge collection. The entities having the attribute (1008) "mammal" are collected to thereby generate a collection of knowledge "mammal".

Figure 37:
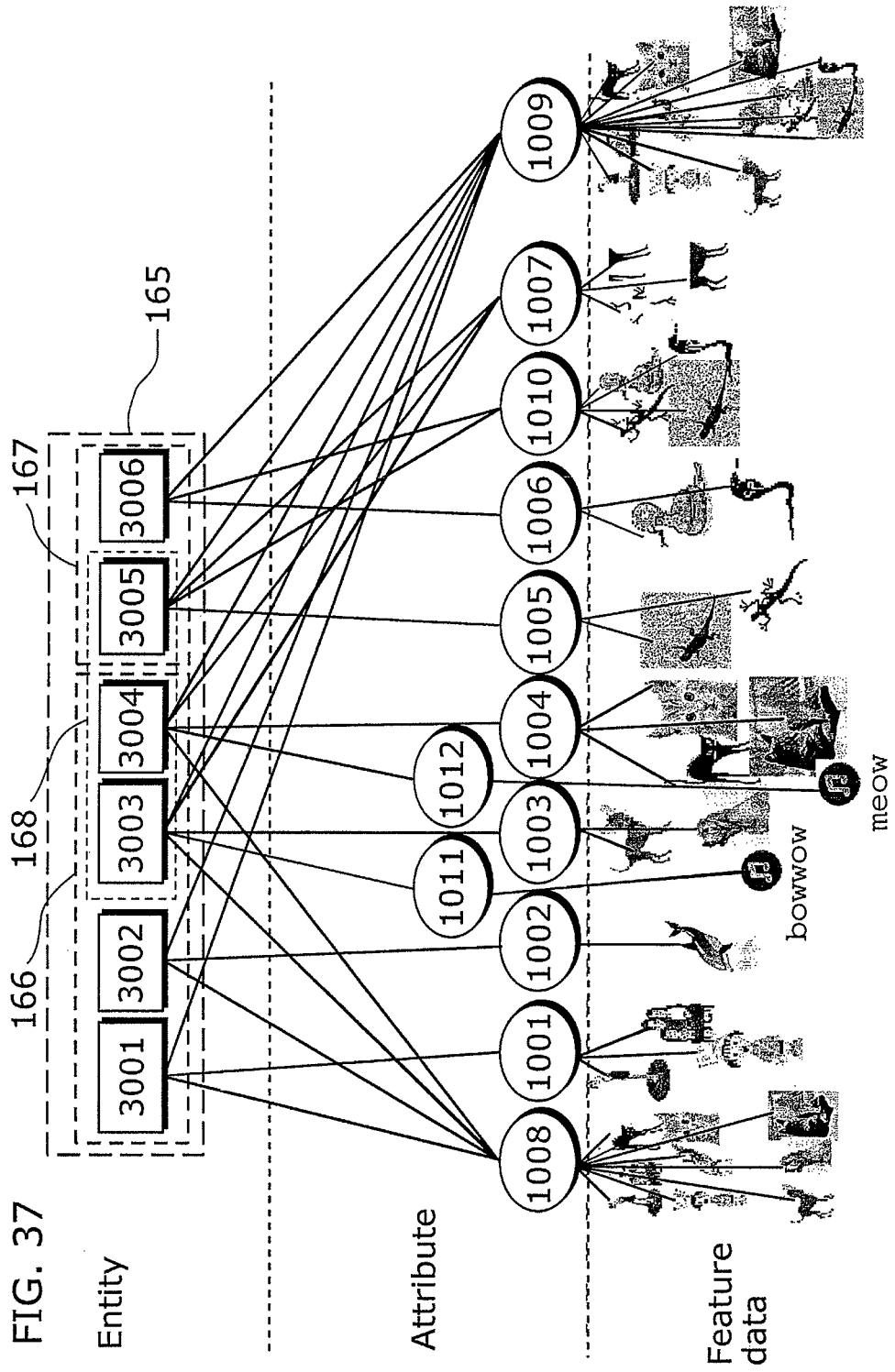
FIG. 37 is a diagram illustrating a knowledge collection in a knowledge base.

In FIG. 37, entities are enclosed with dashed line boxes. The parts enclosed with dashed line boxes, namely, a knowledge collection 165 "animal", a knowledge collection 166 "mammal", a knowledge collection 167 "reptile", and a knowledge collection 168 "four-legged", are each a knowledge collection. The four knowledge collections "animal", "mammal", "reptile", and "four-legged animal" are shown in FIG. 37.

Inference can be performed using a knowledge collection.

For example, inference is made on whether or not "a snake is a mammal". The entities connected to the attribute (1008) "mammal" are collected, and the knowledge collection 166 is generated. The knowledge collection 166 includes the entity (3001) "human", the entity (3002) "dolphin", the entity (3003) "dog", and the entity (3004) "cat". It is checked whether or not the entity (3006) "snake" is included in the knowledge collection. Since the entity (3006) "snake" is not included in the knowledge collection "mammal", inference that "a snake is not a mammal" can be drawn.

A knowledge collection is an abstract entity. This being so, a knowledge collection made up of knowledge collections which are abstract entities can be generated, in the same way as concrete entities. The same attribute is connected to abstract entities to thereby add the attribute. By collecting the entities having the added attribute, a new knowledge collection is generated.

Figure 38:
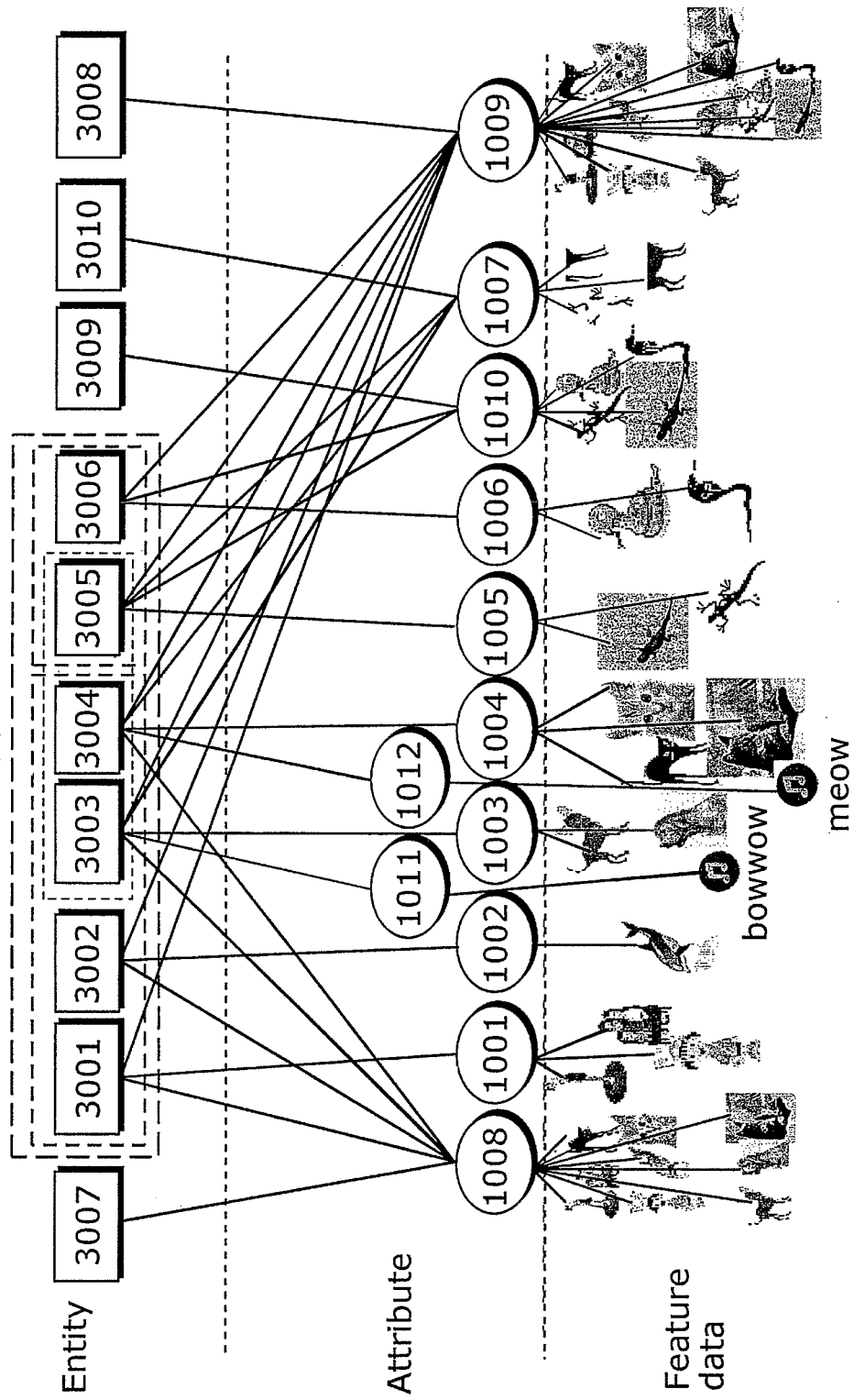
FIG. 38 is a diagram illustrating a knowledge collection in a knowledge base.

In FIG. 38, the abstract entities (3007, 3008, 3009) which are knowledge collections newly generated in FIG. 35 are added and directly connected to corresponding attributes. One knowledge collection is stored in the knowledge base as one abstract entity. For example, the abstract entity (3009) "reptile" is connected to the attribute (1010). The attribute (1010) is connected to feature data generated from an image of a snake and feature data generated from an image of a lizard, and represents "reptile". The same applies to the abstract entity (3007) "mammal" and the abstract entity (3008) "animal".

As shown in FIG. 38, the abstract entity (3009) "reptile" and the concrete entities (3005, 3006) such as "snake" and "lizard" constituting "reptile" are both represented in the same structure in the knowledge base. In both cases, feature data is connected to an attribute, and the attribute is connected to an entity. This makes it possible to generate a knowledge collection made up of abstract entities which are knowledge collections.

Thus, a knowledge base can be constructed based only on data directly emitted from an object itself which is not a word in the language such as English, Japanese, or Chinese, without using the language and a word in the language.

The following describes a knowledge network.

Figure 39:
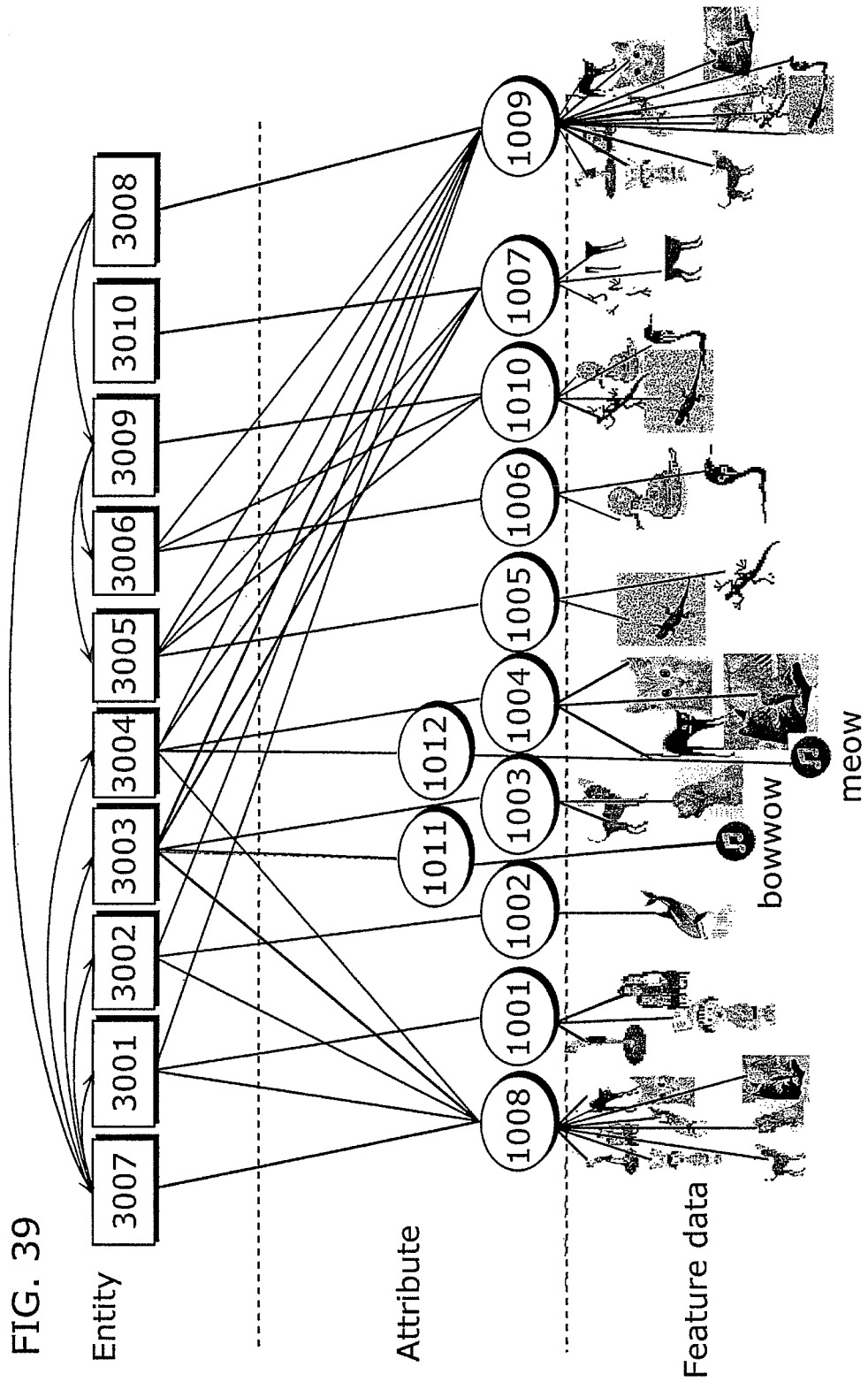
FIG. 39 is a diagram illustrating a knowledge network in a knowledge base.

In FIG. 39, entities are connected to each other by arrows. For example, entities are connected to each other by an arrow from the entity (3008) "animal" to the entity (3007) "mammal", an arrow from the entity (3008) "animal" to the entity (3009) "reptile", an arrow from the entity (3007) "mammal" to the entity (3001) "human", an arrow from the entity (3007) "mammal" to the entity (3002) "dolphin", an arrow from the entity (3007) "mammal" to the entity (3003) "dog", an arrow from the entity (3007) "mammal" to the entity (3004) "cat", an arrow from the entity (3009) "reptile" to the entity (3005) "lizard", and an arrow from the entity (3009) "reptile" to the entity (3006) "snake".

Figure 40:
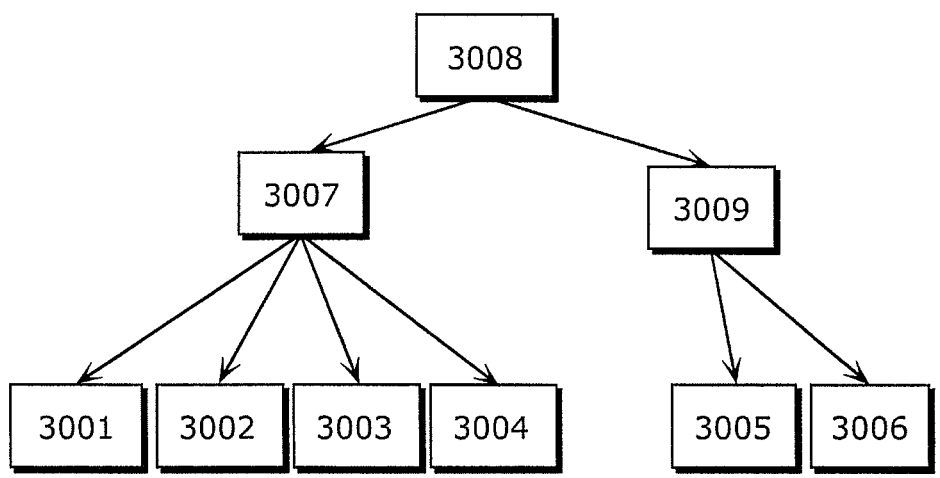
FIG. 40 is a diagram illustrating a knowledge network in a knowledge base.

FIG. 40 is a diagram showing only the connections between the entities. These connected entities, i.e. the connected entities as a whole, are a knowledge network. In this example, the knowledge network represents animal species classification. A beginning point of an arrow indicates a superclass, whereas a terminal point of the arrow indicates a subclass. Each connection in this knowledge network indicates an inclusion relationship, where a higher-level entity includes a lower-level entity.

In this knowledge network, travel can be made from the entity (3008) "animal" to the entity (3007) "mammal" by following the arrow in the forward direction, and further from the entity (3007) "mammal" to the entity (3002) "dolphin" by following the arrow in the forward direction.

Meanwhile, travel can be made from the entity (3002) "dolphin" to the entity (3007) "mammal" by following the arrow in the backward direction, and further from the entity (3007) "mammal" to the entity (3008) "animal" by following the arrow in the backward direction. In this way, it is possible to travel from the entity (3002) "dolphin" to the entity (3008) "animal". When travel can be made from one entity to another entity by following the connection in the knowledge network, it can be assumed that there is a possibility of some kind of relationship between the two entities. In this example, it can be determined from the connection in the knowledge network that a dolphin is classified as an animal. Inference can be made using a knowledge network in this way.

The single knowledge network shown in FIG. 40 may be generated by combining a plurality of knowledge networks.

Figure 41:
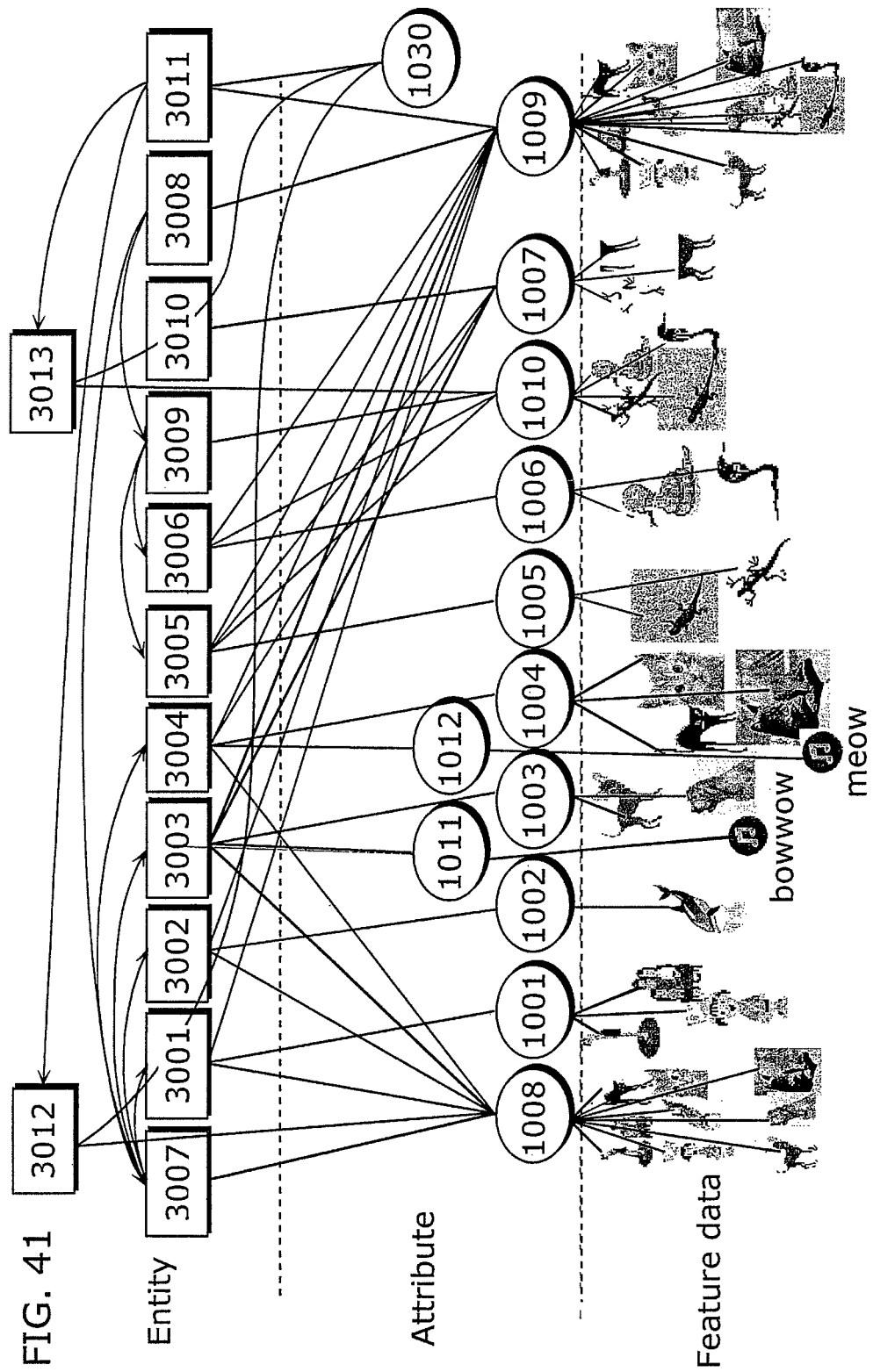
FIG. 41 is a diagram illustrating a knowledge network in a knowledge base.

In FIG. 41, an entity (3011) is connected to an attribute (1030) "knowledge network" and the attribute (1009) "animal", and is an abstract entity which is a knowledge network for "animal". An entity (3012) is connected to the attribute (1030) "knowledge network" and the attribute (1008) "mammal", and is an abstract entity which is a knowledge network for "mammal". An entity (3013) is connected to the attribute (1030) "knowledge network" and the attribute (1010) "reptile", and is an abstract entity which is a knowledge network for "reptile".

Figure 42:
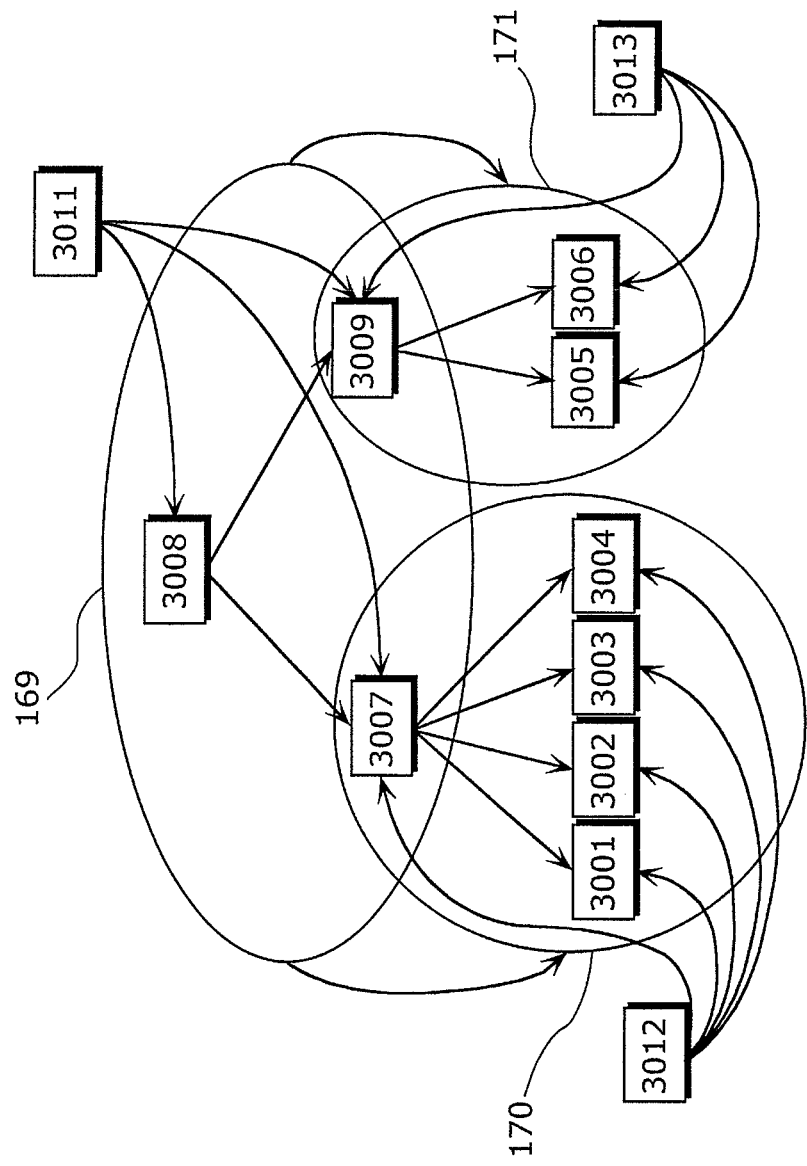
FIG. 42 is a diagram showing an example of a knowledge network.

FIG. 42 is a diagram showing the connections between the entities shown in FIG. 41. FIG. 42 also shows each connection between an entity which is a knowledge network and a concrete entity, such as the connection between the entity (3011) which is a knowledge network for "animal" and the entity (3008) "animal", while such a connection is not shown in FIG. 41 for the sake of simplicity.

A knowledge network is generated by connecting the entity (3008) "animal" and the entity (3007) "mammal" and connecting the entity (3008) "animal" and the entity (3009) "reptile". This knowledge network is the abstract entity (3011) which is the knowledge network for "animal", corresponding to a part enclosed with an ellipse 169 in FIG. 42.

Moreover, a knowledge network is generated by connecting the entity (3007) "mammal" and the entity (3001) "human", connecting the entity (3007) "mammal" and the entity (3002) "dolphin", connecting the entity (3007) "mammal" and the entity (3003) "dog", and connecting the entity (3007) "mammal" and the entity (3004) "cat". This knowledge network is the abstract entity (3012) which is the knowledge network for "mammal", corresponding to a part enclosed with an ellipse 170 in FIG. 42.

Furthermore, a knowledge network is generated by connecting the entity (3009) "reptile" and the entity (3005) "lizard" and connecting the entity (3009) "reptile" and the entity (3006) "snake". This knowledge network is the abstract entity (3013) which is the knowledge network for "reptile", corresponding to a part enclosed with an ellipse 171 in FIG. 42.

As shown in FIG. 41, a knowledge network is further generated by connecting the abstract entity (3011) which is the knowledge network for "animal" and the abstract entity (3012) which is the knowledge network for "mammal" and connecting the abstract entity (3011) which is the knowledge network for "animal" and the abstract entity (3013) which is the knowledge network for "reptile". This knowledge network is not shown in FIG. 42 for the sake of simplicity. Thus, a new knowledge network can be generated by connecting abstract entities which are knowledge networks.

An abstract entity which is a knowledge network is directly connected to each entity included in the knowledge network. For example, the abstract entity (3011) which is a knowledge network is directly connected to each of the entities (3007, 3008, 3009) included in the knowledge network, as shown in FIG. 42. This makes it possible to determine, when an abstract entity which is a knowledge network is designated, which entities are included in the knowledge network.

A knowledge collection is an entity, and also a knowledge network is an entity. As shown in FIGS. 38 and 41, a concrete entity such as a dog or a cat and an abstract entity such as a knowledge collection or a knowledge network have the same data structure. This enables generation of a knowledge network that includes a knowledge collection which is an abstract entity or a knowledge network which is an abstract entity. This equally enables generation of a knowledge collection that includes a knowledge collection which is an abstract entity or a knowledge network which is an abstract entity. According to such a mechanism, abstract knowledge is accumulated and the accumulated abstract knowledge is systematized. The accumulated and systematized abstract knowledge is used for inference.

Inference using a knowledge network is described below, with the knowledge network shown in FIG. 42 being taken as an example.

For example, in the knowledge network (3012) for "mammal", travel can be made from the entity (3001) "human" to the entity (3007) "mammal". The entity (3007) "mammal" belongs to not only the knowledge network (3012) for "mammal" but also the knowledge network (3011) for "animal". This being so, travel is made to the knowledge network (3011) for "animal" which is a knowledge network different from the knowledge network (3012) for "mammal", through the entity (3007) "mammal". In the knowledge network (3011) for "animal", travel is made from the entity (3007) "mammal" to the entity (3008) "animal". Here, there is a possibility of a relationship between the entity (3001) "human" at the start point and the entity (3008) "animal" at the end point. Hence, inference that a human is an animal or a human is classified as an animal can be drawn.

Travel can be made from an entity in one knowledge network to another knowledge network to which the entity also belongs, and then to an entity in the other knowledge network. Travel can also be made via one or more different knowledge networks. Here, there is a possibility of some kind of relationship between the entity at the start point and the entity at the end point. This is because related entities are connected to each other in each knowledge network. If travel can be made from an entity in one knowledge network to another knowledge network and then to a connected entity in the other knowledge network, there is a possibility that the former entity is related to the latter entity.

Note that each connection within one knowledge network has the same meaning. In the case where the meaning of the connection changes, the changed part is included in another knowledge network. By employing the same meaning of the connection within one knowledge network, the knowledge network attains a clear meaning. In addition, by representing the meaning of the connection by an attribute which characterizes the knowledge network, it can be ensured that knowledge networks which differ in the meaning of the connection are characterized by different attribute combinations.

By following a connection in a knowledge network and obtaining a connected entity, a related entity can be detected. Thus, a knowledge network can also be used as a search system for searching for a related entity.

In a conventional knowledge base, words in a language are connected to represent knowledge. Words are connected to form one connection group, thereby representing knowledge. However, it is impossible to represent all knowledge by one connection group of words. Knowledge unable to be included in the connection group of words is called tacit knowledge.

For example, a person who belongs to a company organization has a connection in the company organization. A person also has a family relationship in his/her family. Every entity, and not just limited to a person, has various connections in different dimensions. It is impossible to represent such connections by one connection group. A forced attempt to represent the connections by one connection group induces tacit knowledge which is information or knowledge unable to be included in one connection group.

In the knowledge base according to the embodiment of the present invention, one connection group is generated for each dimension. This one connection group is one knowledge network. In so doing, knowledge can be systematized by connecting knowledge networks with a common entity, thereby enabling a wide range of knowledge to be systematized without using tacit knowledge. Travel is made from an entity belonging to one knowledge network to another knowledge network connected to the knowledge network, and then to an entity in the other knowledge network, with it being possible to check a connection to the entity in the other knowledge network.

The above description is more elaborated below. The following hypothesis is devised as the embodiment of the present invention. This hypothesis is merely a hypothesis as one embodiment, and the present invention is not limited to this. The hypothesis is described below, though partly overlapping with the above description.

Figure 43:
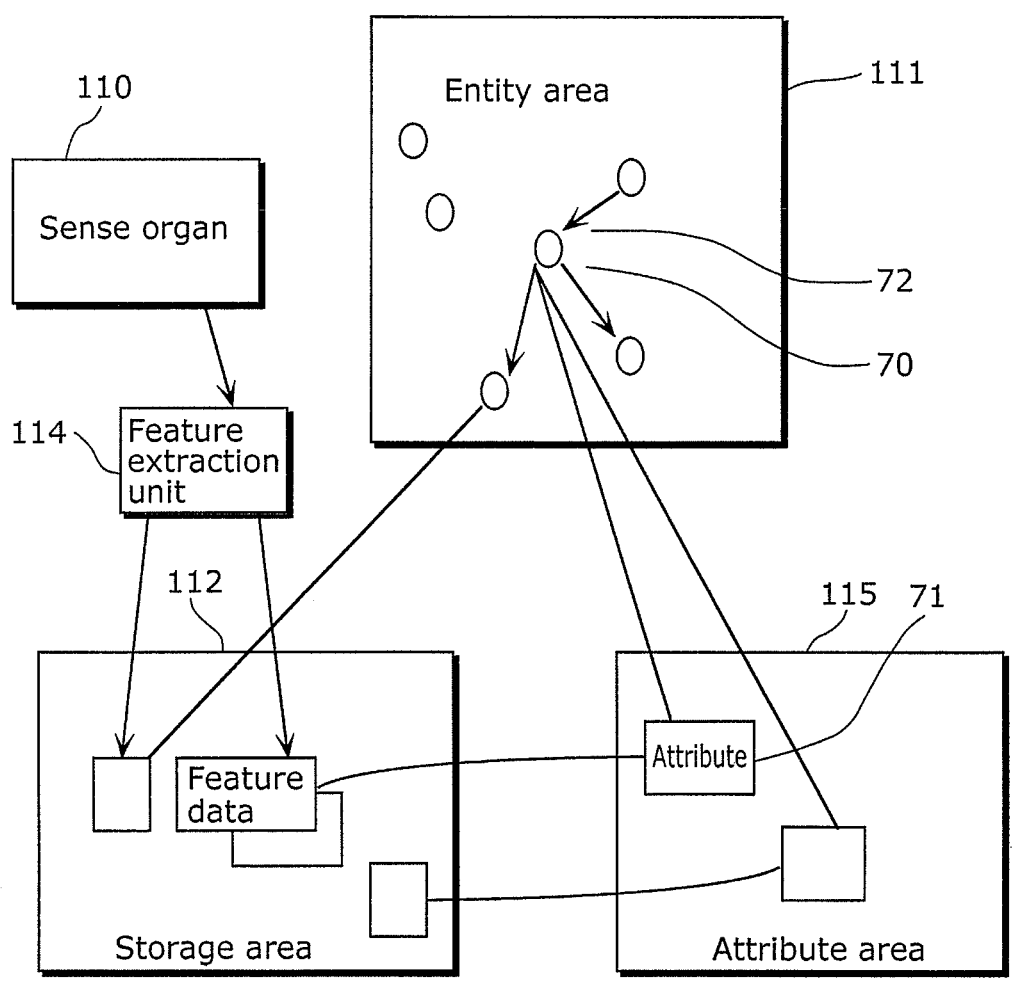
FIG. 43 is a diagram showing a relationship between an entity, an attribute, and feature data.

The brain is composed of a large number of neurons. The neurons are connected to each other by tissues called dendrites and the like, and transmit signals to each other. In the actual brain, one neuron corresponds to an entity. In FIG. 43, information directly generated from an object situated outside is received by a sense organ 110. A feature extraction unit 114 extracts a feature from the information received by the sense organ 110, to generate feature data. The generated feature data is held in a storage area 112. Here, the feature data is connected to one neuron 71 in an attribute area 115 by a dendrite and the like, so that the feature data is associated with the neuron 71 in the attribute area 115. A plurality of pieces of feature data may be connected to and associated with the same neuron 71 in the attribute area 115. The neuron 71 in the attribute area 115 represents an attribute, as a result of being associated with the feature data. The neuron 71 representing the attribute is connected to a neuron 70 in an entity area 111 by a dendrite and the like, so that the attribute is associated with an entity. Thus, the entity has the attribute.

For example, upon receiving information of sweetness from the sense organ 110, the feature extraction unit 114 extracts a feature from the information of sweetness, and the extracted feature is held in the storage area 112 as feature data. The feature data is connected to the neuron 71 in the attribute area 115, as a result of which the neuron represents an attribute "sweet". The neuron 71 which represents the attribute "sweet" as a result of being directly connected to the feature data of sweetness is directly associated with an entity and connected to the neuron 70 representing the entity. This accomplishes learning that "the entity is sweet" or "the entity has the attribute "sweet"".

In the case where an attribute is situated between feature data and an entity, one piece of feature data can be connected to a plurality of different attributes. Moreover, a plurality of pieces of feature data can be connected to one attribute to create one meaning or concept. Hence, it is possible to create one meaning or concept from a plurality of pieces of feature data, or create a plurality of meanings or concepts from one piece of feature data.

There is a case where feature data is connected to and associated with the neuron 70 in the entity area 111, without through the neuron 71 in the attribute area 115. In such a case, a signal reaches the neuron 70 in the entity area 111 faster than in the case where the feature data is connected through the neuron 71 in the attribute area 115. Suppose feature data extracted by the feature extraction unit 114 from information received from the sense organ 110 is determined to be the same as or similar to feature data already held in the storage area 112. In the case where this feature data is directly connected to the neuron 70 in the entity area 111, a signal reaches the neuron 70 in the entity area 111 connected with the feature data beforehand. At this point, an entity is recognized. For example, a mechanism of immediately recognizing fire upon looking at an image of a red flame corresponds to this mechanism.

Suppose feature data that it is cold to touch ice is held and connected to a neuron 71 in the attribute area 115, as a result of which a concept "cold", i.e. an attribute "cold", is generated. When one neuron 70, i.e. an entity, in the entity area 111 is only connected to this attribute "cold", the entity is an abstract entity representing coldness or a vague idea of a cold entity.

For example, suppose a red round entity, when eaten, tastes sweet and is edible. This being the case, one neuron 70 in the entity area 111 corresponds to the red round entity, and a neuron 71 as an attribute in the attribute area 115 connected to feature data of an image of the red round entity and a neuron 71 in the attribute area 115 connected to feature data of sweetness of the red round entity are connected to this neuron of the red round entity. Likewise, feature data of being edible is connected to a neuron 71 in the attribute area 115 which is connected to the neuron 70 of the red round entity in the entity area 111.

The neuron 71 in the attribute area 115 connected to the feature data of being edible transmits a signal to the neuron 70 in the entity area 111. That is, a signal is transmitted from the neuron 71 "edible" in the attribute area 115 to the neuron 70 in the entity area 111. As a result, only the neuron 70 in the entity area 111 connected to the neuron 71 "edible" in the attribute area 115 is activated upon receiving the signal. The activated neuron 70 in the entity area 111 as a whole becomes a collection of entities having the attribute "edible". This collection is a knowledge collection. A knowledge collection can also be generated by transmitting a signal from each of one or more neurons 71 in the attribute area 115. A neuron 70 in the entity area 111 represents an entity. Neurons in a knowledge collection represent entities having a common attribute. By connecting neurons in one knowledge collection, a relationship between entities can be held. A collection of such connected entities is a knowledge network. It is also possible to connect an entity not included in the knowledge collection. Besides, entities may be connected to form a knowledge network, irrespective of a knowledge collection.

This function is called learning. Learning includes adding or deleting an entity, an attribute, or feature data. Learning also includes adding or deleting a connection. Learning includes not only adding a connection between entities but also deleting a connection between entities, newly associating an entity with a neuron and adding it to a knowledge network, and adding or deleting a connection between an entity and an attribute, between an attribute and feature data, or between feature data and an entity.

When one licks sugar, two types of information, namely, information of sweetness and a degree of sweetness, are received from the sense organ 110. The feature extraction unit 114 extracts these two types of information as features. The extracted two features are held in the storage area 112 as a combination of feature data. In the case where the same feature data already exists in the storage area 112, the feature data may not be newly held in the storage area 112. In the case where the same feature data does not exist, one unused neuron in the attribute area 115 is connected to the feature data, thereby becoming a neuron corresponding to the feature data. In the case where the same feature data exists but is not connected to any neuron in the attribute area 115, too, one neuron in the attribute area 115 is connected to the feature data to become a neuron corresponding to the feature data.

The feature data of sweetness is connected to one neuron in the attribute area 115, and the feature data of the degree of sweetness is connected to another neuron in the attribute area 115. An attribute representing the degree of sweetness can be connected to another attribute, as an attribute representing the degree. There is a supplementary attribute representing a degree of an attribute, such as a strength of a taste or a level. The supplementary attribute is connected to another attribute, to modify a meaning or a concept of the attribute. Understanding may be facilitated by regarding the supplementary attribute as corresponding to an adjective or an adverb. When two signals are transmitted from the above-mentioned two pieces of feature data, the two neurons in the attribute area 115 receive the signals and connect to each other. A neuron associated with an entity from which the information is emitted receives the signals, too. Upon receiving the signals, the two neurons in the attribute area 115 are each connected to the neuron corresponding to the entity from which the information is emitted. The entity, the attribute, and the supplementary attribute are all connected together in a triangle. Designating two of the three elements definitely determines one remaining element. For example, by designating the entity and the attribute, only one supplementary attribute connected to the entity and the attribute is determined. This allows the supplementary attribute relating to the attribute to be obtained when necessary. In addition, the source information of the supplementary attribute can be obtained by obtaining the feature data connected to the attribute, as a result of which more detailed information can be attained. The supplementary attribute is an attribute, too, and is simply connected to the feature data and the neuron in the attribute area 115. One supplementary attribute can be connected to various attributes to modify a meaning or a concept of each connected attribute.

The feature data of sweetness is referred to as a primary feature, and the feature data of the degree of sweetness as a secondary feature. An attribute corresponding to the primary feature is referred to as a primary attribute, and an attribute corresponding to the secondary feature as a secondary attribute. The above-mentioned supplementary attribute is the secondary attribute.

Upon receiving the information from the sense organ 110, the feature extraction unit 114 extracts the primary feature and, when necessary, the secondary feature. The extracted primary feature and secondary feature are held in the storage area 112 as feature data.

The feature data of the primary feature which is sweetness is connected to the neuron representing the primary attribute "sweetness", and the feature data of the secondary feature which is the degree of sweetness is connected to the neuron representing the secondary attribute corresponding to the secondary feature which is the degree of sweetness. The neuron representing the primary attribute "sweetness" is connected to the neuron representing the secondary attribute corresponding to the degree of sweetness. The secondary attribute may be connected to a primary attribute other than the primary attribute "sweetness", to modify the primary attribute. An attribute that is modified by another attribute is a primary attribute, whereas an attribute that modifies another attribute is a secondary attribute.

An attribute may be composed of only one primary attribute, or may be composed of one primary attribute and one or more secondary attributes. The latter corresponds to the case of modifying by an adjective or an adverb. The feature data of sweetness transmits a signal to the neuron representing the attribute "sweetness". The feature data of the degree of sweetness transmits a signal to the neuron representing the attribute corresponding to the degree of sweetness. The degree of sweetness can be understood by assuming a situation where a sugar aqueous solution is tasted. A higher sugar concentration causes a higher degree of sweetness, whereas a lower sugar concentration causes a lower degree of sweetness. The neuron representing the attribute corresponding to sweetness according to signal reception and the neuron representing the attribute corresponding to the degree of sweetness according to signal reception are connected to each other by a dendrite and the like. This enables the entity to have the attribute and the degree of the attribute, i.e. the primary attribute and the secondary attribute.

For example, taste information is received from gustatory nerves, and feature data is generated by arranging information indicating a strength of each type of taste in a predetermined order such as sweetness, bitterness, sourness, . . . . The feature data is connected to a specific neuron in the attribute area 115 in the order in which the taste feature data is arranged. As a result, the specific neuron in the attribute area 115 represents a specific taste. Feature data of an individual taste of an entity, such as sweetness or sourness, can also be generated. An attribute representing an individual taste is able to be shared by all entities. In addition, by connecting one piece of feature data representing a whole arrangement pattern of the taste feature data in the predetermined order to one attribute, an attribute of a whole taste of the entity can be attained.

Thus, an entity has a new attribute, as a result of which new knowledge is learned. In this Description, a neuron associated with an attribute is referred to as an attribute neuron, and a neuron associated with an entity as an entity neuron. Moreover, a neuron associated with a primary attribute is referred to as a primary attribute neuron, and a neuron associated with a secondary attribute as a secondary attribute neuron.

The following describes a procedure of recognizing an entity.

Upon receiving information from the sense organ 110 which is an information input unit for inputting information, the feature extraction unit 114 extracts a feature from the received information, and compares the extracted feature with feature data already held in the storage area 112. The number of extracted features is typically more than one, though the number may also be one. As an example, when information of a sound is inputted from the sense organ 110, the feature extraction unit 114 extracts a plurality of features such as a pitch of the sound, loudness of the sound, a frequency distribution, and a waveform of the sound. When feature data which is the same as or similar to the extracted feature exists, a signal is transmitted from the feature data to an attribute connected to the feature data. This process is performed for each newly generated feature.

Though there is a situation where a signal is transmitted from only one piece of feature data, this is not a limit for the present invention, and a signal is often transmitted from each of a plurality of pieces of feature data. From at least one attribute receiving the signal, a signal is transmitted to each entity connected to the attribute. One of entities receiving the signal is recognized as an entity that provides the information to the sense organ 110. Typically, an entity receiving a largest number of signals is recognized as the entity that provides the information to the sense organ 110.

Here, an entity does not necessarily receive a signal of the same strength from each attribute. Connections may be made so that a signal from one attribute has a higher strength than a signal from another attribute. This being so, there is not only a case where an entity receiving signals from a large number of attributes is simply recognized as the entity that provides the information to the sense organ 110, but also a case where an entity receiving a large amount of signal in total is recognized as the entity that provides the information to the sense organ 110. This is a procedure of recognition.

A collection of entities having the same attribute is a knowledge collection. A connection between entities represents relatedness between entities. The connected entities in the knowledge collection form a knowledge network. The relatedness differs in meaning depending on the knowledge network. For example, a relationship between entities can represent any of various relationships such as a parent-child relationship, a chronological relationship, and an inclusion relationship. A knowledge network may be generated by connecting, to a knowledge network in a knowledge collection, an entity other than the knowledge collection. A knowledge network may also be generated by connecting entities selected from all entities, irrespective of which knowledge collections the entities belong to.

A knowledge network is also an abstract entity. Therefore, a knowledge collection or a knowledge network that includes a knowledge network as an abstract entity can be generated.

The following describes an example of a method of generating a knowledge collection and a knowledge network.

A neuron 70 associated with an entity in the entity area 111 is also referred to as an entity, and a neuron 71 in the attribute area 115 is also referred to as an attribute. All entities are included in the entity area 111. In such a state, it is difficult to select a specific entity from the entity area 111. However, entities can be selected in the following manner. A signal is transmitted from an attribute to each entity connected to the attribute. The entity is activated upon receiving the signal from the attribute. The activated entity is an entity having the attribute. Thus, a collection of entities having the attribute can be generated. This collection of entities is called a knowledge collection. The number of attributes transmitting the signal is not limited to one, and may be more than one.

For example, a knowledge collection having an attribute "Suzuki family" can be generated as follows. When a signal is transmitted from the attribute "Suzuki family", entities corresponding to a father, a mother, and a child having the attribute "Suzuki family" receive the signal and is activated. Collecting the activated entities leads to generation of a knowledge collection having the attribute "Suzuki family".

Figure 44:
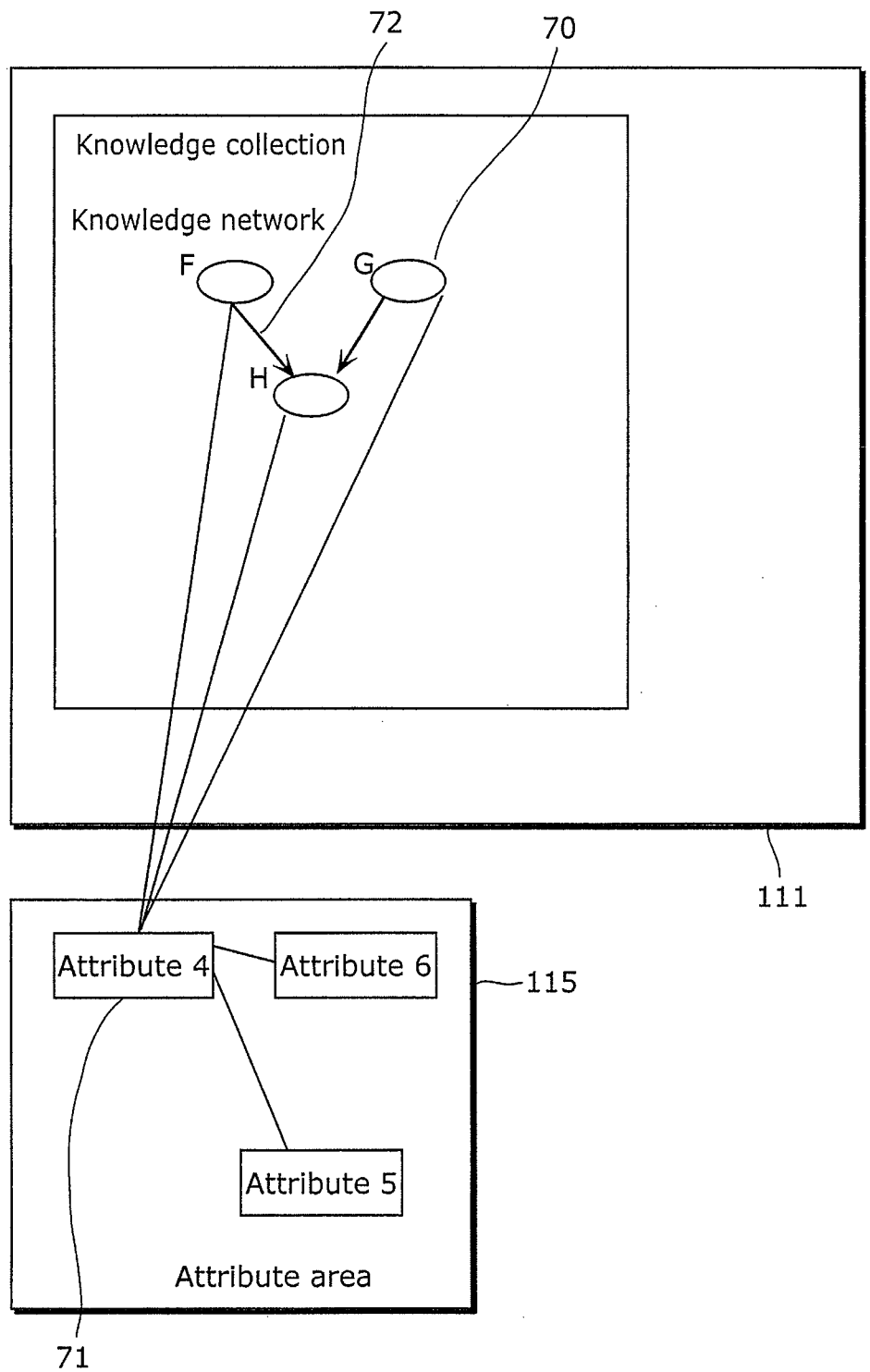
FIG. 44 is a diagram showing an example of a knowledge network.

The entity corresponding to the father in the Suzuki family is connected to the entity corresponding to the child in the Suzuki family, and also the entity corresponding to the other in the Suzuki family is connected to the entity corresponding to the child in the Suzuki family. These connections represent a parent-child relationship. The parent-child relationship is clarified by following the connections. FIG. 44 shows this example.

An attribute (4) is the attribute "Suzuki family". An entity (F) represents the father in the Suzuki family, an entity (G) represents the mother in the Suzuki family, and an entity (H) represents the child in the Suzuki family. The entity (F) as the father in the Suzuki family is connected to the entity (H) as the child in the Suzuki family, and the entity (F) as the mother in the Suzuki family is connected to the entity (H) as the child in the Suzuki family. These connections can make the relationship between the entities clearer. In FIG. 44, the connections are indicated by arrows.

Though such a connection may be bidirectional, many relationships are likely to have a direction. That is, a connection is typically a unidirectional connection, i.e. a connection having a direction. Suppose two entities are unidirectionally connected. In the case where this unidirectional connection corresponds to an inclusion relationship, for example, an entity at a start point of the connection is an including entity (higher-level concept) whilst an entity at an end point of the connection is an included entity (lower-level concept), and vice versa.

A meaning of a relationship represented by a connection tends to depend on an attribute used for generating an information network. It is possible to hold, for each knowledge network, a connection according to the knowledge network. Knowledge networks that include the same entities but differ in connection may be generated. Examples of various knowledge networks that include the same family as entities are a knowledge network connected in a relationship by height, a knowledge network connected in a relationship by age, a knowledge network connected in a parent-child relationship, and so on. For example, a knowledge network connected in a relationship by height is characterized not only by an attribute ". . . family" but also by an attribute "height".

A knowledge network may also represent a relationship of a composition, such as "water is composed of hydrogen and oxygen". A knowledge network may also represent an inclusion relationship such as "a human is classified as a mammal". Suppose an entity A is only connected to an entity B to represent an inclusion relationship. As an example, the entity A is a mammal, and the entity B is a human. The entity A has an attribute common to mammals and an attribute "mammal", while the entity B as its lower-level concept has an attribute common to humans only, the attribute "mammal" as the higher-level concept, and an attribute "human" which is a concept of the entity B itself. This makes it unnecessary for the entity representing the lower-level concept to have the attribute of the higher-level concept. The attribute of the entity representing the higher-level concept and the attribute of the entity B representing the lower-level concept are attributes of the entity representing the lower-level concept. In so doing, entity-to-attribute connections can be reduced, as it is sufficient to obtain the attribute of the entity representing the higher-level concept when necessary.

When two entities are unidirectionally connected, the connected two entities can be distinguished from each other. For example, it is possible to associate one of the two entities with an abstract entity representing a higher-level concept, and the other entity with an abstract entity representing a lower-level concept. A unidirectional connection may also be associated with a blood relationship. These are merely examples, and other various relationships can be represented by unidirectional entity-to-entity connections.

The following describes an example of a method of using a knowledge collection and a knowledge network.

Once a knowledge collection or a knowledge network is generated, it is possible to check whether or not information inputted from outside matches knowledge in the knowledge collection or the knowledge network. For example, suppose one entity and several attributes are inputted from outside. A knowledge collection having all of the inputted attributes is generated. In the case where a given entity is included in the knowledge collection, the entity is determined as having the inputted attributes. Moreover, whether or not given two entities have a relationship can be determined in the following manner. In the case where travel can be made from one entity to the other entity by following a connection in a knowledge network, the two entities can be determined as having a relationship. The relationship between the given two entities can be detected in such a manner.

Suppose an entity "father in the Suzuki family", an entity "Hanako", and an attribute "Suzuki family" are given. When the knowledge collection shown in FIG. 44 represents the Suzuki family, the knowledge collection representing the Suzuki family can be used to determine whether or not the entity "Hanako" is the Suzuki family. In the case where the entity "Hanako" is not included in the knowledge collection representing the Suzuki family, determination is made that Hanako is not in the Suzuki family.

A specific procedure is as follows. A signal is transmitted from the attribute "Suzuki family" to an entity. All entities receiving the signal have the attribute "Suzuki family". These entities receiving the signal form the knowledge collection having the attribute "Suzuki family". In the case where the entity "Hanako" is included in the knowledge collection, Hanako is determined as being included in the Suzuki family. In the case where the entity "Hanako" is not included in the knowledge collection, Hanako is determined as not being included in the Suzuki family.

Suppose Hanako is a daughter of Jiro who is a child in the Yuzo Suzuki family. A knowledge network representing the Yuzo Suzuki family is shown in a left box in FIG. 45. A knowledge network representing the Jiro Suzuki family is shown in a right box in FIG. 45. An entity "Jiro" belongs to these two knowledge networks.

Though not shown, entities such as "Yuzo", "Megumi", "Ichiro", and "Jiro" in the Yuzo Suzuki family are connected to an attribute "Yuzo Suzuki family". Besides, though not shown, entities such as "Jiro", "Mika", "Taro", and "Hanako" in the Jiro Suzuki family are connected to an attribute "Jiro Suzuki family". The two knowledge networks share the entity "Jiro".

Figure 45:
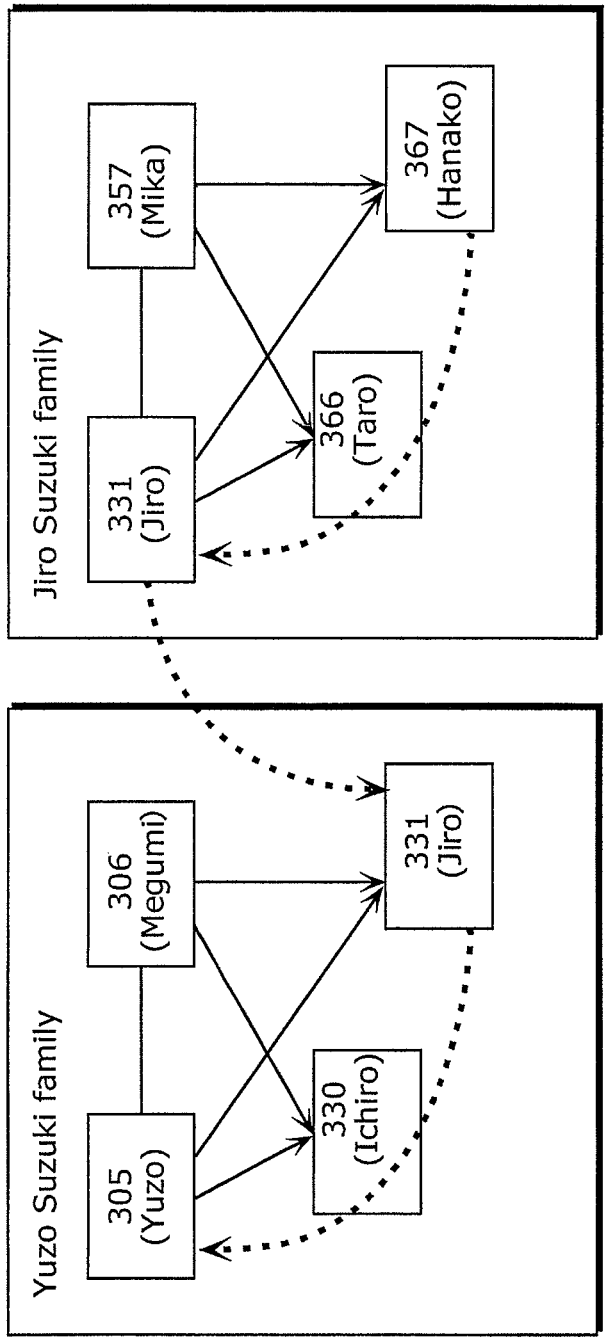
FIG. 45 is a diagram showing an example of a knowledge network.

For example, the attribute "Yuzo Suzuki family" is connected to feature data generated from an image of the four members Yuzo, Megumi, Ichiro, and Jiro together. The entity "Yuzo" is, for example, connected to an attribute connected to feature data generated from an image of Yuzo. Though the word of the name "Yuzo" is shown in FIG. 45, the word is merely shown for ease of explanation.

Travel is made from the entity "Hanako" in the knowledge network "Jiro Suzuki family" to the entity "Jiro" in the same knowledge network. The entity "Jiro" also belongs to the knowledge network "Yuzo Suzuki family". This being so, travel is made from the knowledge network "Jiro Suzuki family" to the knowledge network "Yuzo Suzuki family" through the entity "Jiro". Travel is then made from "Jiro" to "Yuzo" in the knowledge network "Yuzo Suzuki family". Since travel can be made from the entity "Hanako" to the entity "Yuzo" in another knowledge network, there is a possibility of some kind of relationship between the entity "Hanako" and the entity "Yuzo". Actually, Yuzo is Hanako's grandfather. Thus, inference can be performed using not only one knowledge network but also connected knowledge networks.

In the case where, for designated two entities, a path of travel from one entity to the other entity can be found by following a connection to the other entity in one knowledge network or in another connected knowledge network, there is a possibility of some kind of relationship between the designated two entities. The path followed here represents the relationship between the two entities. Once the path is found between the two entities, a knowledge collection including the connected entities may be newly generated. Moreover, the two entities may be directly connected to each other.

The use of a knowledge collection is effective for detecting a relationship between entities. Knowledge collections having a common entity have a possibility of relatedness. Besides, the use of a knowledge network is effective for detecting a possibility of a relationship between entities. When a path is found between two entities, attributes of the two entities are compared with each other, to check whether or not the two entities have the same or similar attribute. In the case where the two entities have the same attribute, the two entities are determined as being related to each other with regard to the attribute. In the case where the two entities have the similar attribute, the two entities are determined as having a high possibility of being related to each other. Thus, inference can be performed without identification data generated from a word, according to the embodiment.

An entity that can be reached by traveling from a designated entity as a start point is detected. An attribute of the detected entity and is compared with an attribute of the designated entity at the start point, to check whether or not the two entities have a common or similar attribute. In the case where the two entities have the common attribute, it can be determined that the two entities are related to each other by the common attribute. In the case where the two entities have the similar attribute, it can be determined that there is a possibility that the two entities are related to each other by the similar attribute. Note here that a large number of common or similar attributes does not necessarily indicate significant relatedness. There is also an instance where only one common attribute or only one similar attribute has a significant meaning, and a newly found entity-to-entity connection represents a significant relationship.

As mentioned earlier, determination can be made using a single knowledge collection or a single knowledge network, and also determination can be made using a plurality of knowledge collections or a plurality of knowledge networks. It is possible to travel from an entity in one knowledge network to another selected knowledge network to which the entity belongs. Repeating this enables travel to another knowledge network via one or more knowledge networks. There is a possibility of some kind of relatedness between the entity in the knowledge network at the start point and an entity in the knowledge network to which the travel is made. A degree of the possibility depends on to what extent the knowledge networks are appropriately generated.

One entity is one knowledge. A collection of entities having a common attribute is a knowledge collection. A signal is transmitted from an attribute neuron to an entity neuron in the entity area. All entity neurons receiving the transmitted signal are entities constituting a knowledge collection for the attribute. An entity associated with an attribute is knowledge. In this Description, an attribute neuron is also referred to as an attribute, and an entity neuron as an entity, for simplicity's sake.

An attribute is designated, and a knowledge collection for the attribute is generated. Another attribute is further designated in the generated knowledge collection, and a new knowledge collection is generated by collecting entities having the other attribute. Repeating this enables a knowledge collection to be generated by designating a plurality of attributes.

There is a case where entities in a knowledge collection are connected to each other. A collection of these connected entities is a knowledge network. This connection can have a meaning. For example, an entity-to-entity connection can represent a relationship between entities, including an inclusion relationship such as "a human is a mammal", a blood relationship such as "Yuzo is Jiro's father", a position relationship, a chronological relationship, and so on.

FIG. 16 shows an example of generating a knowledge collection relating to an attribute. An entity A belongs to both a knowledge collection generated using an attribute 1 and a knowledge collection generated using an attribute 2. In this way, a knowledge collection is generated for each of various attributes of an entity, allowing knowledge to be organized and put to use. Learning includes generating an entity or an attribute and connecting between entities, between attributes, or between an entity and an attribute. Learning also includes generating feature data and connecting between feature data and an entity or between feature data and an attribute. Learning also includes generating identification data and connecting between identification data and an entity or between identification data and an attribute. Learning further includes deleting a connection of an entity, an attribute, feature data, and identification data.

After learning is performed, upon input of the same information from a sense organ, the feature extraction unit 1020 extracts a feature from the inputted information. In the case where feature data of the same feature exists in the storage area and the feature data is connected to an entity via an attribute in the attribute area, a signal is transmitted from the feature data to the entity. In the case where feature data similar to the extracted feature exists in the storage area, too, a signal is equally transmitted, and the entity receives the signal. Upon receiving the signal, the entity is activated. This is a method of recognizing the entity. A signal is transmitted from a plurality of pieces of feature data and reaches entities via attributes. An entity receiving a strongest signal is a prime candidate among the entities.

For example, the feature extraction unit in FIG. 5 extracts a feature from a sound received from an ear which is a sense organ. Though not shown in FIG. 5, a data comparison unit in the brain corresponding to the data comparison unit 1030 compares the extracted feature with feature data held in the storage area. The data comparison unit in the brain then transmits a signal to an attribute associated with matching or similar feature data, and the attribute receiving the signal transmits the signal to an entity. As a result, the entity is recognized from the sound heard with the ear.

Conventionally, a logic operation needs to be performed for each individual attribute. In a conventional programming language such as PROLOG, an entity, an attribute, and a relationship are each represented by a letter string as a language, that is, a word having a meaning of the entity, the attribute, or the relationship. Using one word sequence as a basic unit of knowledge, knowledge is constructed by holding a plurality of word sequences. Relatedness between word sequences is not directly represented in such a conventional technique. It is also difficult to represent knowledge called tacit knowledge complicatedly related in a wide range. Therefore, the conventional technique has a difficulty in performing simple determination made by humans every day.

The use of a knowledge collection according to the embodiment eases determination of whether or not a given entity satisfies a certain condition. An attribute identifier of at least one given attribute is designated to generate a knowledge collection. The designated attribute is a condition for an entity to be included in the knowledge collection. The knowledge collection is then searched to check whether or not the given entity is included in the knowledge collection. In the case where the given entity is included, the given entity is determined as satisfying the condition.

The use of a knowledge network according to the embodiment enables inference to be performed.

For example, a knowledge collection of various diseases as entities is held beforehand. The entities in this knowledge collection have an attribute "disease". The attribute "disease" is connected to feature data generated from an image of a sick person in bed, and feature data of various symptoms of diseases. The attribute. "disease" is also connected to an abstract entity "disease".

For example, when an image of a face of a pale-faced person is inputted to the knowledge base system, feature data of the image is generated, and the knowledge base is searched to check whether or not the same feature data exists. In the case where the same feature data exists, the attribute "disease" connected to the feature data of the pale face is obtained. Following this, the abstract entity "disease" connected to the attribute "disease" is obtained, as a result of which the entity "disease" is recognized.

When information of a symptom determined as matching a symptom held in the knowledge base as feature data is inputted, the abstract entity "disease" can be obtained. This enables rough determination that the person has a disease.

More detailed determination on the type of disease is made in the following manner.

The knowledge collection includes individual diseases such as common cold and pneumonia, as entities. The entities which are the individual diseases such as common cold and tuberculosis each have a disease name and a symptom as attributes. An attribute "disease name of common cold" is connected to identification data generated from an image of letters "common cold", or identification data generated from a speech sound of a word "common cold". In the knowledge base, however, the identification data representing the disease name does not have a meaning or a concept of the disease. An entity "common cold" has, for example, an attribute "swollen tonsil". The attribute "swollen tonsil" is connected to feature data of an image of a swollen tonsil. By connecting feature data to an attribute in such a way, a concept or a meaning is created. Various feature data generated from many types of tonsil images may be connected to one attribute such as "swollen tonsil". Connecting more types of feature data to one attribute contributes to more appropriate determination.

For example, an image of a swollen tonsil is inputted to the knowledge base system from outside, and a feature is extracted from the image to generate feature data. The knowledge base is searched for the same feature data as the generated feature data. When the same feature data is found, an attribute connected to the feature data is obtained.

Information of various symptoms is inputted to the knowledge base system from outside, and the same process is repeated to obtain attributes connected to the same feature data. An entity connected to a larger number of such obtained attributes or an entity connected to all obtained attributes has a high possibility of being a disease having the symptoms. A diagnostic education system or a diagnostic support system can be provided by displaying, on the display device, entities which are diseases connected to the obtained attributes.

A knowledge network can be generated in this knowledge collection. That is, a knowledge network in which various diseases are systematically connected from the entity "disease" as a start point can be generated. It is also possible to generate a knowledge network by connecting related diseases. For example, the entity "common cold" and an entity "pneumonia" are connected in one knowledge network. Relatedness between the two diseases, that is, a common cold turning into pneumonia, is represented by a unidirectional connection. Through the use of such a knowledge network, related disease names can be displayed for diagnostic support. As an example, a doctor can be advised to check if a patient showing the symptoms of the common cold has a sign of pneumonia.

A mechanism that imitates intuitions can be provided as well.

In the case where, for designated two entities, a path of travel from one entity to the other entity via one or more information networks is found, it can be determined that there is a possibility of some kind of relationship between the designated two entities. This process corresponds to intuitive determination casually made by humans. After this, an attribute is closely checked based on the degree of commonality, the degree of non-commonality, the degree of similarity, and the like, to make detailed determination on relatedness. Comparison of feature data connected to the attribute may also be performed to make more detailed evaluation. The conventional technique based on symbolic logic is capable of detailed logic evaluation in a narrow range, so that the method based on symbolic loci can be effectively utilized at this stage.

The present invention can be used for building a determination operation support system or a determination operation education support system for an operation of making some kind of determination.

There is a technology of speech recognition. The present invention is also applicable to such speech recognition. A feature is extracted from a speech sound, the extracted feature is held as identification data, and the identification data is associated with an entity or an attribute beforehand. The entity, the attribute, and the identification data are connected in the above-mentioned three-level structure. This makes it possible to obtain, based on an inputted speech sound, not only identification data of a word represented by the speech sound but also a concept, a meaning, or an entity corresponding to the speech sound. A feature is extracted from an inputted speech sound to generate identification data. An entity or an entity connected to identification data matching or similar to the generated identification data is then obtained and recognized. Another attribute connected to the recognized entity may also be obtained to thereby obtain feature data or identification data connected to the attribute. The present invention is not limited to such a speech recognition system, but is also applicable to an image recognition system of extracting a feature from an image. The present invention is equally applicable to a facility monitoring system by extracting a feature using a sensor such as a temperature sensor or a pressure sensor. Moreover, the present invention may also be applied to information written in letters.

Besides, a figure can be represented using a knowledge network. By connecting entities which are figurative elements such as a point, a line, a plane, a solid, and the like, a figure can be dealt with using a knowledge network.

Figure 46:
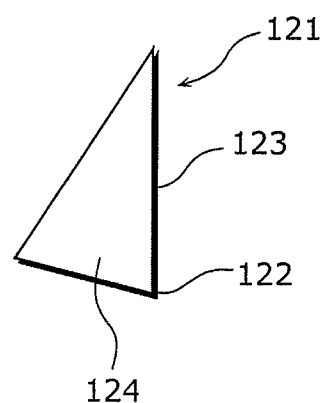
FIG. 46 is a diagram showing a triangle.

FIG. 46 shows a triangle 121 as an example of a figure. Figures other than the triangle are also applicable. Moreover, the figure is not limited to a plane figure, but may be a solid figure. The triangle 121 is composed of three lines (straight lines) 123, three points (vertices) 122 at which the three lines 123 intersect with each other, and a plane 124 enclosed with the three lines 123. Curved lines may be used instead of the lines 123 to form a figure. In addition, the plane 124 is not limited to a flat plane, but may be a curved plane. The lines 123, the points 122, and the plane 124 are set as entities, to generate a knowledge network composed of the lines 123, the points 122, or the plane 124.

Figure 47:
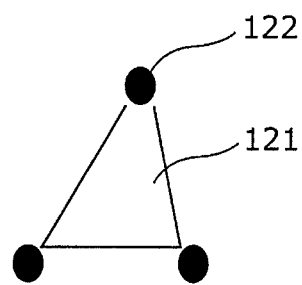
FIG. 47 is a diagram showing a knowledge network representing the triangle by three points.

FIG. 47 shows a knowledge network representing the figure of the triangle 121 by the three points 122. Each point 122 is an entity, and so is capable of having an attribute. For example, the point 122 has a coordinate value or the like as an attribute.

Figure 48:
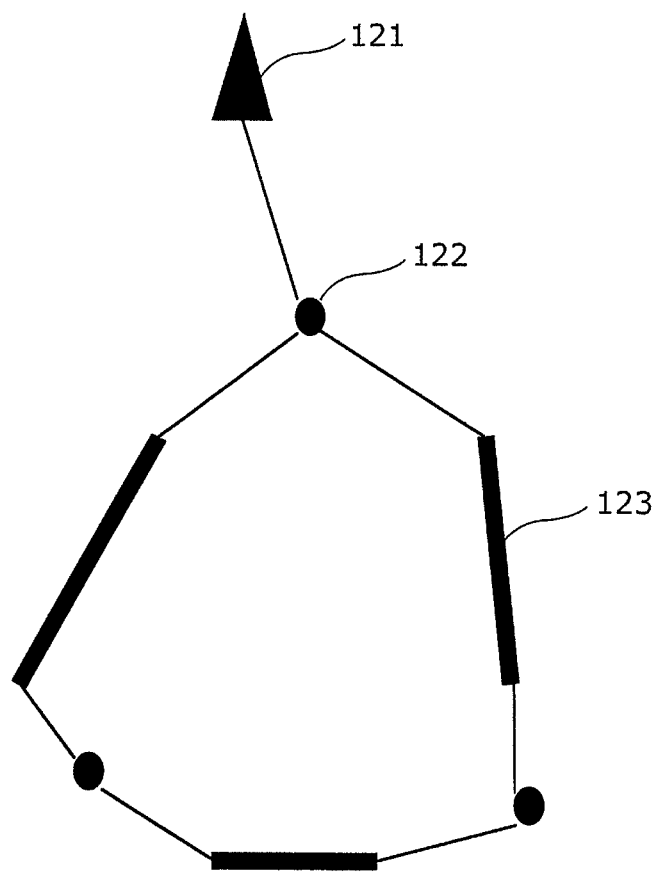
FIG. 48 is a diagram showing a knowledge network representing the triangle by three points and three lines.

FIG. 48 shows a knowledge network representing the plane figure of the triangle 121 by the points 122 and the lines 123. The figure is represented by the knowledge network in which the points 122 and the lines 123 are alternately connected. In this example, each point 122 has a coordinate position or an internal angle as an attribute, and each line 123 has a line length as an attribute, though the attributes are not limited to the coordinate position, the length, and the like.

Figure 49:
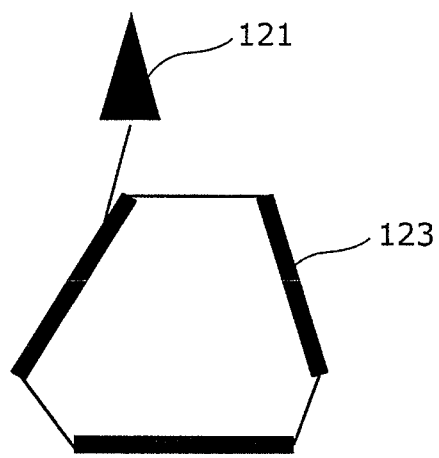
FIG. 49 is a diagram showing a knowledge network representing the triangle by three lines.

FIG. 49 shows a knowledge network that connects the plane figure of the triangle 121 with the line 123 which is an element of the figure. The plane may be connected with all figurative elements or one or more figurative elements. An entity such as a point may also be included.

Examples of an attribute of the plane include an area, a feature that two sides are equal in length, and a name "isosceles triangle". When an entity which is a figurative element is connected to feature data generated from an image, a meaning or a concept of the entity is created. The attribute representing the feature that two sides are equal in length is connected to feature data generated from an image of an isosceles triangle. The attribute representing the name "isosceles triangle" is connected to identification data generated from an image of letters of a word "isosceles triangle" or identification data generated from a speech sound of the word "isosceles triangle". An attribute representing only identification data generated from the word "isosceles triangle" is not connected to feature data representing a meaning or a concept of an isosceles triangle. In this example, an attribute merely used for identification without having a meaning and an attribute representing a concept or a meaning of an entity are clearly separated from each other.

Figure 50:
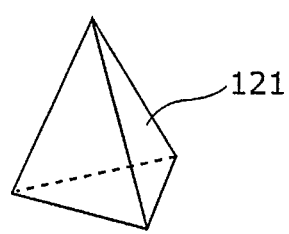
FIG. 50 is a diagram showing a triangular pyramid.
Figure 51:
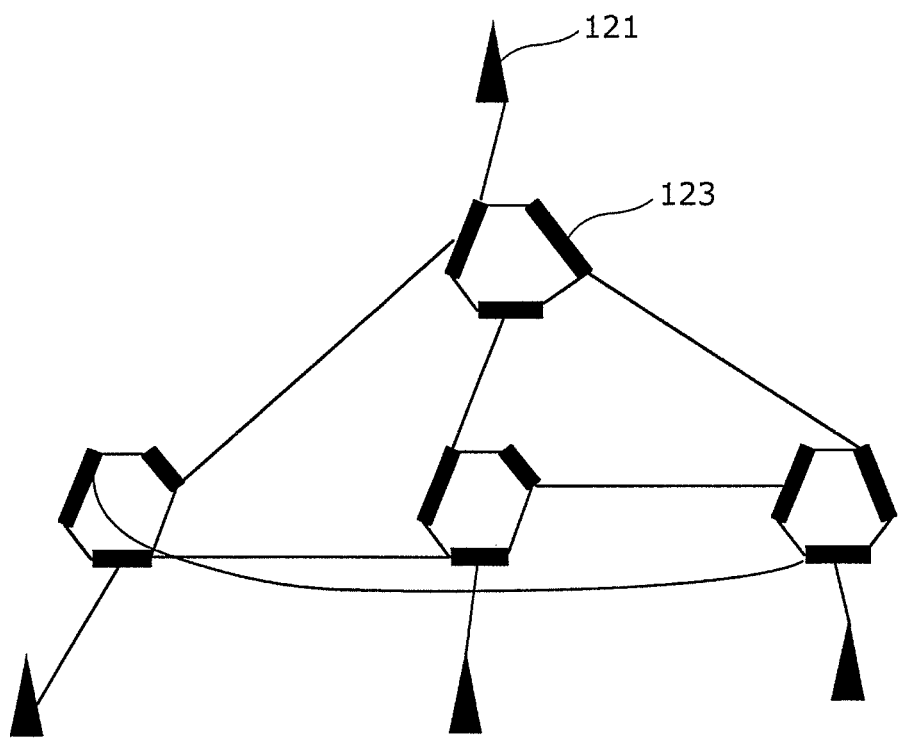
FIG. 51 is a diagram showing a knowledge network representing the triangular pyramid.

The number of pieces of feature data connected to one attribute is not limited to one. FIG. 50 shows a solid figure of a triangular pyramid composed of four triangles (planes) 121. FIG. 51 shows an instance where a solid is represented by a knowledge network, using a triangular pyramid as an example. The triangle (plane) 121 which is an element of the solid is connected to a figurative element of the plane. In addition, for the lines (sides) 123 shared by the planes, the lines representing the sides are connected. This makes it possible to represent how the planes constituting the solid touch each other. Instead of connecting common elements such as points or lines, the same point or line may be used for a plurality of planes, with respect to common elements such as points or lines. Various representations are possible as in the case of a developed view of a solid.

Figure 52:
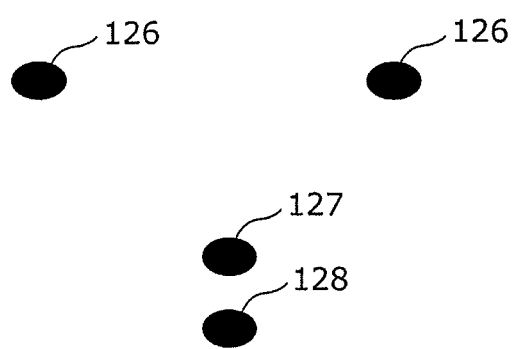
FIG. 52 is a diagram schematically showing eyes, a nose, and a mouth.
Figure 53:
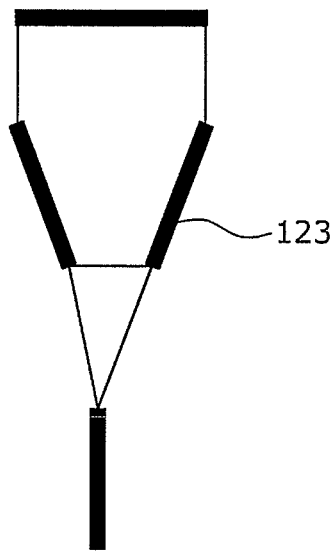
FIG. 53 is a diagram showing a knowledge network representing distances between the eyes, the nose, and the mouth.

A human face can be recognized using a position relationship of eyes, a nose, and a mouth. FIG. 52 shows eyes 126, a noise 127, and a mouth 128. FIG. 53 shows an example of a knowledge network connecting each of entities that area straight line linking the eyes, a straight line linking each eye and the nose, and a straight line linking the nose and mouth. This knowledge network represents a figurative feature of the face. Each straight line has a line length as an attribute. For example, a ratio between the eye-to-eye length and the eye-to-nose length can be calculated from this knowledge network. Such a ratio indicates the feature of the face.

For example, a feature is extracted from a face image given from outside, a knowledge network such as the one shown in FIG. 53 is generated, and a distance ratio of the eyes, the nose, and the mouth is calculated. A ratio is equally calculated for a knowledge network of a face held beforehand, and the two ratios are compared. This enables determination of whether or not the face image given from outside is similar to the stored face information.

Figure 54:
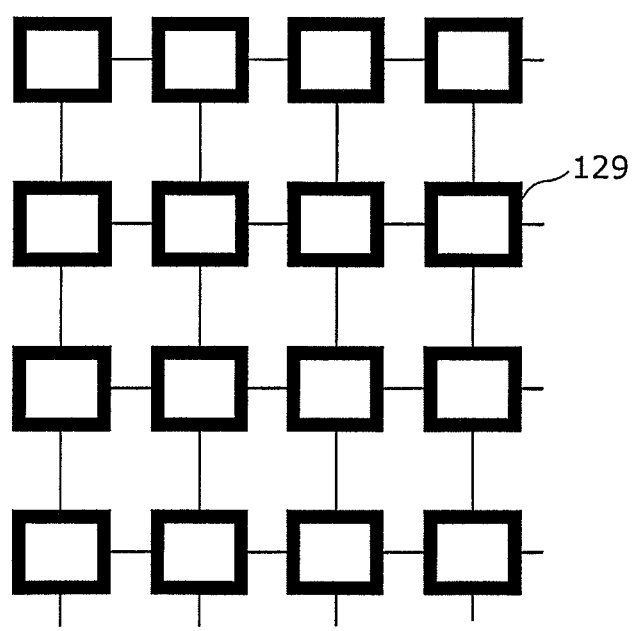
FIG. 54 is a diagram showing a knowledge network representing a shogi board.

FIG. 54 shows a knowledge network representing a shogi board. A location 129 at which a shogi piece is placed is an entity. This knowledge network connects piece placement locations 129 in a grid. Each piece placement location 129 has information indicating a position in the board, as an attribute. For example, the position is indicated by an ordinal position in each of vertical and horizontal directions with respect to one corner of the board, such as (1, 1). When a piece is placed on the board, a type of the placed piece is added as an attribute of the corresponding piece placement location 129. Piece types include a king, a pawn, and so on. A state where no piece is placed is indicated by providing the piece placement location 129 with an attribute "empty", or not providing the piece placement location 129 with an attribute "piece type". When a piece is moved, an attribute for the piece is shifted to a movement destination, and a location from which the piece has been moved is set in an empty state. Various information can be used as attributes of the piece placement location 129, such as a value indicating a degree of safety or significance of the location.

Each piece not shown is also an entity whose attributes include a piece type, a movable range, and the like. A piece placement location 129 to which each piece is movable may have an attribute such as "pawn movable". A piece placement location 129 as an entity is connected to a piece as an entity, where the piece itself may have an attribute such as a movable range. A more suitable method can be adopted according to purpose.

Concrete entities or abstract entities may also be connected in a spatial position relationship like figurative elements, to form a knowledge network. This enables determination or inference different from symbolic logic such as (IF THEN ELSE). That is, determination or inference can be made based on the spatial position relationship.

For example, it is possible to make determination or inference in a manner of comparing a distance between an entity A and an entity B and a distance between the entity A and an entity C and selecting an entity at a shorter distance from the entity A. Thus, determination or inference can be made using an entity-to-entity distance as a determination criterion. In a knowledge network connecting entities in a three-dimensional space, such determination or inference of selecting an entity at a higher position may be made. That is, determination or inference using, as a determination criterion, a position in a space generated by connecting entities is possible. This corresponds to perspective.

In this embodiment, an abstract entity representing a meaning or a concept indicated by an attribute is available. In this case, an attribute connected to feature data representing a meaning of an abstract entity is connected to an entity. In the case of an abstract entity "hotness", feature data of a sense of hotness when touching something hot is connected to an attribute, and the attribute is connected to an entity. This entity is an abstract entity "hotness". The abstract entity "hotness" can also be connected to an attribute connected to identification data generated from a word "hotness", though the attribute connected to the identification data generated from the word "hotness" may be omitted. According to this embodiment, it is possible to generate a knowledge collection or a knowledge network, accumulate knowledge, and perform knowledge processing such as inference, without using identification data generated from a word or a language.

Note however that, if identification data generated from a word or a language is connected to an entity or an attribute, identification or selection based on identification data generated from a word can be carried out. An entity directly connected to identification data is identifiable by the identification data. An attribute connected to identification data is identifiable by the identification data. Moreover, in the case where an attribute connected to identification data is connected to an entity, the entity can be indirectly selected and identified by the identification data.

In the knowledge base system according to this embodiment, a knowledge base can be constructed from an attribute and an entity without using identification data, to accumulate knowledge and perform knowledge processing such as inference. A knowledge base can also be constructed from identification data, feature data, an attribute, and an entity, to accumulate knowledge and perform knowledge processing such as inference. A knowledge base can further be constructed from identification data, an attribute, and an entity without using feature data, to accumulate knowledge and perform knowledge processing such as inference. The knowledge base in this case, however, does not have a meaning or a concept. The knowledge base according to the embodiment of the present invention is composed of identification data or feature data, an attribute, and an entity.

The above describes an example where a connection is represented in a table using the relational database 14. The relational database 14 is capable of efficient use of a table. However, other software for handling a connection may instead be employed. Software capable of handling a data structure called a list structure is applicable. To realize the list structure, however, data in a table form needs to be used. In the list structure, a connection between elements is represented by a pointer, as in a data structure of realizing a node which is an entity. In the case of representing a connection in a table, such a table that arranges connected elements in one row is generated. The difference lies in whether a connection is represented by a pointer or by arranging elements in one row.

Moreover, an electronic component such as an integrated circuit or a device, for example, an associative memory, may be employed. The associative memory internally holds a table, and the following process is performed by hardware. Upon receiving data from outside the associative memory, the table is searched for data that partially or completely matches the received data. In the case where the matching data is found in the table, data associated with the matching data is obtained from the table in the associative memory, and the obtained data is outputted. Each table representing a connection, such as a correspondence table between entities, a corresponding table between an entity and an attribute, and a corresponding table between an attribute and feature data, is generated as the table in the associative memory.

Upon input of an identifier of an entity, an attribute, feature data, or identification data, the associative memory is searched for the identifier. In the case where the identifier is found in the associative memory, an identifier of an entity, an attribute, feature data, or identification data associated with the found identifier is obtained from the table and outputted. That is, an identifier of a connected entity, attribute, feature data, or identification data can be obtained. By outputting data associated in the table in the associative memory in such a way, the same process as when searching the table using the relational database 14 can be achieved. Data of the table in the associative memory may be added or deleted. The associative memory is an electronic component such as a device or an integrated circuit having tabular data and search, addition, and deletion functions of the relational database 14.

However, the amount of data that can be stored in one associative memory is limited. There is also a problem of a longer search time caused by storing a large amount of data in one associative memory.

Figure 55:
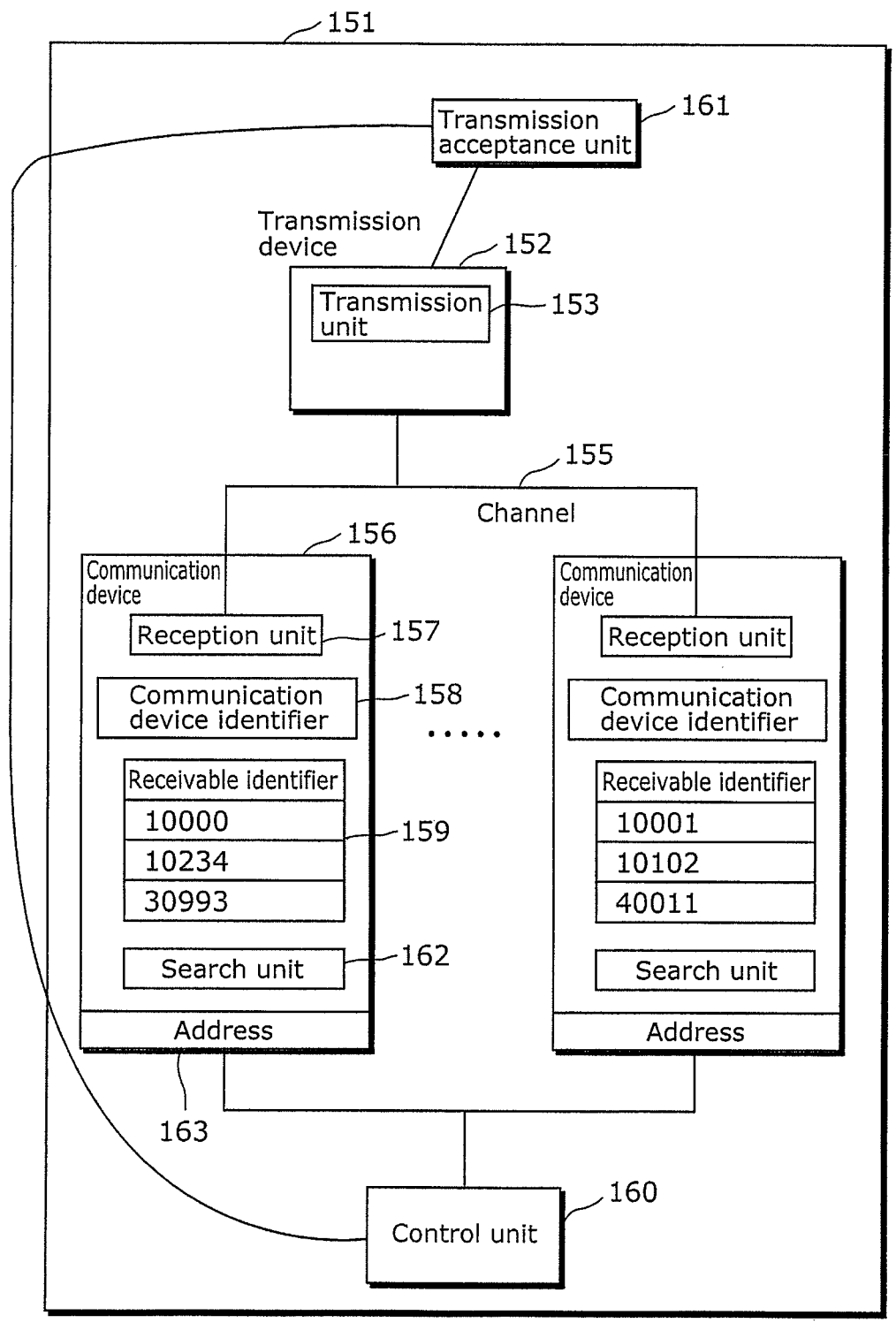
FIG. 55 is a diagram showing an implementation example of a correspondence table by a network.

A network as shown in FIG. 55 may be employed. The network shown in FIG. 55 is merely an example, and the present invention is not limited to this. Such a network is called a search network.

Instead of associating identifiers using a table, identifiers may be associated using the network shown in FIG. 55. The network may then be used to search for, add, or delete an associated identifier. The network shown in FIG. 55 is an example of the auxiliary storage device 7 shown in FIG. 7 holding only a table. The same data as the table of the relational database 14 is divided and held in communication devices in the network shown in FIG. 55, and the network performs the same search process as the relational database 14. The network is capable of faster search than the relational database 14.

In a normal network, information including a communication device identifier of a transmission destination is transmitted, and a communication device whose communication device identifier matches the destination receives the information. In the network shown in FIG. 55, on the other hand, information including a communication device identifier of a transmission source is transmitted, without including a communication device identifier of a transmission destination. This allows data to be transmitted to a device designated beforehand, with there being no need to designate a receiver.

FIG. 55 shows a network 151. The network 151 shown in FIG. 55 includes a transmission device 152, communication devices 156, a control unit 160, and a transmission acceptance unit 161 connected to each other via a channel 155. The transmission device 152 includes a transmission unit 153. The communication devices 156 each include a reception unit 157, a communication device identifier 158, a receivable identifier 159, a search unit 162, and an address 163.

In the network 151, the shared transmission device 152 is used to transmit information to the communication devices 156. Alternatively, the transmission device 152 and its transmission unit 153 may be included in each communication device 156. However, since simultaneous transmission is limited to the transmission unit 153 in one transmission device 152, it is more desirable to share one transmission device 152 and its transmission unit 153 by the plurality of communication devices 156. By limiting transmission to one transmission device 152, a collision of transmission data on the channel 155 can be suppressed, which leads to a significant improvement in transmission efficiency. Efficiency can be further improved because simultaneous transmission is made from the transmission device 152 to the plurality of communication devices 156.

The transmission acceptance unit 161 accepts a transmission instruction and transmission data from the control unit 160. The transmission data does not include a destination, and includes only one communication device identifier 158 which is an identifier of a source communication device 156. One communication device 156 is associated with one entity, attribute, feature data, or identification data. The transmission unit 153 transmits information that includes only the communication device identifier 158 of the source without including the destination, which is received by the transmission acceptance unit 161, to the channel 155. The channel 155 connects the transmission device 152 and the communication devices 156. The channel 155 may be in any form. For example, the channel 155 may be not only an electric wire or an optical cable, but also a space itself.

Each communication device 156 includes the reception unit 157, the communication device identifier 158 which is the identifier of the communication device 156, the receivable identifier 159 which is an identifier of a receivable communication device 156, and the search unit 162. The communication device identifier 158 is an identifier for identifying the communication device 156 in one network, and is set in the communication device 156 by the control unit 160 beforehand. The receivable identifier 159 is a communication device identifier 158 of another communication device 156 connected to the communication device 156, where the communication device 156 corresponds to one neuron and another communication device 156 corresponds to another neuron. The receivable identifier 159 is set in the communication device 156 by the control unit 160 beforehand.

The control unit 160 is capable of adding or deleting the receivable identifier 159 in the communication device 156. This enables a connection between communication devices 156 corresponding to neurons to be established or deleted. The reception unit 157 receives the communication device identifier 158 of the source included in the data transmitted from the transmission device 152, via the channel 155.

The search unit 162 checks whether or not the received communication device identifier 158 matches any receivable identifier 159. In the case where the received communication device identifier 158 of the source matches any receivable identifier 159, the search unit 162 outputs data including the communication device identifier 158 of the communication device 156 itself, to the control unit 160. This corresponds to a state where the communication device 156 corresponding to one neuron receives a signal from another communication device 156 corresponding to another neuron to which the communication device 156 is connected.

In the case where the received communication device identifier 158 of the source does not match any receivable identifier 159, the communication device 156 does not output its communication device identifier 158. This indicates that the communication device 156 corresponding to one neuron is not connected to the communication device 156 corresponding to another neuron identified by the received communication device identifier 158 of the source. The use of this network makes it possible to perform the same process as searching a correspondence table between communication device identifiers for a communication device identifier and obtaining another communication device identifier associated with the communication device identifier. In other words, the table can be searched using this network.

Upon receiving the communication device identifier 158 outputted from the search unit 162, the control unit 160 passes the received data including the communication device identifier 158 to a device not shown. The control unit 160 receives, from the device not shown, a transmission instruction including the communication device identifier 158 of a source which is the identifier of the communication device corresponding to one neuron, and sends the received transmission instruction to the transmission acceptance unit 161.

The address 163 of each communication device 156 uniquely identifies the communication device 156. The control unit 160 designates the communication device 156 by this address 163, and sets data including the communication device identifier 158 and the receivable identifier 159. A computer or a knowledge base system not shown sends data including the communication device identifier 158, the receivable identifier 159, and the address 163 of the communication device 156 to the control unit 160, to set the data including the communication device identifier 158 and the receivable identifier 159 in the communication device 156 designated by the address 163. The communication device identifier 158 is used for identifying the communication device 156 in the network 151, whereas the address 163 of the communication device 156 is used for identifying the communication device 156 from outside the network 151.

In the case of searching the table from the device not shown, the device not shown sends the transmission instruction including the communication device identifier 158 of the source, to the control unit 160. The network 151 then performs the above-mentioned process. Upon receiving the communication device identifier 158 of another communication device 156 connected to the communication device 156 identified by the communication device identifier 158 of the source included in the transmission instruction, the control unit 160 sends data including the communication device identifier 158 of another communication device 156 connected to the communication device 156, to the device not shown.

The use of the network 151 enables the search process in each communication device 156 to be performed in parallel, and also enables the search process in each communication device 156 to be performed by hardware. Hence, extremely fast table search can be achieved, with it being possible to dramatically speed up processing. Accordingly, the present invention can also be applied to a field in which a fast response is required.

The communication device 156 in this network has a simple mechanism, and is easily implemented as an integrated circuit. It is also easy to incorporate a plurality of communication devices 156 in one integrated circuit. A large table can be obtained by generating a network in which a plurality of integrated circuits each including a plurality of communication devices 156 are connected in parallel. This establishes a knowledge base system capable of accumulating a large amount of knowledge information and processing the knowledge information at high speed. When a database is used, there is a need to regularly perform a maintenance work for maintaining database performance. The network 151 eliminates such a need.

The operation device 2 shown in FIG. 7 is connected to the network 151 shown in FIG. 55 by the control unit 160, where the operation device 2 sends an instruction or data to the control unit 160 in FIG. 55, and also receives data from the control unit 160.

For example, when the operation device 2 sends a setting instruction to the control unit 160 together with data including the address 163 and the communication device identifier 158 or the receivable identifier 159, the control unit 160 sets data including the received communication device identifier 158 or receivable identifier 159, in the communication device 156 of the address 163.

Moreover, when the operation device 2 sends a transmission instruction and the communication device identifier 158 of the source to the control unit 160, the control unit 160 sends the transmission instruction and the communication device identifier 158 of the source to the transmission acceptance unit 161. The transmission acceptance unit 161 sends the transmission instruction and the communication device identifier 158 of the source, to the transmission unit 153 in the transmission device 152. The transmission unit 153 transmits the communication device identifier 158 of the source, to the channel 155. Upon receiving the communication device identifier 158 of the source via the channel 155, the communication device 156 compares the received communication device identifier 158 of the source with the receivable identifier 159. When they match, the communication device 156 passes the communication device identifier 158 of the communication device 156 itself, to the control unit 160. In the case where data directly associated with the receivable identifier 159 is set in the communication device 156, the communication device 156 passes the communication device identifier 158 of the communication device 156 and the data directly associated with the receivable identifier 159, to the control unit 160.

The control unit 160 passes the received data including the communication device identifier 158, to the operation device 2.

Alternatively, the communication device 156 passes data including the communication device identifier 158 of the communication device 156 and the received communication device identifier 158 of the source, to the control unit 160. The control unit 160 then passes a combination of the data including the communication device identifier 158 of the communication device 156 and the communication device identifier 158 of the source, to the operation device 2.

The communication device identifier 158 is an identifier of an entity, an attribute, feature data, or identification data. That is, one communication device 156 is one entity, attribute, feature data, or identification data. It should be noted here that actual data of feature data is stored in the data 10 other than the network 151 shown in FIG. 55 together with an identifier of the feature data, and referenced by the identifier of the feature data. Likewise, actual data of identification data is stored in the data 10 other than the network 151 shown in FIG. 55 together with an identifier of the identification data, and referenced by the identifier of the identification data.

The receivable identifier 159 is, for example, an identifier of another entity, attribute, feature data, or identification data connected to an entity which is the communication device 156. The communication device 156 represents an entity, an attribute, feature data, or identification data. That is, the network 151 represents connections of entities, attributes, feature data, and identification data. Data set in the communication device 156 is held as, for example, the table in the relational database 14.

The following describes a table obtained by separating a table indicating connections by associating entities, attributes, feature data, and identification data.

In the table indicating connections, one associated column is selected, one identifier is selected from the selected column, and each identifier in the other column connected to and associated with the selected identifier is extracted. A table that only associates the identifier with the extracted identifiers is newly generated. This process is repeated for each identifier in the column. In the case where ancillary information such as a weight indicating a connection strength is associated in each row of the table indicating connections, the table may be generated by further associating the ancillary information with the identifier in the other column associated with the selected identifier. The ancillary information is not limited to the weight.

Next, the latter column which is the other column is selected, one identifier is selected from the selected column, and each identifier in the former column which is the one column connected to and associated with the selected identifier is extracted. A table that only associates the identifier with the extracted identifiers is newly generated. This process is repeated for each identifier in the column. In the case where ancillary information such as a weight indicating a connection strength is associated in each row of the table indicating connections, the table may be generated by further associating the ancillary information with the identifier in the former column associated with the selected identifier. The ancillary information is not limited to the weight.

One table newly generated in this way corresponds to one entity, attribute, feature data, or identification data. For example, this table associates one entity identifier with an identifier of another entity, attribute, feature data, or identification data connected to the entity. Accordingly, the table may be a combination of an identifier of one entity, attribute, feature data, or identification data and a table having one column for holding an identifier of another entity, attribute, feature data, or identification data. The number of identifiers for identifying another entity, attribute, feature data, or identification connected to one entity, attribute, feature data, or identification is zero or more, and is not limited to one.

A feature data/attribute correspondence table shown in FIG. 56 can be separated into a table of correspondence between one piece of feature data and attributes shown in FIG. 57 and a table of correspondence between one attribute and pieces of feature data shown in FIG. 58. An attribute identifier and a feature data identifier are respectively stored instead of an attribute and feature data in each table.

One feature data identifier (10001) is obtained from a feature data identifier column which is one column in the feature data/attribute correspondence table in FIG. 56. An attribute identifier (14) associated with the feature data identifier (10001) is extracted and obtained from an attribute identifier column which is the other column. A table associating only the obtained one feature data identifier (10001) with the extracted attribute identifier (14) is generated. This is the table in FIG. 57. In the case where ancillary information such as a weight is associated with each row of the table in FIG. 56, the ancillary information may be further associated with the attribute identifier (14) associated with the feature data identifier (10001) to generate the table in FIG. 57. This process is performed for each feature data identifier in the feature data identifier column which is one column in the feature data/attribute correspondence table in FIG. 56.

One attribute identifier (14) is obtained from the attribute identifier column in the feature data/attribute correspondence table in FIG. 56. The feature data identifier (10001) associated with the attribute identifier (14) is extracted and obtained from the feature data identifier column. Moreover, a feature data identifier (45000) associated with the attribute identifier (14) is extracted and obtained from the feature data identifier column. A table associating only the obtained one attribute identifier (14) with the extracted feature data identifiers (10001, 45000) is generated. This is the table in FIG. 58. In the case where ancillary information such as a weight is associated with each row of the table in FIG. 56, the ancillary information may be further associated with the feature data identifier (10001) associated with the attribute identifier (14) to generate the table in FIG. 58. This process is performed for each attribute identifier in the attribute identifier column which is the latter column in the feature data/attribute correspondence table in FIG. 56.

As a result, the feature data/attribute correspondence table in FIG. 56 is separated into a table indicating one piece of feature data and each attribute directly associated with the piece of feature data, and a table indicating one attribute and each piece of feature data directly associated with the attribute. One of these separated tables is assigned to one communication device 56. In the case of the former table, one feature data identifier is set as the communication device identifier 158, and each attribute identifier is set as the receivable identifier 159. Though not shown in FIG. 55, in the case where ancillary information is directly associated with the attribute identifier, the ancillary information is set in the communication device 156 in direct association with the attribute identifier, i.e. the receivable identifier 159. In this case, the table of the receivable identifier 159 is not a table of one column but a table of a plurality of columns, where the ancillary information is set in the same row as the associated attribute identifier.

The data 10 includes an unused identifier list of unused entity identifiers, unused attribute identifiers, unused feature data identifiers, and unused identification data identifiers. For example, each entity identifier and attribute identifier used in the entity/attribute list shown in FIG. 19 is obtained from the unused identifier list. Each feature data identifier and identification data identifier is also obtained from the unused identifier list.

In the network 151, the communication device 156 and the communication device address 163 are set in a one-to-one correspondence with each other beforehand, so that only one communication device 156 can be designated by one communication device address 163. The data 10 includes an unused communication device list of unused communication device addresses 163. The data 10 also includes an address/identifier correspondence table associating a communication device address 163 with an entity identifier, an attribute identifier, a feature data identifier, or an identification data identifier.

In the case where the operation device 2 issues a setting instruction or a transmission instruction to the control unit 160, the operation device 2 obtains a communication device address 163 from an identifier of an entity, an attribute, feature data, or identification with reference to the address/identifier correspondence table, and passes the instruction and data including the obtained address 163 to the control unit 160. When generating an entity, an attribute, feature data, or identification data, an identifier is obtained from the unused identifier list, and a communication device address 163 is obtained from the unused communication device list. A pair of the obtained identifier and the obtained address 163 is then stored in the address/identifier correspondence table.

In the network 151, one communication device 156 corresponds to one entity, one attribute, one piece of feature data, or one piece of identification data. Note that actual data of feature data or identification data which is a feature extracted from a sound or an image is held in the data 10 other than the network 151 shown in FIG. 55. The operation device 2 passes the address 163 and data including the communication device identifier 158 and the receivable identifier 159 to be set in the communication device 156 specified by the address 163, to the control unit 160 in the network 151, and instructs the control unit 160 to set the data including the communication device identifier 158 and the receivable identifier 159 in the communication device 156 specified by the address 163. Upon receiving the instruction, the control unit 160 sets the data including the communication device identifier 158 and the receivable identifier 159 in the communication device 156 specified by the address 163, according to the received data and instruction. Moreover, the communication device address 163 and the identifier used as the communication device identifier 158 are stored in the address/identifier correspondence table in association with each other.

The feature data/attribute correspondence table in FIG. 56 can be separated into the table of correspondence between one piece of feature data and each attribute in FIG. 57 and the table of correspondence between one attribute and each piece of feature data in FIG. 58. An attribute identifier and a feature data identifier are respectively stored instead of an attribute and feature data in each table.

This is described below, using FIG. 57 as an example. Regarding the top table in FIG. 57, one unused address 163 is obtained from the unused communication device list. A combination of the obtained address 163 and the feature data identifier (10001) in the top table in FIG. 57 is stored in the address/identifier correspondence table. Thus, the address 163 and the feature data identifier are associated with each other. In the case where the address 163 and the feature data identifier (10001) are already associated with each other, the address 163 associated with the feature data identifier (10001) is obtained from the address/identifier correspondence table.

The operation device 2 passes the obtained address 163, the feature data identifier (10001) as the communication device identifier 158, the attribute identifier (14) as the receivable identifier 159, the weight (1) as the ancillary information, and the setting instruction to the control unit 160. The control unit 160 sets, in the communication device 156 specified by the received address 163, the received feature data identifier (10001) as the communication device identifier 158, the received attribute identifier (14) as the receivable identifier 159, and the weight (1) as the ancillary data of the attribute identifier (14). The same setting is performed for all tables in FIG. 57. The same applies to the tables in FIG. 58.

As a result of setting all of the table data in FIG. 56 and the table data in FIG. 57, the feature data/attribute correspondence table in FIG. 56 is stored in the network 151 in FIG. 55. Hence, one selected network is one table indicating connections by associating identifiers with each other as shown in FIG. 56.

For example, when the operating device 2 passes the attribute identifier (14) as the source identifier and the transmission instruction to the control unit 160, the control unit 160 passes the received source identifier and transmission instruction to the transmission acceptance unit 161. The transmission acceptance unit 161 passes the received source identifier and transmission instruction to the transmission unit 153 in the transmission device 152. The transmission unit 153 transmits the received source identifier (14) to the channel 155, according to the received transmission instruction.

In one communication device 156 in which the feature data identifier (10001) in the top table in FIG. 57 is set as the communication device identifier 158 and the attribute identifier (14) in the same table is set as the receivable identifier 159, the reception unit 157 receives the source identifier (14) via the channel 155. The search unit 162 checks whether or not the received source identifier (14) matches any receivable identifier 159. In this case, the received source identifier (14) matches the set receivable identifier 159. The communication device 156 accordingly passes the feature data identifier (10001) which is the communication device identifier 158 of the communication device 156 and the weight (1) which is the ancillary data, to the control unit 160.

In another communication device 156 in which the feature data identifier (45000) in the second table from the top in FIG. 57 is set as the communication device identifier and the attribute identifier (14) in the same table is set as the receivable identifier, the reception unit 157 receives the source identifier (14) via the channel 155. The search unit 162 checks whether or not the received source identifier (14) matches any receivable identifier 159. In this case, the received source identifier (14) matches the set receivable identifier 159. The communication device 156 accordingly passes the feature data identifier (45000) which is the communication device identifier 158 of the communication device 156 and the weight (2) which is the ancillary data, to the control unit 160.

The operation device 2 receives the combination of the feature data identifier (10001) and the weight (1) as the ancillary data and the combination of the feature data identifier (45000) and the weight (2) as the ancillary data, which are the data passed from the communication devices 156 to the control unit 160. Hence, the operation device 2 can determine that the feature data (10001) and the feature data (45000) are connected to and associated with the attribute identifier (14). The operation device 2 can also obtain the weight indicating the connection strength, as the ancillary information of the feature data.

The above process is equivalent to searching the table in FIG. 56 using the attribute identifier (14) as a search key by use of the relational database 14.

In the case where the ancillary data of the receivable identifier 159 is not set in the communication device 156, the communication device 156 may not pass the ancillary data to the control unit 160, or pass special data indicating that there is no ancillary information, such as NULL, to the control unit 160.

A program describes a procedure by means of information which is a program. This can also be realized by hardware. Therefore, the program according to the present invention may be implemented by hardware. By implementing the program according to the present invention by hardware such as an electronic device, an integrated circuit, or a processor, the present invention can be incorporated into various apparatuses, and also faster processing can be achieved. The present invention can further be realized as an information system.

Though the embodiments of the present invention have been described with reference to the drawings, the present invention is not limited to the illustrated embodiments. Various modifications and changes can be made to the illustrated embodiments within the same or equivalent scope of the present invention.

INDUSTRIAL APPLICABILITY

The present invention is useful for a knowledge base system.

REFERENCE SIGNS LIST

1 Input device
2 Operation device
3, 156 Communication device
4, 151 Network
5 External storage device
6 Main storage device 7 Auxiliary storage device
8 Output device
9, 11 Program
10, 12 Data
13 Knowledge base program
14 Relational database
60, 80 Node
61, 118 Attribute
62, 72 Arrow connecting entities
63 Arrow connecting entity and attribute
70 Entity neuron
71 Attribute neuron
81, 88 Entity identifier
82 Forward pointer
83 Backward pointer
84 Knowledge network information
85, 102 Knowledge network identifier
86 Entity name/entity identifier correspondence table
87 Entity name
100 Weight
101 Knowledge network/attribute correspondence table
103 Attribute identifier
110 Sense organ
111 Entity area
112 Storage area
114, 1020 Feature extraction unit
115 Attribute area
119 Feature data
120 Entity
121 Triangle
122 Point.
123 Line
124 Plane
126 Eye
127 Nose
128 Mouth
129 Piece placement location
152 Transmission device
153 Transmission unit
155 Channel
157 Reception unit
158 Communication device identifier
159 Receivable identifier
160 Control unit
161 Transmission acceptance unit
162 Search unit
163 Address
164 Identification data
165, 166, 167, 168 Knowledge collection
169, 170, 171 Knowledge network
1000 Knowledge base system
1010 Data input unit
1020 Feature extraction unit
1030 Data comparison unit
1040 Data storing unit
1050 Learning unit
1060 Search unit
1070 Operation unit
1080 Output unit

The invention claimed is:

1. A knowledge base system comprising:
a storage unit in which a knowledge base is stored; and
an operation unit configured to perform a logic operation on the knowledge base stored in said storage unit,
wherein the knowledge base includes a plurality of entities, each of the entities including an entity identifier for identifying an entity and includes one or more attributes of the entity, the one or more attributes being associated with the entity identifier of the entity,
the one or more attributes each includes: an attribute identifier for identifying the attribute; and at least one of (i) a feature data identifier and feature data and (ii) an identification data identifier and identification data, the feature data being one or more pieces of data representing the attribute and being associated with the attribute identifier for identifying the attribute, the feature data identifier identifying a memory address in which the feature data is stored, the identification data being data associated with a word representing the attribute and being associated with the attribute identifier and the identification data identifier identifying the identification data,
the entity identifier is not a word representing the entity, and is made of a symbol that has no meaning per se, and
the attribute identifier is not the word representing the attribute, and is made of a symbol that has no meaning per se, the attribute identifier being an identifier which independently indicates the attribute without depending on a hierarchical classification of previously generated knowledge, such that the attribute identifier identifies the attribute of the entity without any dependency on another attribute of the entity.

2. The knowledge base system according to claim 1, wherein the feature data is data representing at least one of a shape, a sound, a smell, a taste, a color, a pressure, a temperature, a length, a coordinate value, and an area of the attribute identified by the attribute identifier associated with the feature data.

3. The knowledge base system according to claim 1, further comprising:
an input unit configured to obtain information relating to the attribute;
a feature extraction unit configured to extract at least one of the feature data and the identification data, from the information obtained by said input unit; and
a data storing unit configured to store the at least one of the feature data and the identification data extracted by said feature extraction unit, in the knowledge base in association with the attribute identifier for identifying the attribute.

4. The knowledge base system according to claim 1, wherein the attribute identifier includes a primary identifier and a secondary identifier, and the attribute identifier identifies the attribute by a combination of the primary identifier and the secondary identifier.

5. The knowledge base system according to claim 1, wherein said operation unit is configured to, when one entity is designated as an operation target, perform the logic operation on an attribute of the designated entity.

6. The knowledge base system according to claim 5, wherein said operation unit is further configured to, when two attribute sets each of which includes one or more attributes are designated, perform an AND operation of generating a new attribute set by:
collecting, in a case where each attribute is associated with a true-false value indicating whether the attribute is true or false, only attributes that have a same attribute identifier and are associated with a same true-false value between the two attribute sets; and
collecting, in a case where each attribute is not associated with the true-false value, only attributes that have a same attribute identifier between the two attribute sets.

7. The knowledge base system according to claim 5, wherein said operation unit is further configured to, when two attribute sets each of which includes one or more attributes are designated, perform an OR operation of generating a new attribute set by collecting attributes that belong to at least one of the two attribute sets.

8. The knowledge base system according to claim 5, wherein each attribute is associated with a true-false value indicating whether the attribute is true or false, and
said operation unit is further configured to, when one attribute set including one or more attributes is designated, perform a NOT operation of generating a new attribute set with the true-false value being changed, by generating, for each attribute included in the attribute set, an attribute by changing the true-false value to false in a case where the associated true-false value is true and changing the true-false value to true in a case where the associated true-false value is false.

9. The knowledge base system according to claim 5, wherein each attribute is associated with a true-false value indicating whether the attribute is true or false, and
said operation unit is further configured to, when two attribute sets each of which includes one or more attributes are designated, perform a NAND operation of: generating an attribute set by collecting only attributes that have a same attribute identifier and are associated with a same true-false value between the two attribute sets; and further generating a new attribute set with the true-false value being changed, by generating, for each attribute included in the generated attribute set, an attribute by changing the true-false value to false in a case where the associated true-false value is true and changing the true-false value to true in a: case where the associated true-false value is false.

10. The knowledge base system according to claim 5, wherein each attribute is associated with a true-false value indicating whether the attribute is true or false, and
said operation unit is further configured to, when two attribute sets each of which includes one or more attributes are designated, perform a NOR operation of: generating an attribute set by collecting attributes that belong to at least one of the two attribute sets; and further generating a new attribute set with the true-false value being changed, by generating, for each attribute included in the generated attribute set, an attribute by changing the true-false value to false in a case where the associated true-false value is true and changing the true-false value to true in a case where the associated true-false value is false.

11. The knowledge base system according to claim 5, wherein said operation unit is further configured to, when two attribute sets each of which includes one or more attributes are designated:
count, in a case where each attribute is associated with a true-false value indicating whether the attribute is true or false, a number of attributes that are included in both of the two attribute sets and associated with a same true-false value between the two attribute sets, as a degree of commonality; and
count, in a case where each attribute is not associated with the true-false value, a number of attributes that are included in both of the two attribute sets, as the degree of commonality.

12. The knowledge base system according to claim 5, wherein said operation unit is further configured to, when two attribute sets each of which includes one or more attributes are designated:
count, in a case where each attribute is associated with a true-false value indicating whether the attribute is true or false, a number of attributes that are included in both of the two attribute sets and associated with different true-false values between the two attribute sets, as a degree of non-commonality; and
count, in a case where each attribute is not associated with the true-false value, a number of attributes that are included in only either of the two attribute sets, as the degree of non-commonality.

13. The knowledge base system according to claim 5, wherein said operation unit is further configured to, when two attribute sets each of which includes one or more attributes are designated:
count, in a case where each attribute is associated with a true-false value indicating whether the attribute is true or false, a number of attributes that have a same primary identifier and are associated with a same true-false value between the two attribute sets, as a degree of similarity; and
count, in a case where each attribute is not associated with the true-false value, a number of attributes that have a same primary identifier between the two attribute sets, as the degree of similarity.

14. The knowledge base system according to claim 5, wherein said operation unit is further configured to, when two attribute sets each of which includes one or more attributes are designated:
count, in a case where each attribute is associated with a true-false value indicating whether the attribute is true or false, a number of attributes that have a same primary identifier and are associated with different true-false values between the two attribute sets, as a degree of non-similarity; and
count, in a case where each attribute is not associated with the true-false value, number of attributes that are included in only either of the two attribute sets, as the degree of non-similarity.

15. The knowledge base system according to claim 5, wherein each attribute is associated with a true-false value indicating whether the attribute is true or false, and
said operation unit is further configured to, when two attribute sets each of which includes one or more attributes are designated, perform an OR operation of generating a new attribute set by excluding, from attributes that belong to at least one of the two attribute sets, attributes that are included in both of the two attribute sets and associated with different true-false values between the two attribute sets.

16. The knowledge base system according to claim 5, wherein said operation unit is further configured to, when two attribute sets each of which includes one or more attributes are designated, perform a XOR operation of generating a new attribute set by excluding attributes that belong to both of the two attribute sets.

17. The knowledge base system according to claim 1, wherein said operation unit is configured to, when one or more attributes are designated, generate a knowledge collection having the designated one or more attributes by collecting each entity identifier associated with the designated one or more attributes, and when an entity is designated, determine whether or not an entity identifier of the designated entity belongs to the knowledge collection.

18. The knowledge base system according to claim 17, wherein said operation unit is further configured to newly generate an abstract entity, by associating an entity identifier for identifying the generated knowledge collection with an attribute identifier for identifying the designated one or more attributes and an attribute identifier of an attribute indicating an abstract entity.

19. The knowledge base system according to claim 1,
wherein the knowledge base further includes a knowledge network formed by connecting nodes corresponding to entities,
each of the nodes includes an entity identifier for the node and includes knowledge network information about the knowledge network to which the node belongs, and
the knowledge network information includes a knowledge network identifier for identifying the knowledge network and includes a pointer to another node to which the node is connected in the knowledge network.

20. The knowledge base system according to claim 19, wherein said operation unit is configured to specify, in a knowledge network identified by a designated knowledge network identifier, another entity connected to a designated entity by referencing to an entity identifier and knowledge network information that are included in a node in the knowledge network.

21. The knowledge base system according to claim 19, wherein said operation unit is configured to, when an attribute identifier is designated, search for a knowledge network associated with the designated attribute identifier, and obtain a knowledge network identifier of the knowledge network searched for.

22. The knowledge base system according to claim 21, wherein said operation unit is further configured to newly generate an abstract entity, by associating an entity identifier for identifying the knowledge network with the attribute identifier associated with the knowledge network and an attribute identifier of an attribute indicating an abstract entity.

23. A logic operation method of a knowledge base system,
wherein the knowledge base system includes:
a storage unit in which a knowledge base is stored; and
an operation unit configured to perform a logic operation on the knowledge base stored in said storage unit,
wherein the knowledge base includes a plurality of entities, each of the entities including an entity identifier for identifying an entity and includes one or more attributes of the entity, the one or more attributes being associated with the entity identifier of the entity,
wherein the one or more attributes each includes: an attribute identifier for identifying the attribute; and at least one of (i) a feature data identifier and feature data and (ii) an identification data identifier and identification data, the feature data being one or more pieces of data representing the attribute and being associated with the attribute identifier for identifying the attribute, the feature data identifier identifying a memory address in which the feature data is stored, the identification data being data associated with a word representing the attribute and being associated with the attribute identifier and the identification data identifier identifying the identification data,
wherein the entity identifier is not a word representing the entity, and is made of a symbol that has no meaning per se,
wherein the attribute identifier is not the word representing the attribute, and is made of a symbol that has no meaning per se, the attribute identifier being an identifier which independently indicates the attribute without depending on a hierarchical classification of previously generated knowledge, such that the attribute identifier identifies the attribute of the entity without any dependency on another attribute of the entity, and
wherein the logic operation method comprises a step of performing processing by the operation unit, for the knowledge base included in the knowledge base system.

24. A non-transitory computer-readable recording medium having a computer program for a knowledge base system recorded thereon,
wherein the knowledge base system includes:
a storage unit in which a knowledge base is stored; and
an operation unit configured to perform a logic operation on the knowledge base stored in said storage unit,
wherein the knowledge base includes a plurality of entities, each of the entities including an entity identifier for identifying an entity and includes one or more attributes of the entity, the one or more attributes being associated with the entity identifier of the entity,
wherein the one or more attributes each includes: an attribute identifier for identifying the attribute; and at least one of (i) a feature data identifier and feature data and (ii) an identification data identifier and identification data, the feature data being one or more pieces of data representing the attribute and being associated with the attribute identifier for identifying the attribute, the feature data identifier identifying a memory address in which the feature data is stored, the identification data being data associated with a word representing the attribute and being associated with the attribute identifier and the identification data identifier identifying the identification data,
wherein the entity identifier is not a word representing the entity, and is made of a symbol that has no meaning per se,
wherein the attribute identifier is not the word representing the attribute, and is made of a symbol that has no meaning per se, the attribute identifier being an identifier which independently indicates the attribute without depending on a hierarchical classification of previously generated knowledge, such that the attribute identifier identifies the attribute of the entity without any dependency on another attribute of the entity, and
wherein the computer program causes a computer to execute a logic operation method comprising a step of performing processing by the operation unit, for the knowledge base included in the knowledge base system.

* * * * *